United States Patent
Tracy et al.

(10) Patent No.: US 6,980,927 B2
(45) Date of Patent: Dec. 27, 2005

(54) ENHANCED SYSTEM, METHOD AND MEDIUM FOR CERTIFYING AND ACCREDITING REQUIREMENTS COMPLIANCE UTILIZING CONTINUOUS RISK ASSESSMENT

(75) Inventors: Richard P. Tracy, Ashburn, VA (US); Hugh Barrett, Centreville, VA (US); Gary M. Catlin, Brick, NJ (US)

(73) Assignee: Telos Corporation, Ashburn, VA (US)

( * ) Notice: Subject to any disclaimer, the term of this patent is extended or adjusted under 35 U.S.C. 154(b) by 76 days.

(21) Appl. No.: 10/304,826

(22) Filed: Nov. 27, 2002

(65) Prior Publication Data

US 2004/0102923 A1 May 27, 2004

(51) Int. Cl.[7] .............................................. G06F 17/60
(52) U.S. Cl. ...................................... 702/181; 713/201
(58) Field of Search ................................ 702/119, 123, 702/179–188, 108, 122; 717/101, 121, 127; 713/127, 200, 201, 170; 709/223, 224, 229; 714/38; 705/7, 57, 53

(56) References Cited

U.S. PATENT DOCUMENTS

| | | | |
|---|---|---|---|
| 5,032,979 A | 7/1991 | Hecht et al. | |
| 5,621,889 A | 4/1997 | Lermuzeaux et al. | 713/200 |
| 5,625,751 A | 4/1997 | Brandwajn et al. | 706/20 |
| 5,684,959 A | 11/1997 | Bhat et al. | 709/224 |
| 5,699,403 A | 12/1997 | Ronnen | 379/15.04 |
| 5,740,248 A | 4/1998 | Fieres et al. | 713/156 |
| 5,796,942 A | 8/1998 | Esbensen | 713/201 |
| 5,850,516 A | 12/1998 | Schneier | 713/200 |
| 5,859,847 A | 1/1999 | Dew et al. | 370/389 |
| 5,870,545 A | 2/1999 | Davis et al. | |
| 5,892,900 A | 4/1999 | Ginter et al. | 713/200 |
| 5,892,903 A | 4/1999 | Klaus | 713/201 |
| 5,931,946 A | 8/1999 | Terada et al. | 713/201 |
| 6,006,328 A | 12/1999 | Drake | 713/200 |
| 6,134,664 A | 10/2000 | Walker | 713/201 |
| 6,148,401 A | 11/2000 | Devanbu et al. | 713/170 |
| 6,151,599 A | 11/2000 | Shrader et al. | 707/9 |
| 6,185,689 B1 | 2/2001 | Todd, Sr. et al. | 713/201 |
| 6,205,407 B1 | 3/2001 | Testa et al. | 702/119 |
| 6,219,626 B1 | 4/2001 | Steinmetz et al. | 702/183 |
| 6,219,628 B1 | 4/2001 | Kodosky et al. | 703/2 |
| 6,219,805 B1 * | 4/2001 | Jones et al. | 714/38 |
| 6,230,105 B1 | 5/2001 | Harris et al. | |

(Continued)

FOREIGN PATENT DOCUMENTS

| | | |
|---|---|---|
| EP | 0999489 | 5/2000 |
| WO | WO 00/70463 | 11/2000 |
| WO | WO 01/37511 | 5/2001 |
| WO | WO 01/59989 | 8/2001 |
| WO | WO 01/99349 | 12/2001 |
| WO | WO 02/061544 | 8/2002 |

OTHER PUBLICATIONS

Baskerville, Richard. Dec. 4, 1993. "Information Systems Security Design Methods: Implications for Information Systems Development." ACM Computing Surveys, vol. 25, No. 4, pp. 375–414.

(Continued)

Primary Examiner—Marc S. Hoff
Assistant Examiner—Mohamed Charioui

(57) ABSTRACT

A computer-assisted system, medium and method of providing a risk assessment of a target system. The method includes electronically scanning, on a predetermined basis, hardware and/or software characteristics of components within a target system to obtain and store target system configuration information, receiving and storing target system operational environment information, using information collected in the scanning and receiving steps to select one or more security requirements in accordance with the at least one predefined standard, regulation and/or requirement, selecting one or more test procedures used to determine target system compliance with the security requirements, and producing a risk assessment of the target system.

65 Claims, 48 Drawing Sheets

U.S. PATENT DOCUMENTS

| | | | |
|---|---|---|---|
| 6,256,773 B1 | 7/2001 | Bowman-Amuah | 717/121 |
| 6,282,546 B1 | 8/2001 | Gleichauf et al. | 707/102 |
| 6,298,445 B1 | 10/2001 | Shostack et al. | 713/201 |
| 6,317,868 B1 | 11/2001 | Grimm et al. | 717/127 |
| 6,324,647 B1 | 11/2001 | Bowman-Amuah | 713/201 |
| 6,370,573 B1 | 4/2002 | Bowman-Amuah | 709/223 |
| 6,389,402 B1 | 5/2002 | Ginter et al. | 705/51 |
| 6,401,073 B1 | 6/2002 | Tokuda et al. | |
| 6,405,364 B1 | 6/2002 | Bowman-Amuah | 717/101 |
| 6,408,391 B1 | 6/2002 | Huff et al. | 713/201 |
| 6,473,794 B1 | 10/2002 | Guheen et al. | 709/223 |
| 6,546,493 B1 * | 4/2003 | Magdych et al. | 713/201 |
| 2001/0027389 A1 | 10/2001 | Beverina et al. | 703/22 |
| 2001/0034847 A1 | 10/2001 | Gaul | 713/201 |
| 2002/0042687 A1 | 4/2002 | Tracy et al. | |
| 2002/0069035 A1 * | 6/2002 | Tracy et al. | 702/181 |
| 2002/0104014 A1 | 8/2002 | Zobel et al. | 713/200 |
| 2002/0198750 A1 * | 12/2002 | Innes et al. | 705/7 |
| 2002/0199122 A1 | 12/2002 | Davis et al. | |
| 2003/0046128 A1 | 3/2003 | Heinrich | |
| 2003/0064717 A1 | 4/2003 | Rajaram | |
| 2003/0065793 A1 * | 4/2003 | Kouznetsov et al. | 709/229 |
| 2003/0159063 A1 | 8/2003 | Apfelbaum et al. | |
| 2003/0163728 A1 * | 8/2003 | Shaw | 713/201 |
| 2003/0172166 A1 * | 9/2003 | Judge et al. | 709/229 |
| 2004/0010709 A1 | 1/2004 | Baudoin et al. | |
| 2004/0025015 A1 | 2/2004 | Satterlee et al. | |
| 2004/0049698 A1 * | 3/2004 | Ott et al. | 713/201 |

OTHER PUBLICATIONS

Oct. 24, 2002. International Search Report from PCT Application No. PCT/US02/09842.

Apr. 11, 2003. International Preliminary Examination Report from PCT Application No. PCT/US02/09842.

Dec. 26, 1985. "Department of Defense Trusted Computer System Evaluation Criteria." DoD 5200.28–STD.

Jul. 31, 2000. "Department of Defense Information Technology Security Certification and Accreditation Process (DITSCAP): Application Manual." DoD 8510.1–M.

Jan. 23, 2003. International Search Report from PCT/US02/28179 (note that all references were cited previously in an IDS submission filed on May 9, 2003).

Apr. 11, 2003. International Preliminary Examination Report from PCT/US00/09842 (note that all references were cited previously in an IDS submission filed on Nov. 27, 2002).

Dennis Szerszen, "Secure Strategies—A Year–Long Series on the Fundamentals of Information Systems Security—Extending your business to the Web requires a firm understanding of directories, what they offer and the challenges you'll face in deploying them," Apr. 2000, Part I, from http://infosecuritymag.techtarget.com/articles/april00/features4.shtml.

"DOD Information Technology Security Certification and Accreditation Process (DITSCAP)," Lesson 11, Aug. 29, 2000, from http://atzhssweb.gordon.army.mil/otd/c2protect/isso/item17.html, pp. 1–25.

The Mitre Corporation, "The Key to Information Sharing—Common Vulnerabilities & Exposures," Aug. 17, 2000, from http://www.cve.mitre.org/about/introduction.html.

Al Berg, "Secure Strategies—A Year–Long Series on the Fundamentals of Information Systems Security—On the surface, all vulnerability assessment scanners perform essentially the same way. Here's how to decide which one–if–any–is right for your requirements," Part 2, "Audits, Assessments & Tests (Oh, My)," from http://www.infosecuritymag.com/aug2000/securestrategies.htm, pp. 1–5.

Dan Swanson, "Secure Strategies—A Year–Long Series on the Fundamentals of Information Systems Security—Avoiding IS Icebergs," Part 4, "Audits, Assessments & Tests (Oh, My)," from http://www.infosecuritymag.com/oct2000/icebergs.htm, pp. 1–4.

George Kurtz and Chris Prosise, "Secure Strategies—Penetration Testing Exposed," Part 3, "Audits, Assessments & Tests (Oh, My)," from http://www.infosecuritymag.com/sep2000/securestrategies.htm, pp. 1–5.

Tracy, et al., U.S. Appl. No. 10/304,824, filed on Nov. 27, 2002, entitled "Enhanced System, Method and Medium for Certifying and Accrediting Requirements Compliance Utilizing Threat Vulnerability Feed".

Tracy, et al., U.S. Appl. No. 10/304,825, filed on Nov. 27, 2002, entitled "Enhanced System, Method and Medium for Certifying and Accrediting Requirements Compliance Utilizing Robust Risk Assessment Model".

Levine, Diane E.; "CyberCop Patrols on Linux." *InformationWeek;* (May 24, 1999).

Karygiannis, T.; "Network security testing using mobile agents. (Abstract)" *Proceedings of the Third International Conference on the Practical Application of Intelligent Agents and a Multi–Agent Technology,* pp. 625–626; (Mar. 1998).

Dyck, Timothy; "App Scanning Helps Secure Weak Spots." *EWEEK* (May 20, 2002).

Mendelson, Edward; "The Danger Within." *PC Magazine* (Dec. 5, 2000).

"TruSecure Adopts Sanctum Inc.'s Web Application Security Audit Solution; Sanctum's Powerful Web Application Security Audit Software Complements TruSecure's Security Program. (Abstract)" *Business Wire,* p. 0121 (Dec. 18, 2000).

"BMC Software Automates Security Management for E–businesses; Provides Customers with Automated Access Management and E–business Information Security. (Abstract) " *Business Wire,* p. 084 (Nov. 8, 2000).

"Best Practices and Beyond. (Industry Speaks). (Abstract)" *Government Computer News* v21, n21, p.S14(6) (Jul. 29, 2002).

Casella K.A. et al., "Security administration in an open networking environment. (Abstract)" *Proceedings of the Ninth Systems Administration Conference,* p. 67–73 (1995).

Hochberg, Judith, "NADIR: An automated system for detecting network intrusion and misuse. (Abstract)" *Computers & Security* v12, n3, p. 235–248 (May 3, 1993).

DoD Information Technology Security Certificate and Accreditation Process (DITSCAP) Journal Announcement USGRDR 0109 (Abstract) (Mar. 1999).

"ActiveSentry™ 3.0 (Security You Can See)" *Intranode Software Technologies;* p. 1–19 (Mar. 2002).

Briney, Andrew, "Automating Policies." www.infosecuritymag.com; (Oct. 2002).

Fisher, Dennis; "Enforcer Keeps Far–flung Systems in Check." *Eweek;* (May 20, 2002).

Hulme, George V.; "Herculean Help For Patching." InformationWeek.com (Mar. 18, 2002).

Hulme, George V.; "Hercules' Strength is Security Automation." InformationWeek.com (Mar. 14, 2002).

Sidel, Scott et al.; "Patching Accross the Enterprise" www.infosecuritymag.com; (Feb. 2002).

Korzeniowski, Paul; "Audit and Assessment—Ironclad Security." wwwinfosecuritymag.com; (Aug. 2000).

Musich, Paula; "Loudcloud Automates Patch Management." *Eweek;* (May 28, 2002).

Chi, Sung–Do et al..; "Network security modeling and cyber attack simulation methodology. (Abstract)" *Information Security and Privacy, 6th Australasian Conference, ACISP 2001 Proceedings;* p. 320–3 (Jul. 2001).

Shipley, G.; "Vulnerability assessment scanners. (Abstract)" *Network Computing, vol. 12, No. 1* pp. 51–65 (Jan. 8, 2001).

Mayer, A. et al.; Fang: A firewall analysis engine. (Abstract) *Proceedings of 2000 IEEE Symposium on Security and Privacy;* pp. 177–187 (May 2000).

"Intrusion detection [market survey]. (Abstract)" Secure Computing; pp. 58–60, 62, 64, 66, 68 (Jun. 1999).

Zhou, Qin et al..; "Application of artificial neural networks in power system security and vulnerability assessment. (Abstract)" IEEE Transactions on Power Systems vol. 9, No. 1; pp. 525–532 (Feb. 1994).

Gimble, T.F. et al.; "Information Assurance for the Defense Civilian Personnel Data System—Washington, Headquarters Services. (Abstract)" Audit Report, Department of Defense, Office of the Inspector General, Washington, DC (Jun. 3, 1998).

Swiler, L.P. et al.; "Graph–based system for network–vulnerability analysis. (Abstract)" USDOE Office of Financial Management and Controller, Washington DC (Jun. 30, 1998).

Mohamed, Baith; "An effective modified security auditing tool (SAT). (Abstract)" *Proceedings of the the 23rd International Conference on Information Technology Interfaces Part vol. 1;* pp. 37–41 (Jun. 2001).

Gilliam, D.P. et al.; "Development of a software security assessment instrument to reduce software security risk. (Abstract)" *Proceedings Tenth IEEE International Workshop on Enabling Technologies: Infrastructure for Collaborative Enterprises;* pp. 144–149 (Jun. 2001).

Doty, T.; "Test Driving SATAN. (Abstract)" Computer Security Journal vol. 11, No. 2; pp. 9–14 (Fall 1995).

Polk, W.T.; "Automated Tools for testing computer system vulnerability. (Abstract)" National Institute of Standards & Technology (Dec. 1992).

Rudd, Alan et al.; "Managing security vulnerabilities in a networked world. (Abstract)" Journal of Digital Imaging vol. 11, No. 3 Suppl. 1; pp. 216–218 (Aug. 1998).

Karagiannis, Konstantinos; "Finding and Fixing Network Vulnerabilities." *PC Magazine* (Jun. 30, 2002).

Rapoza, Jim; "Foundscan Roots Out Problems." *EWEEK* (May 20, 2002).

James, Robert; "Hercules—Citadel provides some muscle to vulnerability scanners." www.infosecuritymag.com; (Sep. 2000).

Machrone, Bill; "Syscheck; Network Tests." *ExtremeTech* (Apr. 22, 2002).

Machrone, Bill; "Syscheck; System Tests and Port Scanners." *ExtremeTech* (Apr. 22, 2002).

Fisher, Dennis; "HP Expands Security Practice." *EWEEK;* (Oct. 29, 2001).

Sturdevant, Cameron; "Top Layer Testing." *EWEEK* (Apr. 8, 2002).

Mixer, R. A.; "Common Database Format for Network Security Data—[Master's Thesis] (Abstract)" *Air Force Institute of Technology—Wright Patterson AFB Ohio* (Jul. 26, 1999).

Wang, Rong et al.; "Design and implementation of acceptance monitor for building scalable intrusion tolerant system. (Abstract)" *Proceedings Tenth Annual International Conference on Computer Communications and Networks;* pp. 200–205 (Oct. 2001).

Jackson, K. A. et al.; "Misuse and intrusion detection at Los Alamos National Laboratory. (Abstract)" Los Alamos National Lab—Report No. LA–UR–1039; CONF–9505191–1 (1995).

"Mixing Solutions to Garner Full Assessments—Vulnerability Assessment Tools" *ChannelWEB* (May 3, 2001).

"Secure Strategies; A Year Long Series on the Fundamentals of Inforamtion Systems Security." www.infosecuritymag.com; (Apr. 2000).

Wood, Lamont; "Smart Security: network scanners." Tech Update (Oct. 24, 2002).

Rogers, Amy; "Testing For Network Vulnerabilities." *ChannelWEB* (Jul. 9, 1999).

XACTA™ Corporation. Aug. 2001. *Xacta Web C&A™2001 User Guide: DITSCAP/NIACAP.* Ashburn, VA: Xacta Corporation.

Linger, Richard C. Nov. 2000. "Systematic Generation of Stochastic Diversity as an Intrusion Barier in Survivable Systems Software." Carnegie Mellon University. http://www.sei.cmu.edu/programs/nss/stochastic–divers.html.

The Software Engineering Institute (SEI). Nov. 2000. "Operationally Critical Threat, Asset, and Vulnerability Evaluation (Octave) Framework. Version 1.0." Carnegie Mellon University. http://www.sei.cmu.edu/publications/documents/99.reports/99tr017/99tr017chap01.html.

The Software Engineering Institute (SEI). Nov. 2000. "Survivable Network Analysis." Carnegie Mellon University. http://www.sei.cmu.edu/organization/programs/nss/analysis–method.html.

XACTA™ Corporation. Sep. 2000. *Web C&A™.* Ashburn, VA: Xacta Corporation.

Winkler, Ira, Al Berg, George Kurtz, Chris Prosise, and Dan Swanson. Jul. 2000. "Audits Assessments & Tests (Oh My)." http://www.infosecuritymag.com/july2000/audits.html.

Dorobek, Christopher J. May 2000. "Project Matrix Identifies How Systems Interact." *Government Computer News.* Post–Newsweek Tech Media Group, Inc. http://www.gcn.com/vol9_no11/news/1974–1.html.

Government Computer News. May 2000. "CIO Launches Security Best Practices Web Site." Post–Newsweek Tech Media Group, Inc. http://www.gcn.com/vol1_no1/dailyupdates/2067–1.html.

Government Computer News. Aug. 1999. "Scanner Suite Increases its Risk Assessment Tool Features." Post–Newsweek Tech Media Group, Inc. http://wwwgcn.com/vol18_no28/com/495–1.html.

FDIC. Jul. 1999. "Risk Assessment Tools and Practices for Information System Security." http://www.fdie.gov/news/financial/1999/FIL9968a.html.

Fisher, David A., and Howard F. Lipson. Jan. 1999. "Emergent Algorithms: A New Method for Enhancing Survivability in Unbounded Systems." *Proceedings of the Hawaii International Conference on System Sciences.* Maui, Hawaii: IEEE. http://www.sei.cmu.edu/organization/programs/nss/emergent–algor.html.

Ellison, R. J., R. C. Linger, T. Longstaff, and N. R. Mead. Sep. 1998. *A Case Study in Survivable Network System Analysis.* Pittsburgh, PA: Carnegie Mellon Software Engineering Institute.

Linger, R. C., N. R. Mead, and H. F. Lipson. 1998. Requirements Definition for Survivable Network Systems. *IEEE.* http://www.sei.cmu.edu/programs/nss/icre.html.

Ellison, Robert J., David A. Fisher, Richard C. Linger, Howard F. Lipson, Thomas A. Longstaff, and Nancy R. Mead. 1998. "Survivability: Protecting Your Critical Systems." *Proceedings of the International Conference on Requirements Engineering.* Colorado Springs, CO: IEEE. http://www.sei.cmu.edu/programs/nss/project–critical–systems.html.

Valletta, Anthony M. Dec. 1997. "DoD Information Technology Security Certification and Accreditation Process (DITSCAP)." *Department of Defense Instruction.* Doc. No. 5200.40.

Bassham, Lawrence E., and Timothy Polk. "Threat Assessment of Malicious Code and Human Computer Threats." Oct. 1992. National Institute of Standards and Technology. http://www.it.kth.se/~cwe/wastebin/threat–assess.html.

"System Accreditation." http//bsp.cio.gov/getfile.cfm?messageid=000.

Ellison, Robert J., Richard C. Linger, Thomas Longstaff, and Nancy R. Mead. "Survivable Network System Analysis: A Case Study." Carnegie Mellon University.

Web C& A™ Xacta Corporation (Sep. 2000).

"Web C& A™ 2001 User Guide." Xacta Corporation (Aug. 27, 2001).

"Xacta Detect Installation Guide." Xacta Corporation (Aug. 22, 2001).

"Xacta Web C & A™ 2001 System Administrator Guide." Xacta Corporation (Aug. 29, 2001).

"Xacta Web C & A™ 2001 Installation Guide." Xacta Corporation (Aug. 29, 2001).

"Xacta Web C & A™ User Notification Setup For Work Product Manager User Guide." Xacta Corporation (Jul. 12, 2001).

"Xacta Web C & A™ User Guide Version 3.3." Xacta Corporation (2002).

Baskerville, Richard. Dec. 1993. "Information Systems Security Design Methods: Implications for Information Systems Development." ACM Computing Surveys, vol. 25, No. 4, pp. 375–414.

Hulme, George V., "Discover Security Threats Faster," Information Week.com (Nov. 11, 2002).

International Preliminary Examination Report from PCT Application No. PCT/US02/09842 dated Apr. 11, 2003.

International Search Report from PCT Application No. PCT/US02/09842 dated Oct. 24, 2002.

International Search Report from PCT Application No. PCT/US03/37608 dated Jun. 9, 2004.

* cited by examiner

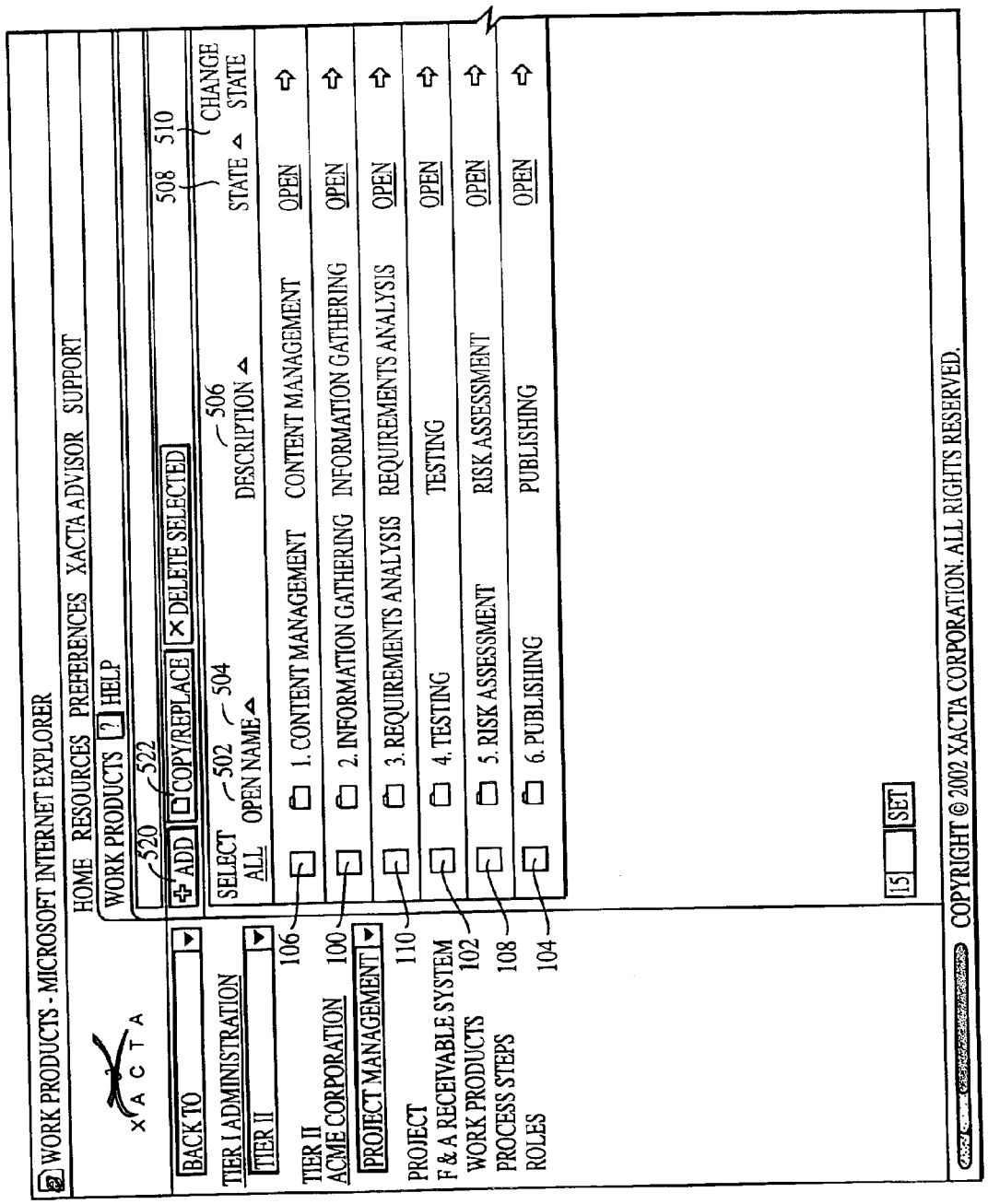
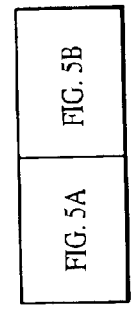
FIG. 5
FIG. 5A

| | GROUP | SUB-CATEGORY | SUB-SUB-CATEGORY |
|---|---|---|---|
| 1 | NATURAL DISASTER | FIRE | |
| 2 | | FLOOD | |
| 3 | | EARTHQUAKE | |
| 4 | | VOLCANO | |
| 5 | | TORNADO | |
| 6 | | LIGHTNING | |
| 7 | SYSTEM FAILURE | HARDWARE | |
| 8 | | POWER | |
| 9 | | COMMUNICATION LINK | |
| 10 | ENVIRONMENTAL FAILURE | TEMPERATURE | |
| 11 | | POWER | |
| 12 | | HUMIDITY | |
| 13 | | SAND/DUST | |
| 14 | | SHOCK/VIBRATION | |
| 15 | HUMAN UNINTENTIONAL | SOFTWARE DESIGN ERROR | |
| 16 | | SYSTEM DESIGN ERROR | |
| 17 | | OPERATOR ERROR | SYSTEM ADMINISTRATOR |
| 18 | | | REGULAR USER |
| 19 | | | MAINTENANCE PERSONNEL |
| 20 | HUMAN INTENTIONAL | AUTHORIZED PERSONNEL | SYSTEM ADMINISTRATORS |
| 21 | | | MAINTENANCE PERSONNEL |
| 22 | | | REGULAR USERS |
| 23 | | UNAUTHORIZED USERS | TERRORISTS |
| 24 | | | HACKERS |
| 25 | | | SABOTEURS |
| 26 | | | THIEVES |
| 27 | | | VANDALS |
| 28 | | PHYSICAL COMBAT | |
| 29 | | ELECTRONIC WARFARE | |

FIG. 23

EDIT BUCKET 'ANTIVIRUS PROTECTION' ? HELP

[SAVE] [RESET] [O CANCEL]

NAME*: ANTIVIRUS PROTECTION

DESCRIPTION: A UTILITY THAT SEARCHES A HARD DISK FOR VIRUSES AND REMOVES ANY THAT ARE FOUND. MOST ANTIVIRUS PROGRAMS INCLUDE AN AUTO-UPDATE FEATURE THAT ENABLES THE PROGRAM TO DOWNLOAD PROFILES OF NEW VIRUSES SO THAT IT CAN CHECK FOR THE NEW VIRUSES AS SOON AS THEY ARE DISCOVERED.

GROUP*: COMPUTER SOFTWARE SECURITY

SUBGROUP*: ANTIVRUS — 2302

WEIGHT*: MEDIUM

| NAME ⊕ | THREAT GROUP ⊕ | WEIGHT |
|---|---|---|
| HUMIDITY | ENVIRONMENT FAILURE | NEGLIGIBLE |
| POWER | ENVIRONMENT FAILURE | NEGLIGIBLE |
| SAND/DUST | ENVIRONMENT FAILURE | NEGLIGIBLE |
| TEMPERATURE | ENVIRONMENT FAILURE | NEGLIGIBLE |
| VIBRATION/SHOCK | ENVIRONMENT FAILURE | NEGLIGIBLE |
| ADMINISTRATIVE USER | HUMAN INTENTIONAL AUTHORIZED | HIGH |
| MAINTENANCE USER | HUMAN INTENTIONAL AUTHORIZED | HIGH |
| USER | HUMAN INTENTIONAL AUTHORIZED | HIGH |
| ELECTRONIC WARFARE | HUMAN INTENTIONAL UNAUTHORIZED | MEDIUM |
| HACKER | HUMAN INTENTIONAL UNAUTHORIZED | HIGH |
| PHYSICAL COMBAT | HUMAN INTENTIONAL UNAUTHORIZED | MEDIUM |
| SABOTEUR | HUMAN INTENTIONAL UNAUTHORIZED | HIGH |

2404 — 2402 (WEIGHT)

FIG. 24

| RISK OF REQUIREMENTS CATEGORY | RISK OF PROJECT | COMPOSITE RISK |
|---|---|---|
| NEGLIGIBLE | NEGLIGIBLE | NEGLIGIBLE |
| NEGLIGIBLE | LOW | NEGLIGIBLE |
| NEGLIGIBLE | MEDIUM-LOW | NEGLIGIBLE |
| NEGLIGIBLE | MEDIUM | NEGLIGIBLE |
| NEGLIGIBLE | MEDIUM-HIGH | LOW |
| NEGLIGIBLE | HIGH | LOW |
| LOW | NEGLIGIBLE | NEGLIGIBLE |
| LOW | LOW | LOW |
| LOW | MEDIUM-LOW | LOW |
| LOW | MEDIUM | MEDIUM-LOW |
| LOW | MEDIUM-HIGH | MEDIUM-LOW |
| LOW | HIGH | MEDIUM |
| MEDIUM-LOW | NEGLIGIBLE | NEGLIGIBLE |
| MEDIUM-LOW | LOW | LOW |
| MEDIUM-LOW | MEDIUM-LOW | LOW |
| MEDIUM-LOW | MEDIUM | MEDIUM-LOW |
| MEDIUM-LOW | MEDIUM-HIGH | MEDIUM |
| MEDIUM-LOW | HIGH | MEDIUM-HIGH |
| MEDIUM | NEGLIGIBLE | NEGLIGIBLE |
| MEDIUM | LOW | LOW |
| MEDIUM | MEDIUM-LOW | MEDIUM-LOW |
| MEDIUM | MEDIUM | MEDIUM |
| MEDIUM | MEDIUM-HIGH | MEDIUM-HIGH |
| MEDIUM | HIGH | HIGH |
| MEDIUM-HIGH | NEGLIGIBLE | LOW |
| MEDIUM-HIGH | LOW | MEDIUM-LOW |
| MEDIUM-HIGH | MEDIUM-LOW | MEDIUM |
| MEDIUM-HIGH | MEDIUM | MEDIUM-HIGH |
| MEDIUM-HIGH | MEDIUM-HIGH | HIGH |
| MEDIUM-HIGH | HIGH | HIGH |
| HIGH | NEGLIGIBLE | LOW |
| HIGH | LOW | MEDIUM |
| HIGH | MEDIUM-LOW | MEDIUM |
| HIGH | MEDIUM | MEDIUM-HIGH |
| HIGH | MEDIUM-HIGH | HIGH |
| HIGH | HIGH | HIGH |

FIG. 25A

% OF FAILURE TABLE — 2508

| RANGE | IMPORTANCE VALUE |
|---|---|
| 0 - 20 | 1 |
| 21 - 40 | 2 |
| 41 - 60 | 3 |
| 61 - 80 | 4 |
| 81 - 100 | 5 |

FIG. 25B

IMPORTANCE TABLE — 2510

| IMPORTANCE VALUE | ADJUSTED RISK |
|---|---|
| 1 | -2 |
| 2 | -1 |
| 3 | 0 |
| 4 | +1 |
| 5 | +2 |

FIG. 25C

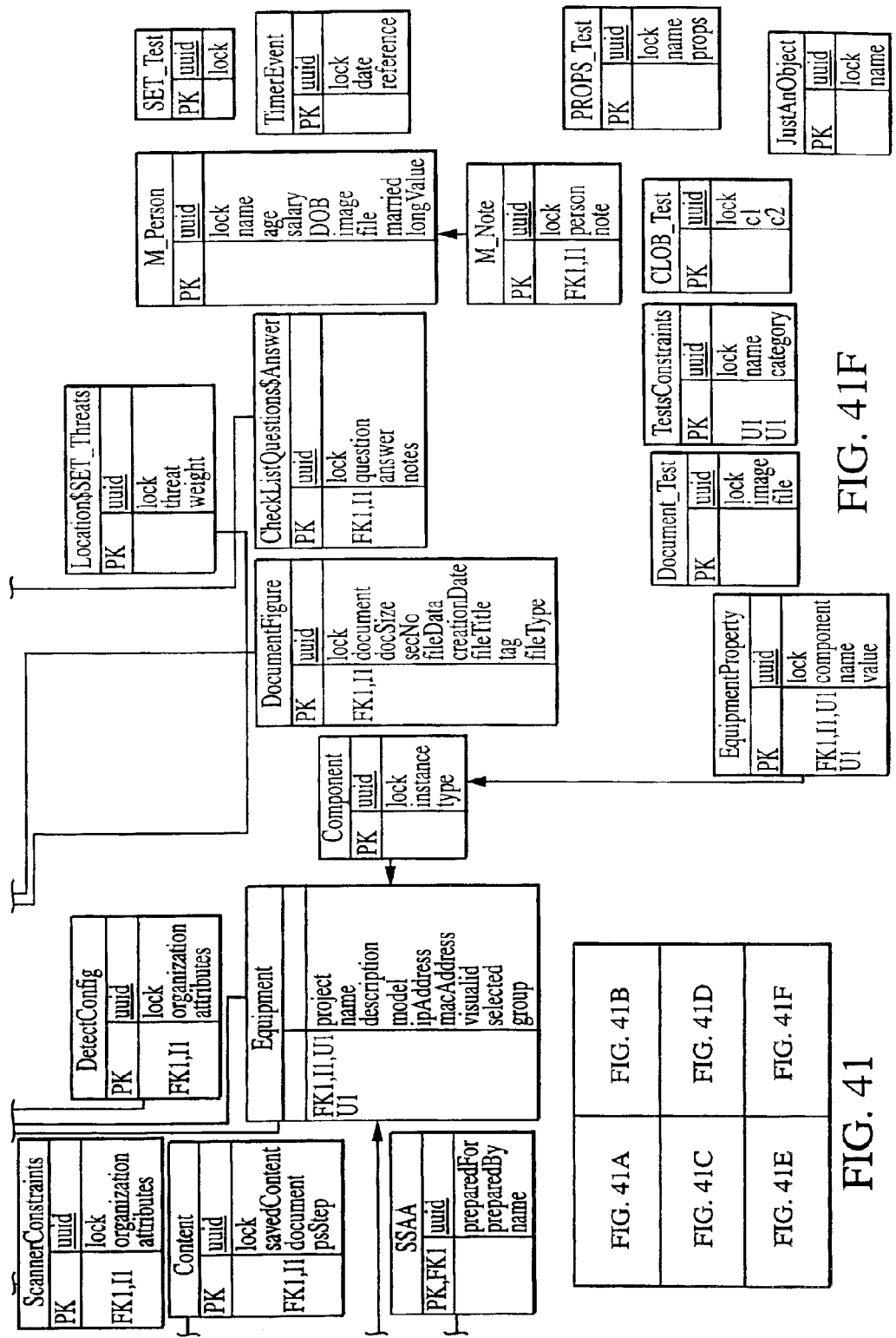

ENHANCED SYSTEM, METHOD AND MEDIUM FOR CERTIFYING AND ACCREDITING REQUIREMENTS COMPLIANCE UTILIZING CONTINUOUS RISK ASSESSMENT

RELATED APPLICATIONS

This application is related to the following applications, all of which are filed on the same date as this application, and all of which are assigned to the assignee of this application:

*Enhanced System, Method And Medium For Certifying And Accrediting Requirements Compliance Utilizing Robust Risk Assessment Model* (U.S. application Ser. No. 10/304,825); and

*Enhanced System, Method and Medium for Certifying and Accrediting Requirements Compliance Utilizing Threat Vulnerability Feed* (U.S. application Ser. No. 10/304,824).

AUTHORIZATION PURSUANT TO 37 C.F.R. 1.71(d) and 1.71(e)

A portion of the disclosure of the patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to the field of certification and accreditation (C&A) and, more particularly, to a computer-implemented system method and medium for C&A that enables users to tailor a sequence of requirements and/or activities that can be used to assess the risk of and/or determine the suitability of a target system to comply with at least one predefined standard, regulation and/or requirement.

2. Background Description

The general purpose of C&A is to certify that automated information systems, for example, adequately protect information in accordance with data sensitivity and/or classification levels. In accordance with Department of Defense (DoD) Instruction 5200.40, dated Dec. 30, 1997, entitled *DoD Information Technology Security Certification and Accreditation Process (DITSCAP)*, which is incorporated herein by reference in its entirety, certification can, for example, be defined as the comprehensive evaluation of the technical and non-technical features of an information technology (IT) system and other safeguards, made in support of the accreditation process, to establish the extent that a particular design and implementation meets a set of specified security requirements. Similarly, as used herein, accreditation can be defined as a formal declaration by a designated approving authority that an IT system is approved to operate in a particular security mode using a prescribed set of safeguards at an acceptable level of risk. In general, DISTSCAP is utilized by the DoD for identifying and documenting threats and vulnerabilities that pose risk to critical information systems. DITSCAP compliance generally means that security risk posture is considered acceptable and that potential liability for system "owners" is mitigated. As used herein, a threat can be considered any circumstance or event with the potential to cause harm to an information technology system in the form of, for example, destruction, disclosure, adverse modification of data, and/or denial of service. As used herein, a vulnerability can be considered a weakness in, for example, an information system, or cryptographic system, or components (e.g., system security procedures, hardware design, internal controls) thereof that could be exploited.

The C&A process typically involves a number of policies, regulations, guidelines, best practices, etc. that serve as C&A criteria. Conventionally, the C&A process is typically a labor intensive exercise that can require multiple skill sets over a period of time typically spanning 6–12 months. There can be, for example, several organizations and/or individuals that may be involved in the processes of selecting applicable standards, regulations and/or test procedures, and assembling test results and other information into a DITSCAP compliant package. There is therefore a need to substantially streamline and expedite the security C&A process in a manner that utilizes a robust risk assessment model, and substantially automates and enables a user to tailor a sequence of events that can be used, for example, to perform security risk assessments, certification test procedure development, system configuration guidance, and residual risk acceptance.

SUMMARY OF THE INVENTION

To address the deficiencies of conventional schemes as indicated above, the present invention provides a system, method and medium that substantially automates and provides users the ability to customize the security C&A process in a manner that enhances and facilitates security risk assessments, certification test procedure development, system configuration guidance, and/or residual risk acceptance.

In an exemplary embodiment, the C&A process can be automated in accordance with, for example, any of DoD's DITSCAP requirements, National Information Assurance Certification and Accreditation Process (NIACAP) requirements, Director of Central Intelligence Directives (DCID) (e.g., DCID 6/3), and British Standard/International Standards Organization (BS/ISO) 17799. The present invention is not, however, limited to these requirements/standards, applications and/or environments, and may also be used in conjunction with other government and civilian/private sector organizations requiring risk management and/or guidance.

One or more embodiments of the present invention contemplate automating, for example, at least the DITSCAP, NIACAP, DCIS and/or BS/ISO security processes, and are directed to six primary elements: 1) gathering information, 2) analyzing requirements, 3) testing requirements, 4) managing content; 5) performing risk assessment, and 6) generating certification documentation (based at least in part on an assessment of the first five elements) that includes information that enables an accreditation decision to be made.

One or more embodiments of the present invention also contemplate substantially automating (or can be used to substantially automate) the security C&A process for information technology based assets. A process is provided to determine target system vulnerability to each of one or more threats, and assess network and target system compliance with applicable regulations, standards, and/or industry best practices.

One or more embodiments of the present invention allow one or more users to define the network or target system configuration. This aspect of the present invention can be automated by a network discovery and scanning utility that identifies target system assets (e.g., workstation manufacturer and model, operating system and version), and inventories each hardware component, its associated operating system and software applications.

Once system configuration information has been gathered, the environment (e.g., secret, or top secret operating environment) in which the target system operates can be described. One or more embodiments of the present invention can automatically engage (or select) the appropriate security requirements (with which the system must or should comply) according to government and/or industry standards and best practices. Appropriate test procedures can also automatically be selected by the system corresponding to selected security requirements. The user can also manage the content (e.g., edit) of these requirements and/or input his/her own standards/regulations and/or additional requirements. The user can also manage the content (e.g., edit) of one or more test procedures by, for example, adding and/or deleting test procedures to those initially selected by the system, and/or by editing existing test procedures initially selected by the system.

Upon completion of testing and entering test results, the present invention can produce a risk assessment of the target system. In one or more embodiments contemplated by the present invention, the percentage of failed requirements within each requirements category, among other considerations, can be utilized to evaluate the risk level of the target system as a whole.

Then, documentation can be printed that includes information that enables an accreditation decision to be made. It should be understood that the precise sequence of the various steps mentioned above can be varied.

One or more embodiments of the present invention can also receive updates pertaining to recently discovered threats, and conduct a scan of network assets, each of which, alone or in combination, can be used to assess system risk posture and/or target system compliance with, for example, one or more requirements.

One or more embodiments of the present invention also provide predefined steps for executing a C&A. This aspect of the present invention provides users the ability customize one or more of the aforementioned six elements by, for example, selecting a portion of the predefined steps associated with each of one or more of the six elements.

Additional features of one or more embodiments pertain to automatically sending e-mail alerts upon, for example, the occurrence of certain C&A-related events, and a program management feature where one or more steps or events can be designated as being prerequisite to commencement of one or more other steps or events.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways.

BRIEF DESCRIPTION OF THE DRAWINGS

The Detailed Description can be understood when read with reference to the accompanying figures.

FIGS. 5, 5A, and 5B show an exemplary screen display corresponding an exemplary embodiment of the present invention as shown in FIG. 1, where FIG. 5A shows the left-hand side of FIG. 5 in detail and FIG. 5B shows the right-hand side of FIG. 5 in detail.

FIGS. 12, 12A, and 12B show an exemplary screen display used to generate a security requirements traceability matrix (SRTM), where FIG. 12A shows the left-hand side of FIG. 12 in detail and FIG. 12B shows the right-hand side of FIG. 12 in detail.

FIG. 17 is an exemplary screen display showing how a user can edit a regulation.

FIG. 23 is an exemplary screen display showing illustrative threat categories.

FIG. 24 is an exemplary screen display that enables a user to view the setting for a requirements category element, along with a default level of risk for each threat element.

FIGS. 25A, 25B, and 25C show exemplary risk tables that can be used to calculate target system risk.

FIGS. 41, 41A, 41B, 41C, 41D, 41E, and 41F show an exemplary entity relationship diagram that describes the attributes of entities and the relationship among them, where FIGS. 41A, 41B, 41C, 41D, 41E, and 41F show portions of FIG. 41 in detail.

DETAILED DESCRIPTION

Figure 1:
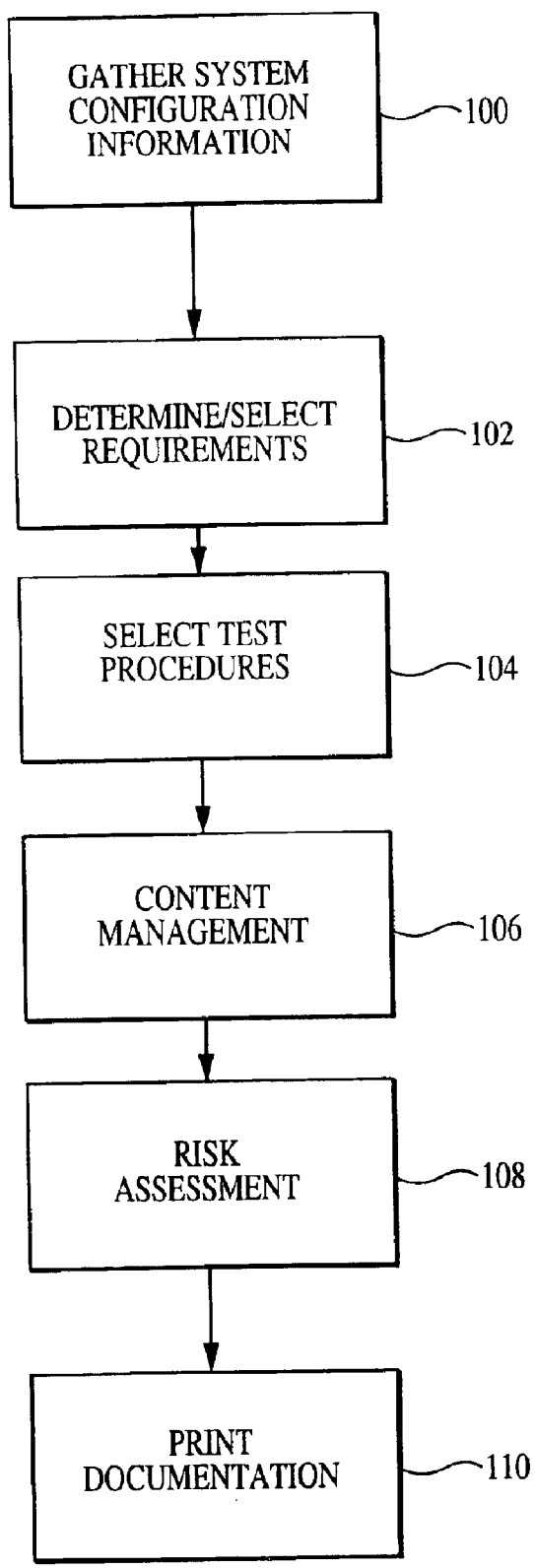
FIG. 1 is an exemplary high level flowchart of a method contemplated by at least some embodiments of the present invention.

Referring now to the drawings, and more particularly to FIG. 1, a high level flow diagram is shown that provides an overview of a method according to one or more embodiments of the present invention. In the first step, information is gathered pertaining to the system or network undergoing C&A, as indicated by step 100. The information gathered typically relates to a description of the system to be certified, and its respective components and operating environment (e.g., workstation manufacturer and model, operating system and version, secret, or top secret operating environment, etc.). One or more embodiments of the present invention also contemplate receiving updates pertaining to recently discovered threats, and can conduct a scan of network assets, each of which, alone or in combination, can be used to assess system risk posture and/or target system compliance with, for example, one or more requirements.

As indicated above, aspects of at least some embodiments of the present invention are described in accordance with DoD's DITSCAP requirements. In accordance with DITSCAP, and as used herein, risk can be defined as a combination of the likelihood that a threat will occur, the likelihood that a threat occurrence will result in an adverse impact, and the severity of the resulting impact. Also in accordance with DITSCAP, vulnerability can be defined as a weakness in, for example, an information system, a cryptographic system, and/or components thereof (e.g., system security procedures, hardware design, internal controls) that could be exploited. As used herein, susceptibility can be defined, for example, as the potential (e.g., zero or some finite possibility) that a vulnerability exists on the system.

However, it should be understood that such description is only by way of example, and that the present invention contemplates use with regard to any number of types of requirements or environments (e.g., NIACAP, DCID and/or BS/ISO requirements or processes). In addition, within its use with regard to DITSCAP requirements, it should be understood that many of the various aspects and selection options are also exemplary, as is the fact that information is shown as being entered via a screen display. Further information pertaining to the system and method according to the present invention can be found in the following document: *Xacta WEB C&A*™ User's Guide, Version 3.3, Copyright 2002, available from Xacta Corporation, Ashburn, Va. A copy of this document is incorporated herein by reference in its entirety.

The requirements analysis generally involves selecting (by a human and/or some automated procedure) a list of standards and/or regulations (or portions thereof) that the system must, or should, comply with, as indicated by step 102. Selection of additional standards/regulations and/or requirements by a user is also contemplated. At least some embodiments of the present invention also contemplate automatically displaying/listing each requirement. The requirement(s) can be displayed, for example, in the form of a security requirements traceability matrix (SRTM) (as shown, for example, in FIG. 12). As known to those skilled in the art, a SRTM can be used to trace project lifecycle (e.g., from identification through implementation) activities (e.g., testing requirements) and/or tasks to the project requirements, and can generally be derived from the selected set of standards and/or regulations with which the system must comply. A SRTM can thus be used to ensure that project objectives and/or requirements are satisfied and/or completed.

Once information is gathered 100 and the requirements to be complied with (as identified, for example, in requirements analysis 102) are provided, the system can intelligently select a set of test procedures (against which the system can be tested), as is indicated by step 104. The test procedures are selected in a manner so that successful completion of the test procedures can render the system undergoing C&A to satisfy the SRTM requirements. Additionally, the user can customize one or more test procedures by, for example, adding, editing and/or deleting test requirements.

At step 106, the user can (continue to) add, delete and/or edit requirements selected at step 102 and/or test procedures selected at step 104. That is, the user can add, delete and/or edit requirements selected at step 102 and/or test procedures selected at step 104 during performance of these steps, as well as subsequent to these steps upon, for example, receiving a new or updated test procedure and/or a new or updated requirement. The user can edit selected requirements and/or test procedures by using, for example, a conventional display monitor.

Upon completion of testing, the risk assessment step, as indicated by step 108, involves assessing for each requirement failure (should any exist) the vulnerability of the system, as well as the level of the threat as determined by the information gathered. The present invention provides a scheme whereby system vulnerabilities can be continuously assessed by considering newly discovered threats, and updating test requirements and procedures to account for such threats. One ore more target systems can then be tested against the threats in accordance with updated test procedures that account for such threats.

The risk assessment 108 provides as output an estimate of the risk level for each requirement category. Each failed requirement within a requirement category is collectively considered and used to evaluate the risk level of the system as a whole. Then, documentation can be printed 110 that includes information pertaining to the first five elements that would enable an accreditation decision (manual or automated) to be made based on the inputs and outputs respectively provided and generated in steps 100, 102, 104, 106, and/or 108. Each step shown in FIG. 1 (i.e., 100, 102, 104, 106, 108 and 110) will be discussed in further detail herein.

Figure 2:
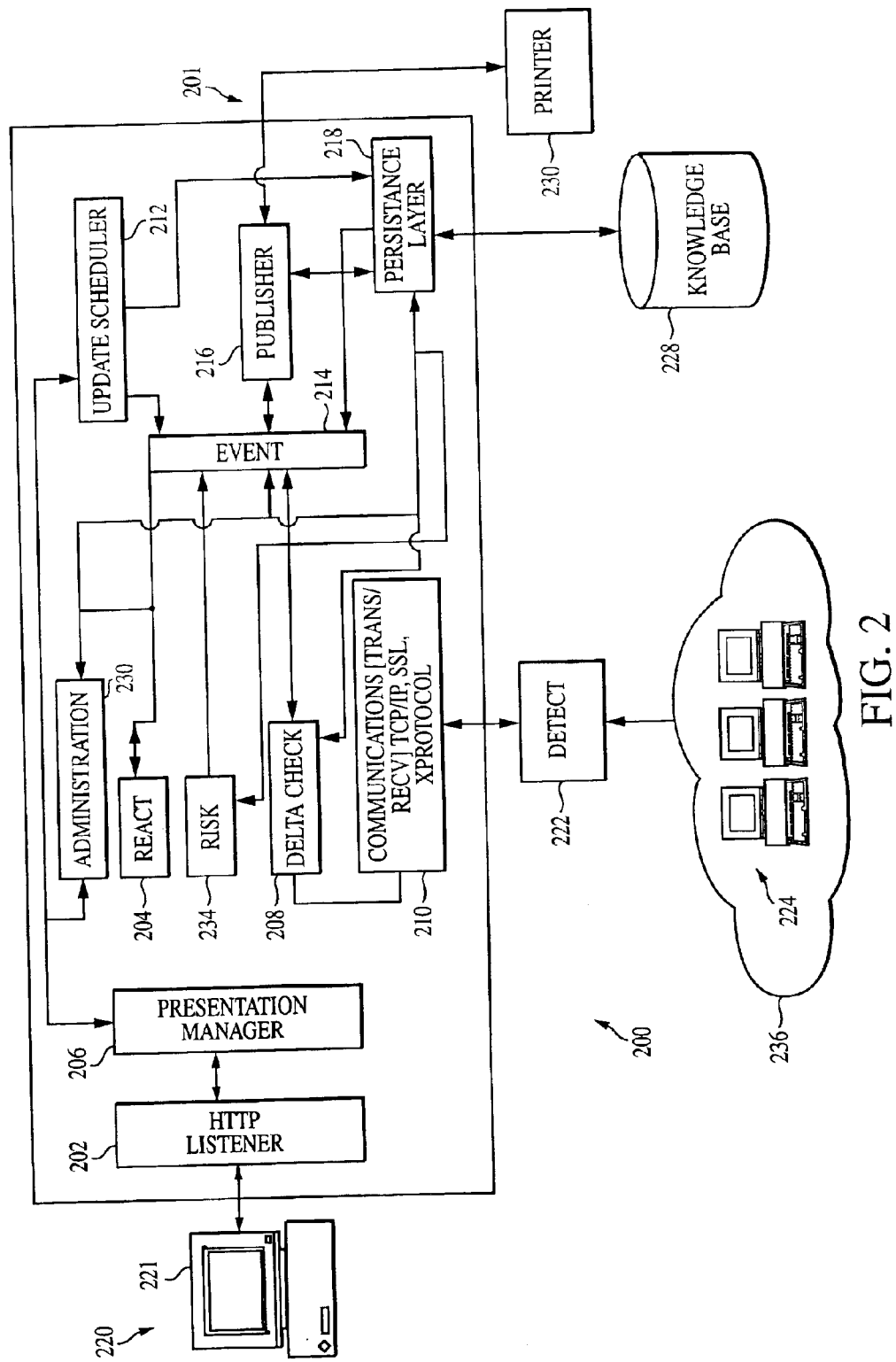
FIG. 2 is an exemplary architecture of a system contemplated by at least some embodiments of the present invention.

FIG. 2 is an exemplary architecture of a system 200 in accordance with at least some embodiments of the present invention. Additional features pertaining to FIG. 2 will be discussed in connection with subsequent figures. System 200 comprises assessment module 201, detect module 222, knowledge base 228, publisher 230, and hosts 224. Hosts 224 represent any of one or more hosts (e.g., computers, monitors, routers, printers, and the like, within network 236). A host generally should (or is required to) comply with one or more selected security requirements, and be tested to determine compliance with such requirement(s). That is, hosts 224 can be (or can be part of) the target system being tested (for, e.g., subsequent accreditation).

One or more screen displays (not shown) can be provided that enable a user to describe and store the identification of hosts 224 that may be associated with, for example, network 236. In addition, a user can also specify hosts 224 that are within the network, but are outside of the accreditation boundary (i.e., not included in the accreditation). This category might include such equipment/services as, for example, a domain naming service (DNS) used to translate the host names to IP addresses. The DNS might not be part of the atomic system being accredited, but is required for most communication activities. The following exemplary fields can be provided in an exemplary screen display: Accreditation Boundary Name (a name associated with the external system component), and Accreditation Boundary Description (a detailed description of the external system component, which can include the function that this component/service provides the system being accredited and its relationship to the system).

Within assessment module 201, event module 214 communicates with react module 204, risk module 234, delta check module 208, update scheduler 212, publisher 216, persistence layer 218, and administration module 230 to accept, monitor and/or coordinate events between the various modules. Event module 214 can be implemented, for example, as a conventional queue to process the various inputs and outputs shown.

One or more computing devices 220 (e.g., a conventional personal computer) can be provided that interface with assessment module 201 by way of a conventional HyperText Transport Protocol (HTTP) listener 202 which, in turn, can communicate with presentation manager 206. Presentation manager 206 coordinates and manages presentation of the various screen displays provided by, for example, react module 204 and/or risk module 234 that can be displayed on a conventional display monitor 221 associated with computing device 220.

Presentation manager 206 can communicate with, for example, update scheduler 212, which allows users (using, for example, computing device 220) to make appropriate settings that enable update scheduler 212 to receive new threats and/or test package updates that can be stored, for example, in knowledge base 228. Test package updates can be utilized to determine the degree of compliance with (or how susceptible hosts 224 are) to any newly detected threats. Knowledge base 228 will also receive updated regulations and requirements. These documentation changes, in conjunction with recently discovered changes to the equipment inventory/configuration of hosts 224, can be used to update a project test matrix (e.g., a list of test procedures that can be used to assess compliance of hosts 224 with one or more requirements and/or regulations). Changes to the project test matrix can be used to update the level of risk associated with individual risk elements, and the overall risk profile of the project.

Presentation manager 206 can also communicate with administration module 230 to, for example, update test procedures in knowledge base 228. Administrative module 230 facilitates communication between presentation manager 206 and persistence layer 218. Persistence layer 218 can be used, for example, to facilitate adding new requirements, editing existing requirements, adding a new test procedure and/or editing an existing test procedure to (or within) knowledge base 228. Persistence layer 218 can communicate with event module 214 which, in turn can, for example, notify react module 204 to alert an analyst that a new test is to be conducted.

Similarly, administration module 230 can communicate with event module 214 when, for example, a user changes times for the automated reexamination of the hardware and/or software configuration of host 224. In this case, event module 214 can notify delta check module 208 to activate detect module 222 by using communications module 210. Delta check module 208 can communicate with detect module 222 at specified (e.g., predetermined) intervals. Detect module 222 can search for new equipment (not shown) within network 236. When a run of Detect module 222 is complete, test procedures, test results, risk elements, and risk levels, are updated in knowledge base 228, as appropriate. For example, target system risk can be appropriately updated to indicate that the target system has not been tested for compliance with a newly discovered threat (having or exposing a corresponding target system vulnerability). Similarly, system risk can be appropriately updated to indicate that the system has been tested for compliance with a newly detected threat.

Update scheduler 212 can also generate events related to user notifications. As will be discussed herein, react module 204 can send, for example, an e-mail to one or more project personnel notifying them that, for example, a new test must (or should) be completed to ensure that (a newly detected) system configuration complies with (newly detected or updated) regulations or requirements.

In one or more embodiments of the present invention, and as will be discussed herein in further detail, detect engine 222 utilizes (or accesses) several network detections mechanisms or protocols to detect changes in host 224 configuration. Computing device 220 can be used to facilitate configuration of the various operational controls and settings of the detect module 222.

Once test results have been entered and stored in knowledge base 228, risk module 234 can be used to conduct a risk assessment (as will be discussed herein) of individual requirement categories, as well as of a target system as a whole (e.g., hosts 234). Upon completion of the risk assessment, publisher module 216 can use printer 230 to print (publish) at least a portion of a report indicating outcomes and/or risk profile of the tested target system.

Figure 3:
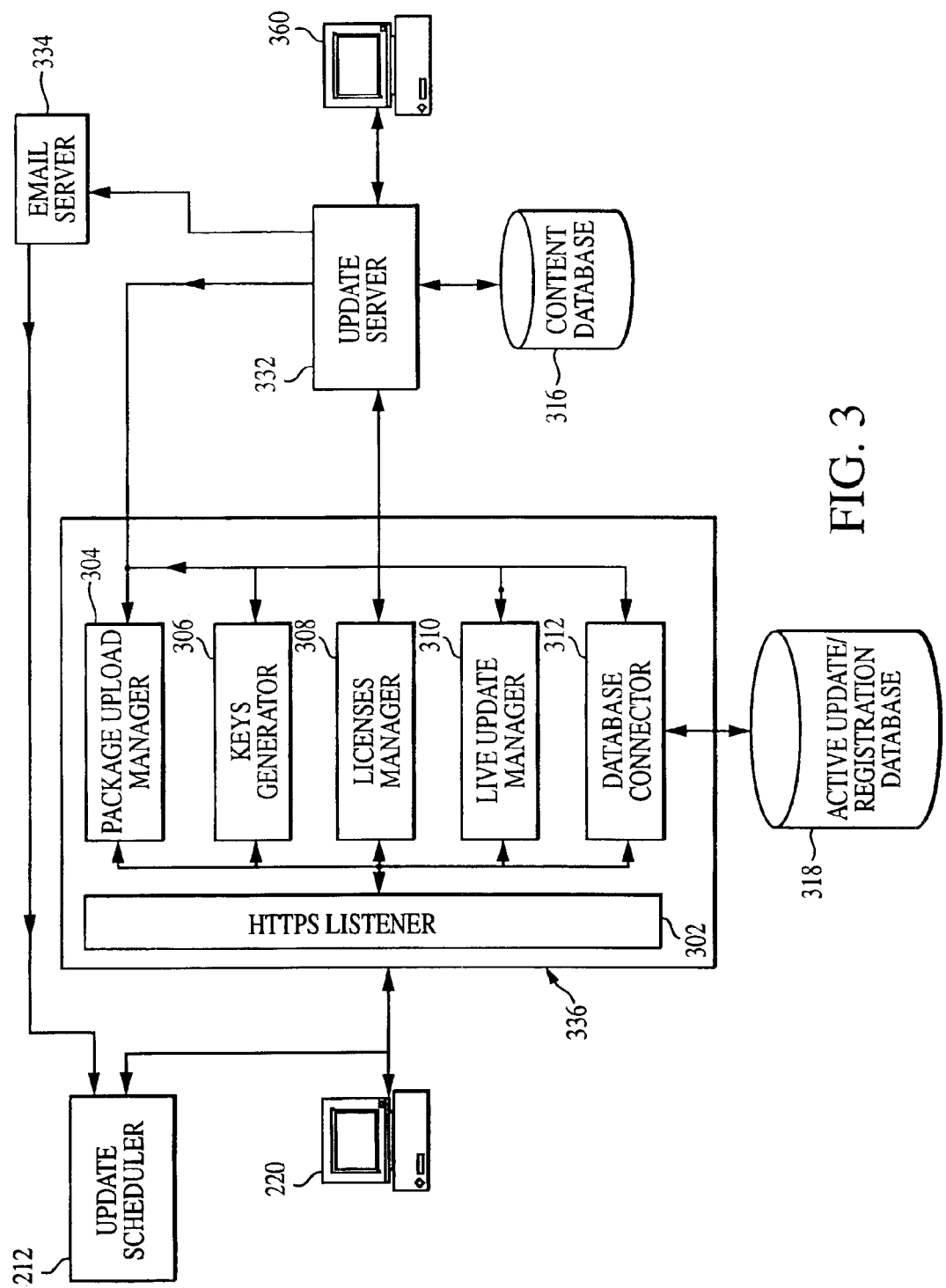
FIG. 3 is an exemplary architecture contemplated by at least some embodiments of the present invention that can be used to provide vulnerability updates.

FIG. 3 is an exemplary architecture contemplated by at least some embodiments of the present invention that can be used to provide vulnerability updates. As shown in FIG. 3, update scheduler 212 can receive updates from registration server 336 and/or from e-mail server 234. Update server 332 is a master repository that can include known threats, including any recently discovered threats. When update server 332 receives an indication that a new threat has been discovered, content database 316 is updated to reflect any newly discovered threats. Such threats can be entered manually (by, e.g., computing device 360) into content database 316, or by way of a network connection (not shown).

In one or more embodiments of the present invention, update server 332 can notify e-mail server 234 that one or more new threats have been discovered. Any new updates threats, regulations, and the like, can also be transmitted in the e-mail. In addition, a user can access registration server 336 to request update packages (e.g., new test procedures that can test for new system vulnerabilities) from update server 332.

Registration server 336 can verify user credentials, and verify, for example, that a user has a paid and updated subscription to receive updates from content database 316. With regard to registration server 336, package upload manager 304 can receive manual updates (e.g., by a floppy drive or CD-ROM drive) of test procedures, regulations, and the like, stored in content database 316. Live update manager 310 can receive updates from update server 332 by, for example, a network connection. Keys generator 306 generates keys (e.g., passwords) for client (user) use to receive updates from update server 332. In at least some embodiments contemplated by the present invention, users are provided with a generated key that can be typed into a field within a display screen shown on display monitor 221 to receive updates from content database 316. Licenses manager 308 adds authorized-user data to registration database 318. Project upload manager 304, keys generator 306, licenses manager 308, and live update manager 310 provide information to registration database 318 by using database connector 312 which can provide, for example, protocol conversions and/or data normalization between the respective modules and registration database 318.

A user using a computing device 220 can access a HyperText Transport Protocol Secure (HTTPS) (or an HTTP) listener 302 to receive the latest vulnerabilities and revised test procedures and requirements from content database 316. In particular, after accessing HTTPS listener 302, licenses manager 308 will verify user privileges, and live update manager will access content management server 314 to transmit the latest vulnerabilities and revised test procedures and requirements to update scheduler 212.

Referring back to FIG. 2, update scheduler 212, using persistence layer 218, updates affected test procedures, requirements, and/or regulations in knowledge base 228, as appropriate, to reflect any new threats to which a target system (e.g., hosts 224) may be vulnerable. In addition, event module 214 can notify react module 204 of the update. In turn, react module 204 can inform, for example, affected users (e.g., analysts, administrators and/or data entry personnel) by way of administration module 230, presentation manager 206, HTTP listener 202, and browser 220. Users can then direct that another assessment of hosts 224 be performed by, for example, detect module 222. Computing device 360 can be used to, for example, manually update content database to ensure that test procedures, regulations, and the like, are updated to account for any newly discovered threats.

Figure 4:
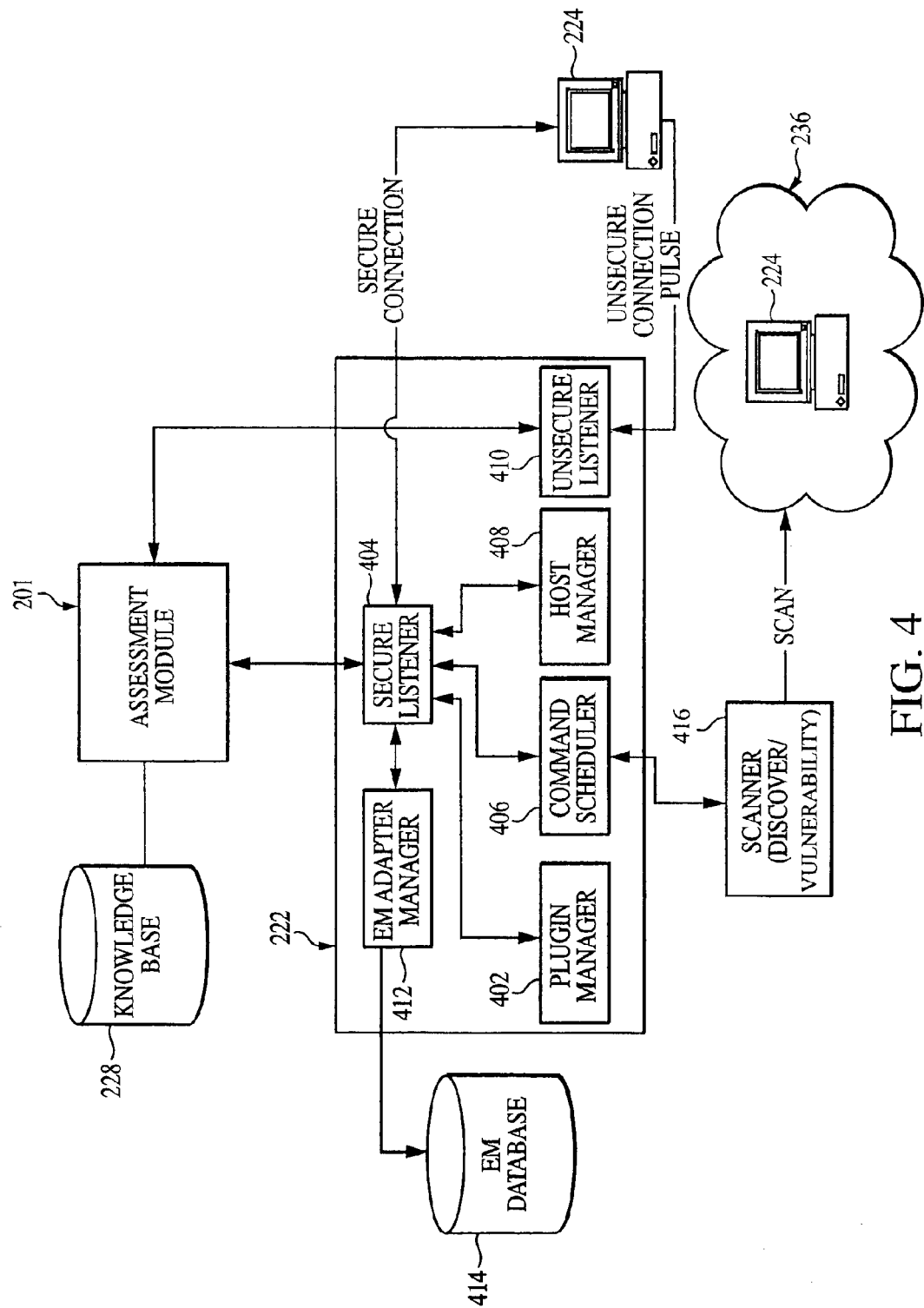
FIG. 4 is an exemplary architecture contemplated by at least some embodiments of the present invention that can be used to scan a target system.

FIG. 4 shows aspects of detect module 222. Referring now to FIG. 4, and as contemplated by one or more embodiments of the present invention, assessment module 201 can communicate with detect module 222 by way of secure listener 404 and unsecure listener 410. When assessment module 201 indicates that a scan of a network 228 is to be performed, secure listener 404 communicates with command scheduler 406 to determine whether host(s) 224 within network 236 are to be directly scanned (by, e.g., "pinging" hosts), or whether host configuration can be obtained from an enterprise management (EM) database containing host 228 configuration data.

If command scheduler 406 indicates that host configuration data is to be obtained from EM database 414, host 224 configuration data is transmitted from EM database 414, to EM adapter manager 412, which is configured to read the particular database configuration of EM database 414. EM adapter manager 412 transmits host 224 configuration data to secure listener 404 which, in turn, transmits that data to assessment module 201 for subsequent storage in knowledge base 228.

In scanning the network 236, plug-in manager 402, which can store known vulnerabilities, instructs scanner 416 to determine if a host 224 is susceptible to one or more vulnerabilities defined in plug-in manager 402. Vulnerabilities can be updated and/or added after they are received by update server 332.

Host manager 408 maintains a list of hosts 224 known to assessment module 201. Hosts 224 recognized by assessment module can communicate with detect module 232 by using an unsecured connection. Host(s) 224 can pulse unsecured listener 410 to indicate presence, and determine whether host(s) 224 should transmit, for example, configuration data to detect module 222. In the event that assessment module 201 determines that host(s) 224 should transmit configuration data to detect module 222, communication is established, and configuration information is transmitted, between secure listener 404 and host(s) 224.

Figure 5B:
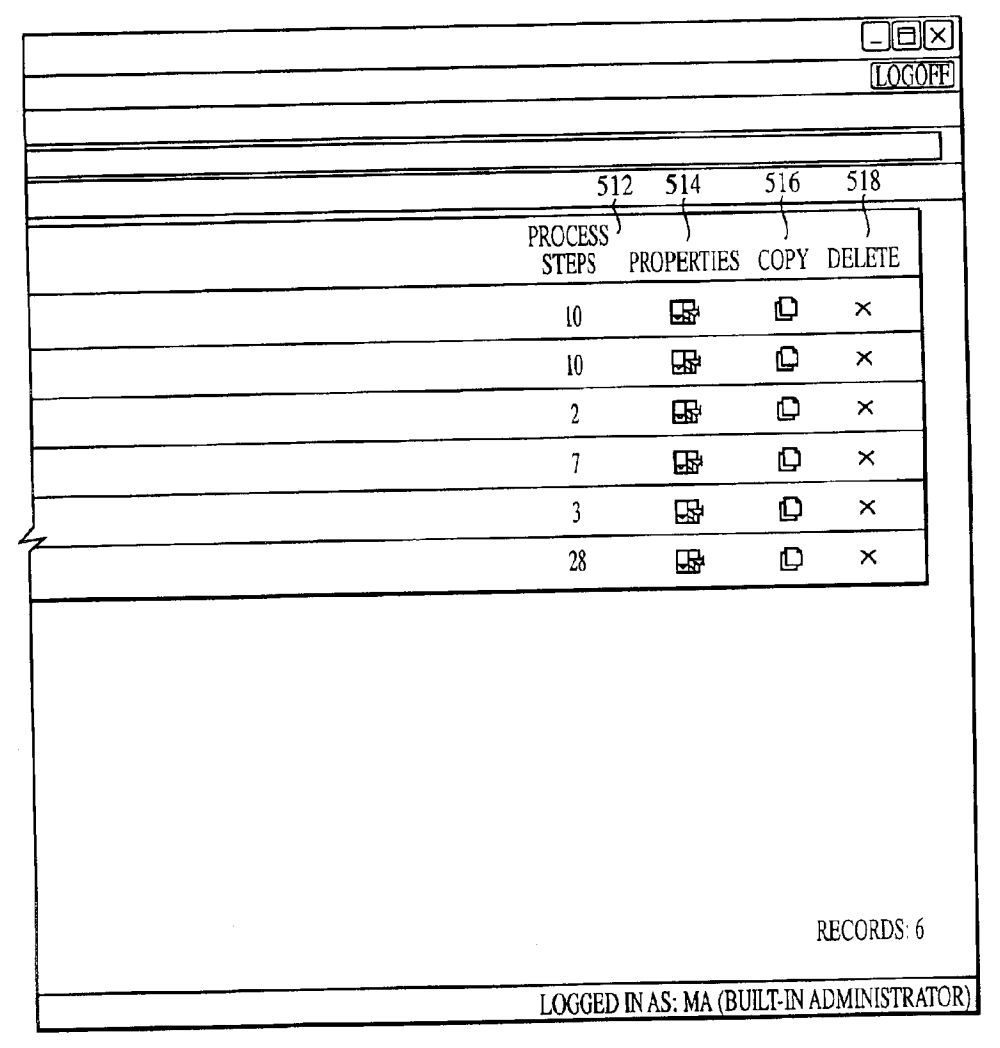

FIGS. 5, 5A, and 5B show an exemplary screen display corresponding to the steps (100, 102, 104, 106, 108, 110) provided in FIG. 1, where FIG. 5A shows the left-hand side of FIG. 5 in detail and FIG. 5B shows the right-hand side of FIG. 5 in detail. Because FIGS. 5A and 5B show portions of FIG. 5 in detail. FIGS. 5, 5A, and 5B will be referred to below as FIG. 5, and elements within any one of those FIGs. will be referred to as being within FIG. 5. By clicking on an icon under Open column 502, the corresponding task under the Name column 504 will be opened. Process Steps column 502 indicates the number of screen displays currently associated with a respective task. Description column 506 can be utilized to provide text describing the name of a task. State column 508 indicates whether a task is opened or closed. To change the state, a user can click on a corresponding forward arrow icon under Change State column 510. By clicking on an icon under Properties column 514, a screen display such as shown in FIG. 34, associated with a corresponding task under Name column 504, can be opened. By clicking on an icon under Copy column 516, a user can copy a task (to the same project) to, for example, edit data and/or see how new information can impact workflow (discussed with regard to FIGS. 31–36). By clicking on an icon under Delete column 518, a user can delete a task from the project. By clicking Add icon 520, a user can add a task from another project into the existing project (shown in FIG. 5). By clicking on Copy/Replace icon 522, a user can copy a task from another project into the existing project, and replace a task of the existing project.

Information Gathering

Figure 6:
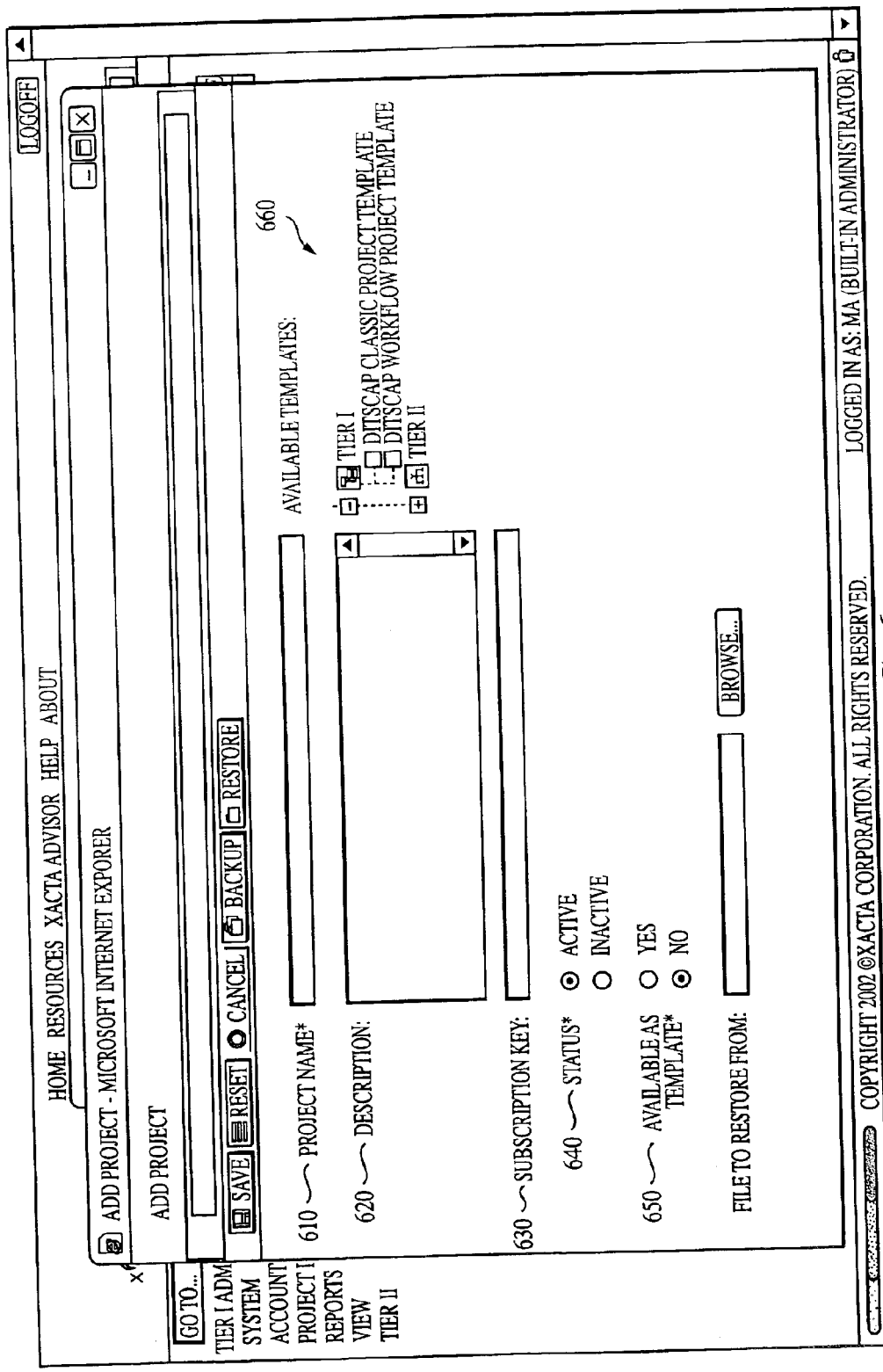
FIG. 6 shows an exemplary screen display that enables a user to add a new project.

FIGS. 6–10 show selected exemplary screen displays of the information gathering 100 process. Specifically, FIG. 6 shows a display that enables a user to add a new project. Fields such as Project Name* 610, Description: 620, and Subscription Key: 630 can be provided as being part of the project definition. The asterisk (*), for example, can be utilized in the various screen displays of the present invention to indicate to the user that data entry is mandatory. The Project Name* 610 field enables a user to enter a name for a project. The Description: field 620 can be used to provide a detailed description of the project (e.g., mission statement, function, features, and/or capabilities of the system being accredited). Subscription Key: 630 can be used, for example, to identify an organization and store and/or associate user access rights to a project 610.

Via the Status* selector 640, a user can designate whether the project is Active or Inactive. In accordance with at least some embodiments of the present invention, users can access at least a portion of one or more projects to which they have been granted user rights, whereas users (other than, for example, a system administrator) would not be granted access to any portion of a project having an inactive status. If a user selects the Available As Template* 650, the current project 610 can be copied and used as the baseline for another project. In such as case, the project name entered in Project Name* field 630 would, when selected by a user, appear under (or within), for example, the Tier I and/or Tier II templates 660. As used herein, a Tier I user means that the user is generally entitled to access and provide data with respect to each site of a multiple site accreditation. A Tier II user means that the user is generally entitled to access and provide data with respect to a single site of a multiple site accreditation.

Figure 7:
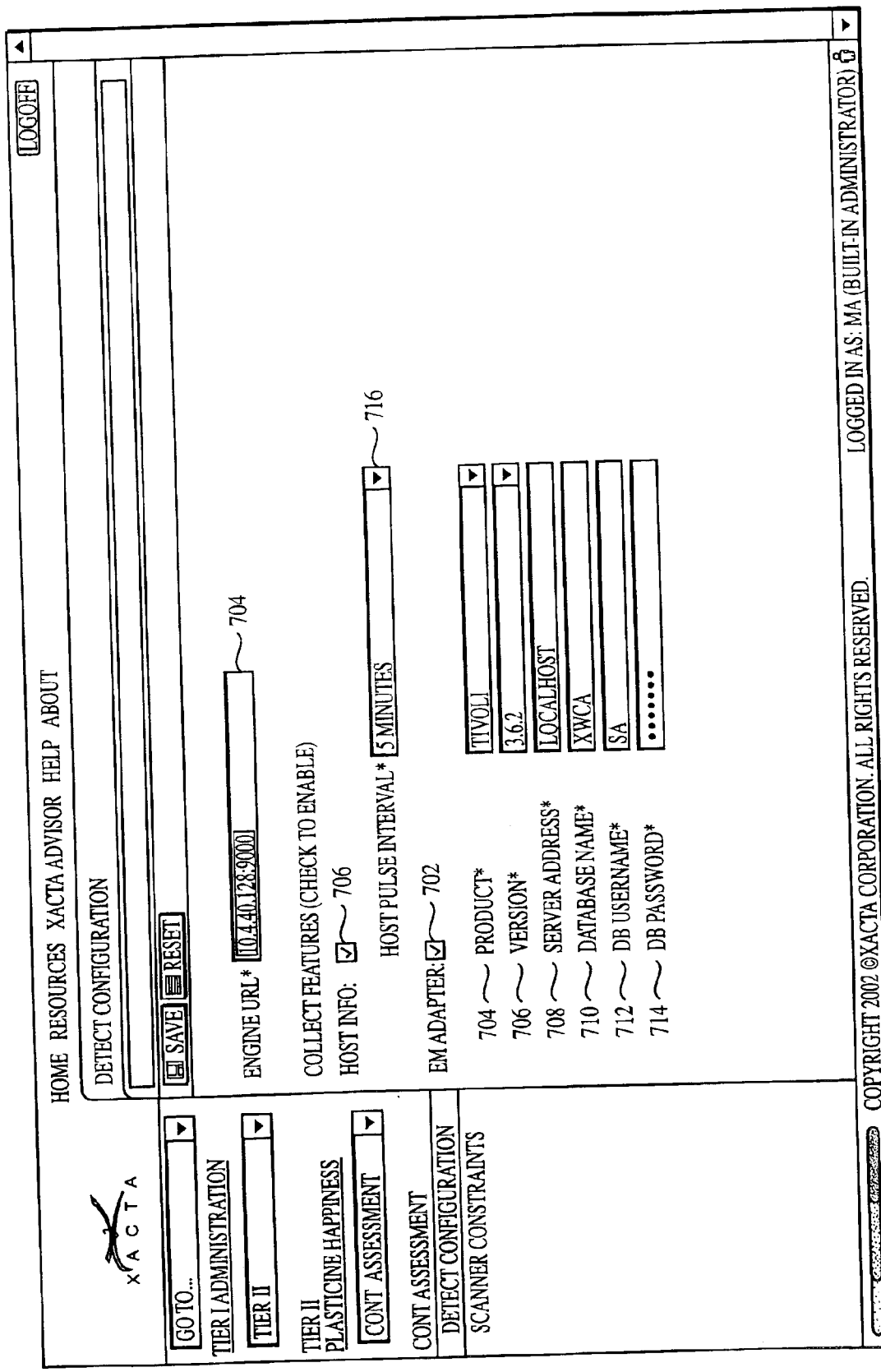
FIG. 7 is an exemplary screen display that enables a user to specify settings to detect network hosts by, for example, using an enterprise management system.

FIG. 7 is an exemplary screen display enabling a user to specify settings to detect network hosts by way of an enterprise management (EM) system. As discussed with regard to FIG. 4, the present invention can utilize an EM system to detect host configurations within a network. In Engine URL* field 704, a user specifies the URL of detect engine 222. To activate the EM option, a user can check EM Adapter: box 702, and supply appropriate information in the shown Product* 704, Version* 706, Server Address* 708, Database Name* 710, DB username* 712, and DB password* 714 fields that enable detect engine 222 to communicate with EM database 414 by way of a server (not shown) associated with EM database 414. Host Info: box 706 can be selected to enable the Host Pulse Interval: (of, for example, host 224) to be selected by using pulldown menu 716.

Figure 8:
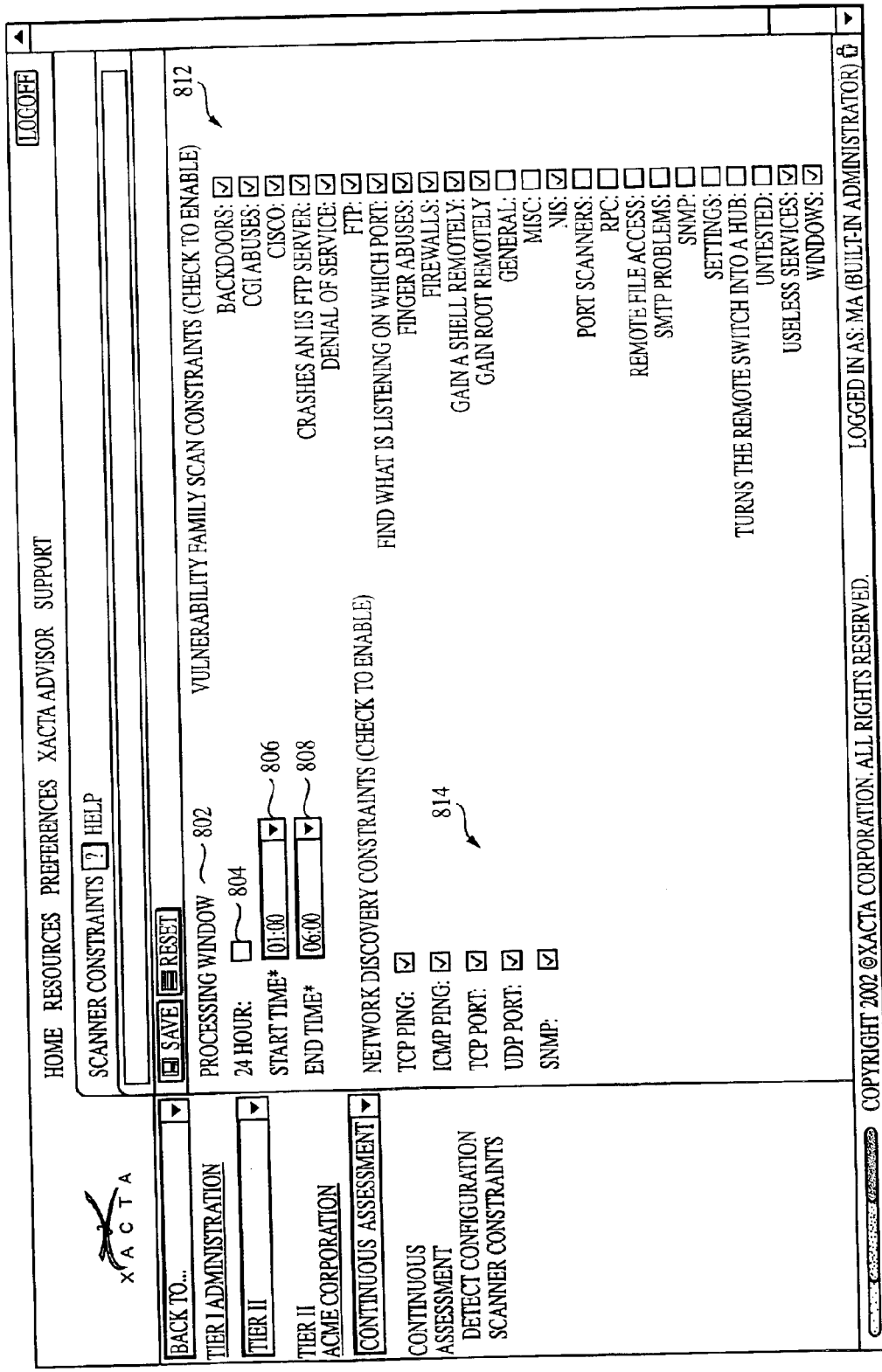
FIG. 8 is an exemplary project definition screen display showing a constraint setting that can be used or specified in an automated assessment of a target system configuration.

FIG. 8 is an exemplary project definition screen display showing how scanner constraints can be specified. In Processing Window 802, a user (e.g., a project administrator) can specify whether the scanner can operate anytime by checking the 24 hour: box 804, or during specified times, by utilizing the Start Time* 806 and End Time* 808 pulldown menus. One or more conventional techniques 814 (e.g., TCP (Transmission Control Protocol) Ping, TCP Port, UDP (User Datagram Protocol) Port, SNMP (Simple Network Management Protocol), and ICMP (Internet Control Message Protocol) Ping) can be used to permit scanning of the network 236. In addition, a user can specify which vulnerabilities can be scanned (or tested) for by checking appropriate boxes within Vulnerability Family Scan Constraints 812.

Figure 9:
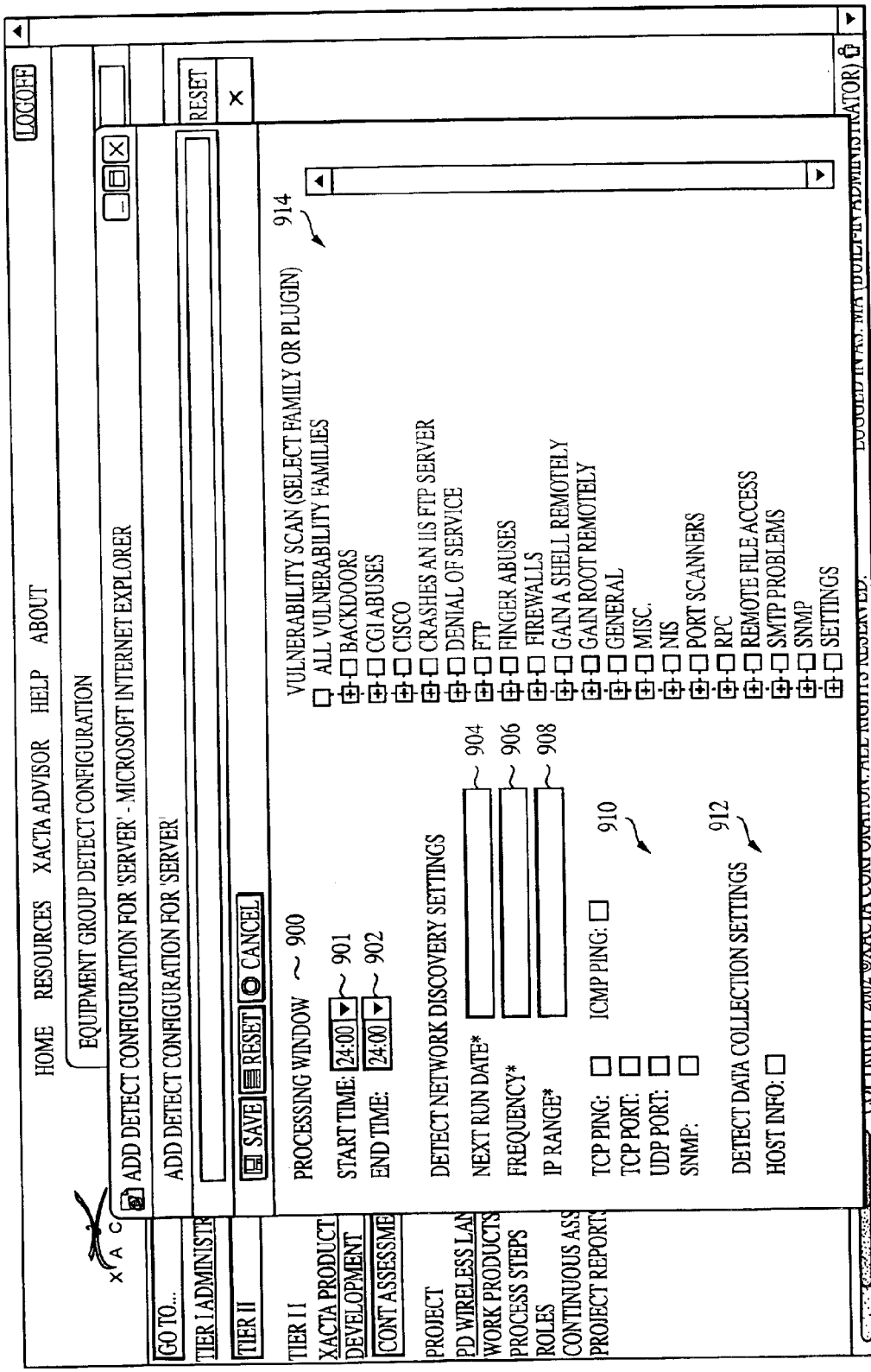
FIG. 9 is an exemplary project definition screen display showing settings that can be used in an automated assessment of a target system configuration.

Once constraints have been specified (as discussed with regard to FIG. 8), a user can access an exemplary screen display such as shown in FIG. 9 to specify network discovery settings. As shown at Processing Window 900, Start Time: 901 and an End Time: 902 are both set to 24:00, indicating that the 24 hour box 804 has been selected. Start Time: 901 and End Time: 902 could also be determined or bounded by respective values entered at 806, 808, respectively.

A user can also specify how often a network 236 is to be scanned. For example, in Frequency* field 906, a user can specify that a network 228 is to be scanned, for example, to every n days. The Next Run Date* field 904 will indicate the next day that the network is to be scanned. Numbers other than 15 can also be utilized. A range of IP addresses to search for in EM database 414 can also be specified in IP Range* field 908.

A user can also specify that the network is to be scanned by using one or more conventional techniques 910 (e.g., TCP Ping, TCP Port, UDP Port, SNMP, and ICMP Ping), as each technique was enabled at display section 814. Host Info: box 912 can be activated to indicate that hardware and/or software configuration information is to be obtained from hosts 226 within the range of IP addresses specified in field 808.

Figure 10:
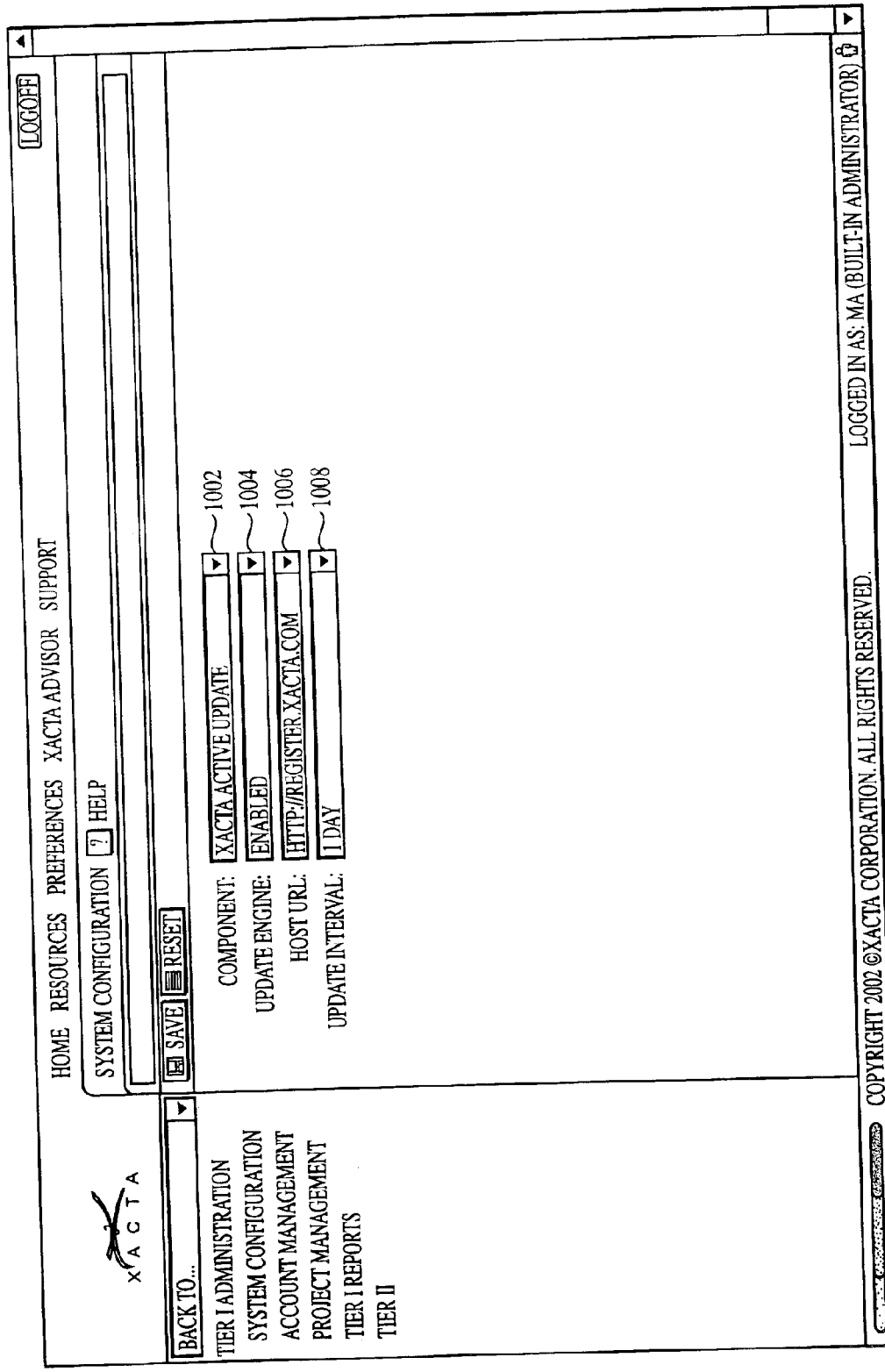
FIG. 10 is an exemplary project definition screen display showing user selection of vulnerability feed settings.

FIG. 10 is an exemplary project definition screen display showing user selection of vulnerability feed settings. As discussed with regard to FIG. 2, when newly discovered threats are received, they can be inserted into knowledge base 228, and compared against the current hardware and software configuration of hosts 224 within the network 236. Users can then be notified, for example, as to which hosts 224 or host components (e.g., an operating system of a particular host or hosts) may be susceptible to the new threat.

Component: pulldown menu 1002 is set to Vulnerability Feed, and Update Engine: pulldown menu 1004 (corresponding to update server 334) is set to Enabled. Host URL: 1006 corresponds to the URL of registration server 336. Update Interval: menu 1008 indicates the update frequency provided by registration server 318.

When update server 332 (corresponding to vulnerability feed engine) is enabled, vulnerabilities and newly discovered threats to which the target system (e.g., hosts) are exposed are received from update server 332. Knowledge base 228 can then be updated to reflect such newly discovered threats and attendant vulnerabilities. As will be discussed herein, react module 204 can notify a user when new vulnerabilities arrive.

In another screen display (not shown), vulnerability updates can be sent to e-mail server 334. The name of the e-mail server, type of e-mail server (e.g., Post Office Protocol (POP), Internet Message Access Protocol (IMAP)), security settings, mail checking interval, and the like can be specified in fields (not shown) similar to that shown in FIG. 10.

Requirements Analysis

Figure 11:
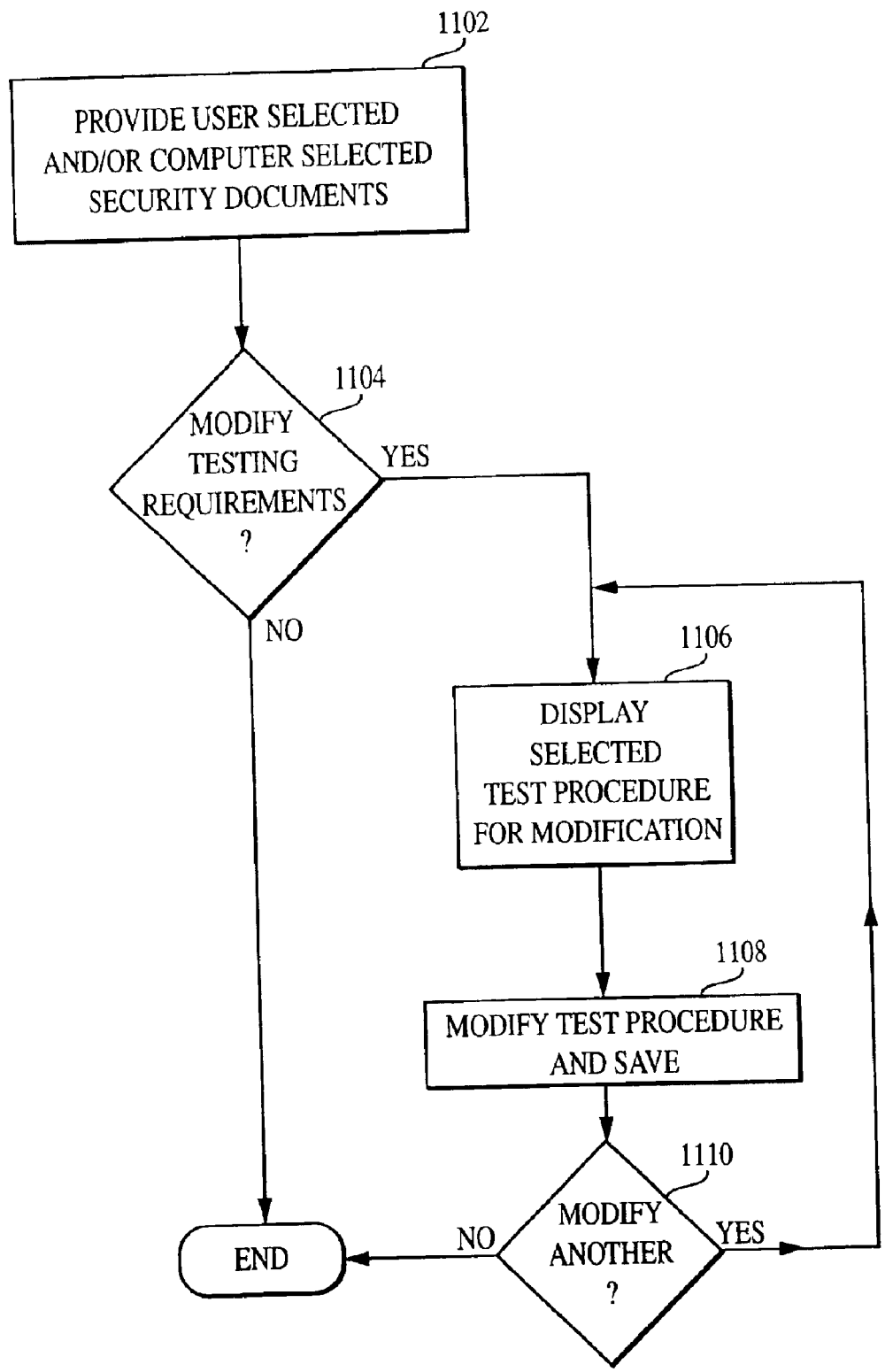
FIG. 11 is an exemplary flow chart of the requirements analysis process as contemplated by at least some embodiments of the present invention.

The system configuration captured in step 100 of FIG. 1 is used as input for the determination of the requirements indicated by step 102. The process of editing and/or determining/selecting those requirements is shown in FIG. 11.

In an exemplary embodiment, a general purpose computer on which one or more embodiments of the present invention operates will have stored thereon or have access to a repository (e.g., knowledge base 228) of security regulations and test procedures from various government and/or civilian departments, agencies, organizations, etc. (e.g., such as those from DITSCAP). At step 1102, and based at least in part on the information entered in step 100, pertinent regulations will be selected from this repository, upon which to build a security requirement traceability matrix (SRTM) for the C&A.

Figure 12A:
Figure 12:
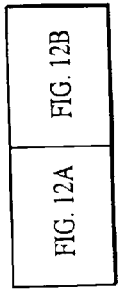
Figure 12B:
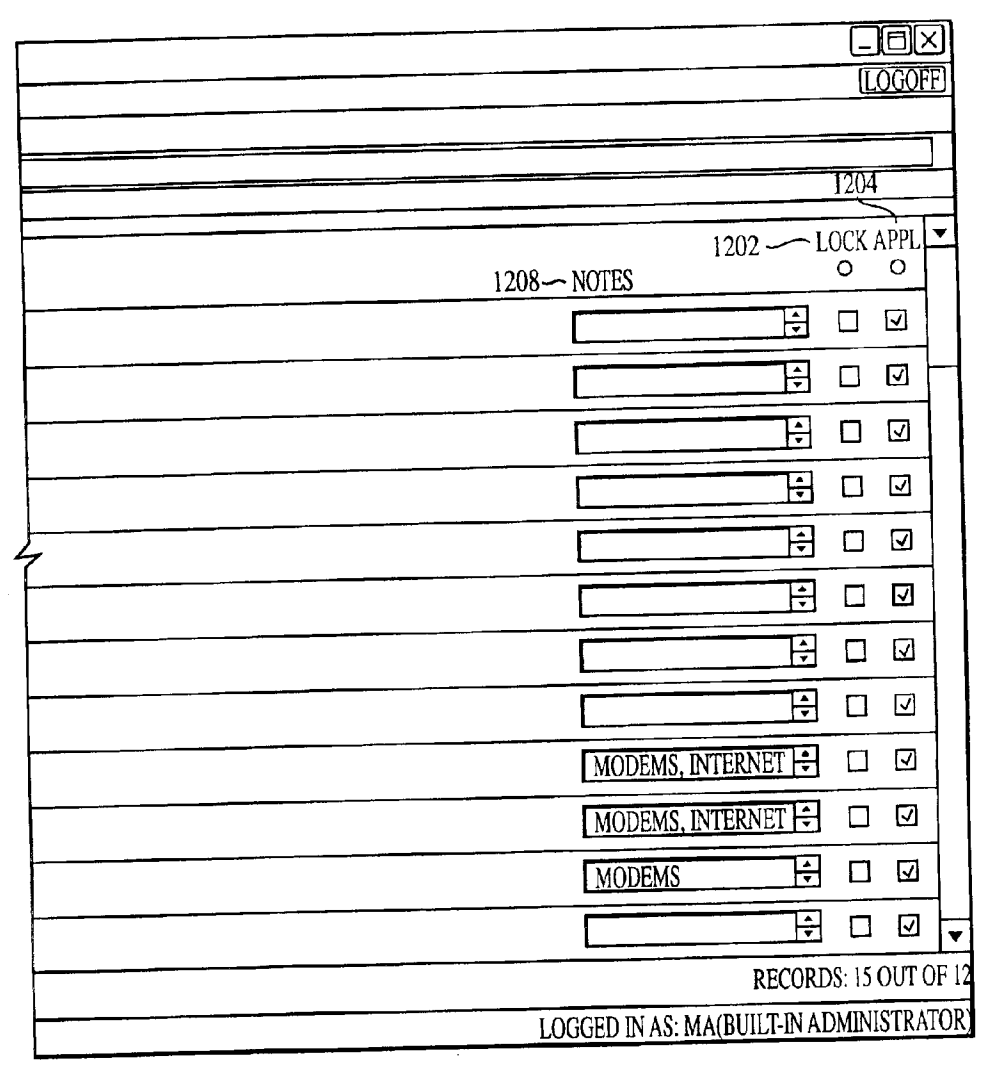
Figure 13:
FIG. 13 is an exemplary screen display that can be used to collect system requirements and/or operating environment.

An exemplary SRTM is shown in FIGS. 12, 12A, and 12B, where FIG. 12A shows the left-hand side of FIG. 12 in detail and FIG. 12B shows the right-hand side of FIG. 12 in detail. Because FIGS. 12A and 12B show portions of FIG. 12 in detail, FIGS. 12, 12A, and 12B will be referred to below as FIG. 12, and elements within any one of those FIGs. will be referred to as being within FIG. 12. The exemplary SRTM shown in FIG. 12 can be a mapping of one or more requirements 1206 (e.g., a paragraph 1208 within a requirement 1206) to a regulation 1210. Satisfactory completion of the respective requirements is generally considered to render the regulation satisfied. However, the user has the flexibility to view and modify 1104 the SRTM as desired to meet the specific needs of the system(s) being accredited. In one or more embodiments, when an Applicable box 1204 is checked, a user can be presented with questions (e.g., as shown in FIG. 13) which when answered, can be used to automatically generate a SRTM (as shown in FIG. 12). When a Lock box 1202 is checked, Applicability box 1204 remains checked or unchecked, as the case may be, regardless of subsequent SRTM-related questions answered (such as shown in FIG. 13).

Figure 14:
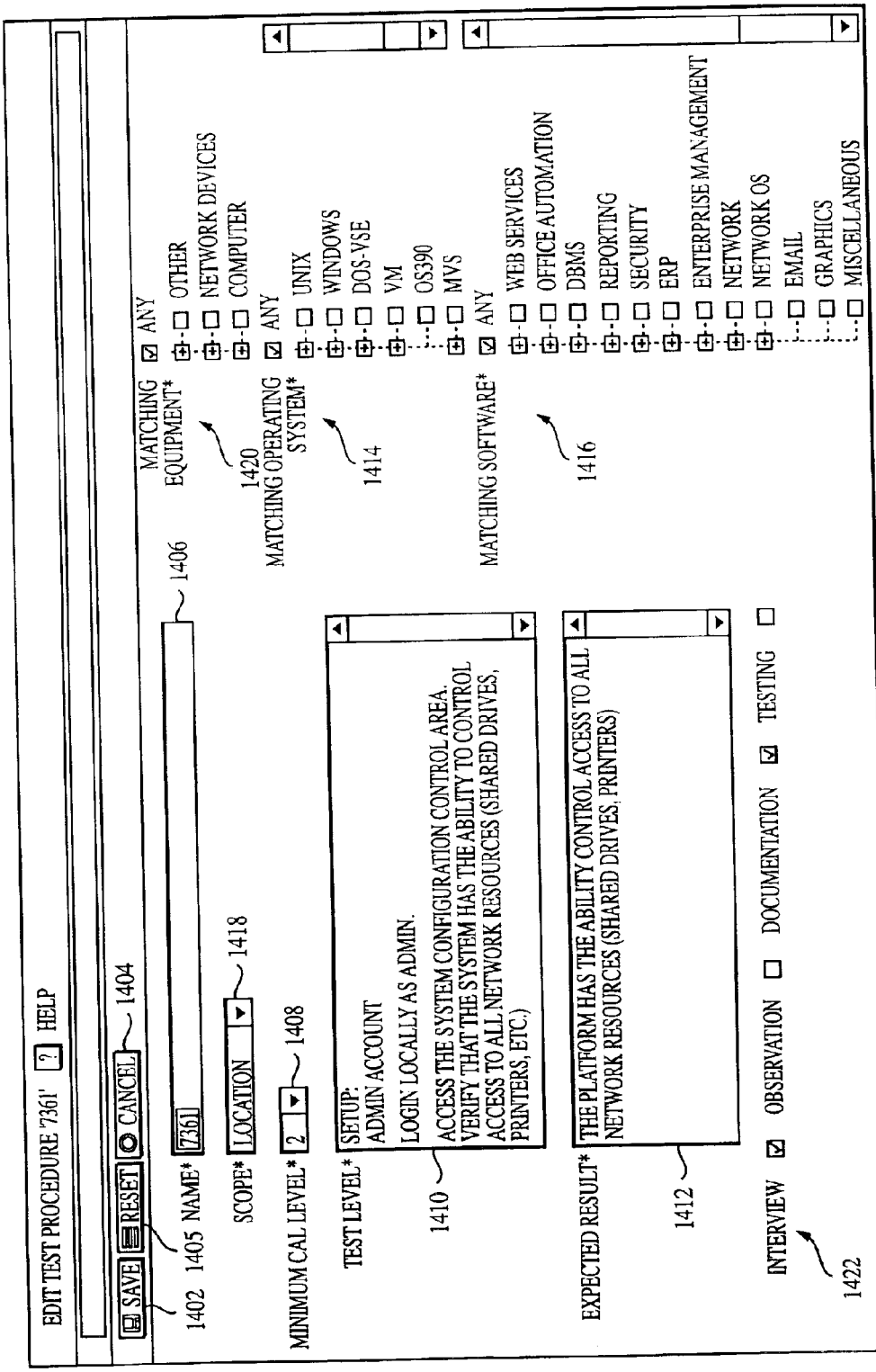
FIG. 14 is an exemplary screen display showing how a test procedure can be edited.

At step 1106, and as shown in FIG. 14, a user can display and edit one or more of the test procedures associated with a SRTM requirement 1206. By using folder menu 1414, a user can associate an operating system with the test procedure. By using folder menu 1416, a user can associate installed software with the test procedure being edited. Similarly, by using folder menu 1420, a user can associate equipment with the test procedure being edited. The user can then modify and save the revised test procedure 1108 by, for example, clicking Save button 1402. The user can then either end the editing process by, for example, clicking Cancel button 1404, or continue to modify another test procedure 1110 by, for example, typing a designator for another test procedure in Name* field 1406. When clicked, Reset button will reset the display to its initial (e.g., default) condition.

Still referring to FIG. 14, Scope: pulldown menu 1418 refers to the locations at which testing can occur. Using Minimum CAL Level* field 1408, a user can specify a certification and accreditation level (CAL) associated with a particular process, standard or procedure (e.g., DITSCAP). Test Text* field 1410 displays the text of the particular test procedure being edited. Expected Result* field 1412 indicates the expected result (after testing). Finally, area 1422 indicates the method of testing (e.g., by observation, documentation and/or actual testing).

Testing

Figure 15:
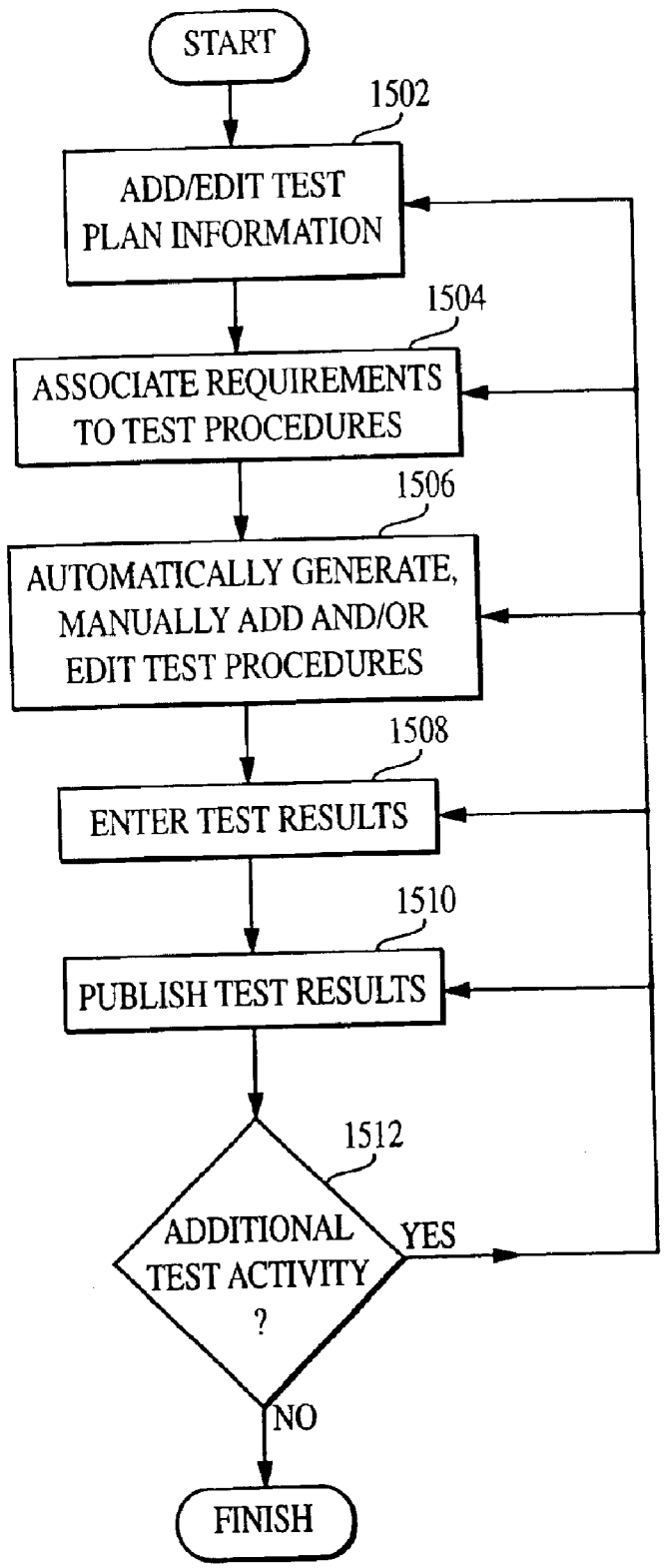
FIG. 15 is an exemplary screen display illustrating how a user can associate a test procedure(s) with one or more requirements.

With the security requirements traceability matrix in place (a portion of which is illustratively shown in FIG. 12), the user proceeds to the testing step 104. In one or more embodiments of the present invention, user interfaces will be provided, in accordance with the steps shown in FIG. 15, for the user to: a) add and/or edit test plan information 1502, b) associate requirements to test procedures 1504, c) add and/or edit test procedures 1406, d) enter test results 1508, and/or e) publish test results 1510. Any of the above steps can be repeated as needed, as indicated in decision step 1512.

With regard to step 1508, test results can also be automatically entered into test procedures, without human input. For example, suppose a requirement exists that user passwords be at least eight characters in length. If detect module 222 scans a network 236 and determines that one or more user passwords are less than eight characters in length, detect module 222 could automatically enter (by using communications module 210, and persistence layer 218) into an applicable test procedure stored in knowledge base 228 that the test procedure (and therefore one or more associated requirements) has not been satisfied.

With regard to step 1502, a screen display (not shown) can be provided for a user to enter information such as: an expected date of a test, the planned location of the test, test resources required, test personnel required, and remarks. Step 1502 can also be performed with printing documentation at step 110.

Figure 16:
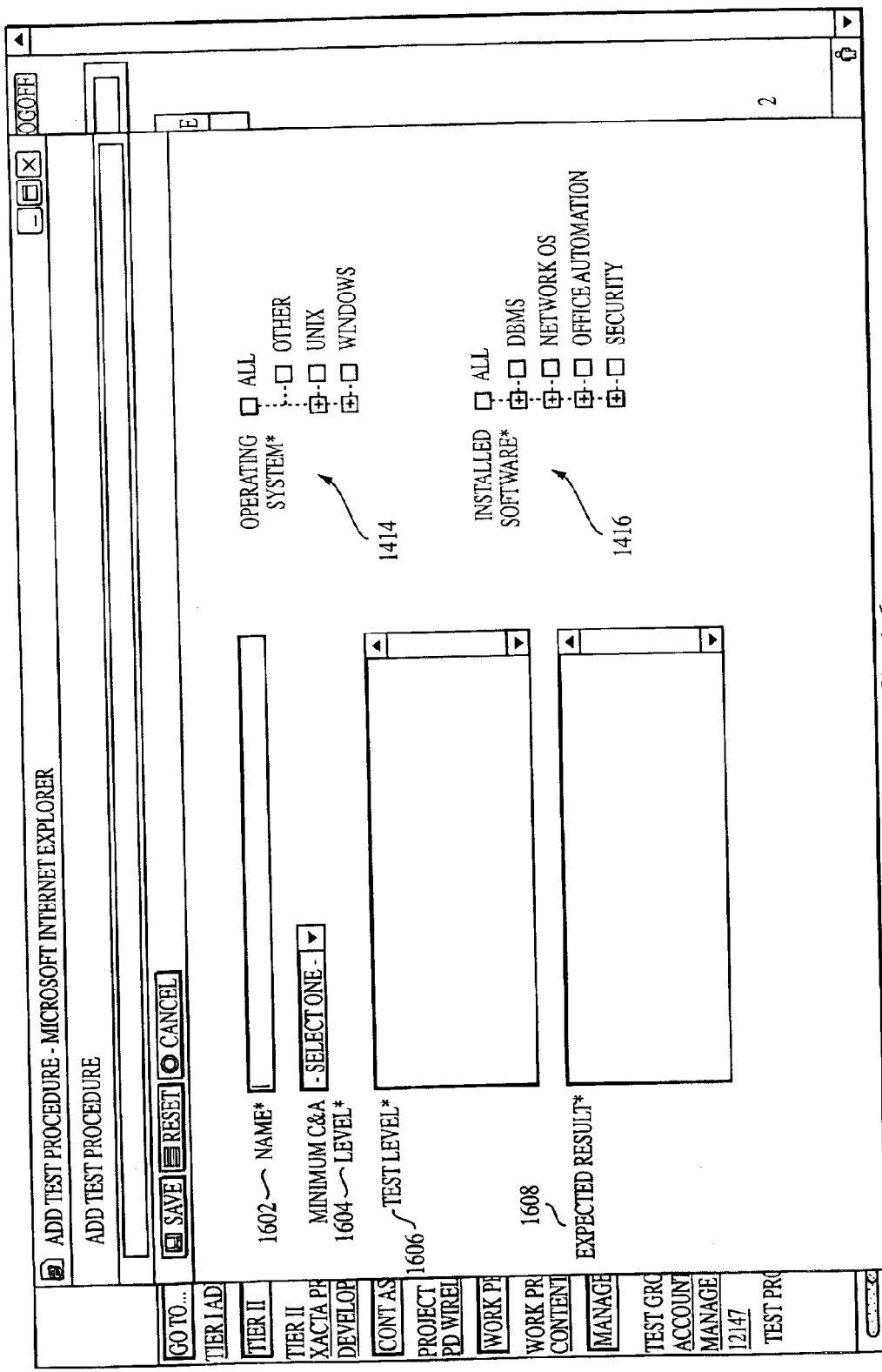
FIG. 16 is an exemplary screen display showing how a user can add a test procedure.

In accordance with step 1504, a user via a screen display (not shown) can also select a test procedure to associate it with at least one requirement selected. That is, each requirement will have one or more test procedures associated with it to ensure that compliance with the requirement has been tested. A user can, for example, by using a screen display, select a source requirements document, and associate the source requirement document with one or more test procedures. Using a screen display such as shown in FIG. 16, a user can also create a new test procedure. The exemplary input fields on the screen are: Name*, 1602, Minimum C&A Level* 1604, Test Text* 1606, and Expected Result* 1608. Folder menus 1414 and 1416 can be used as discussed with regard to FIG. 14.

After the user enters the respective test procedure information into a form presented on a new menu (not shown), the user can save the procedure(s) and associate the newly created procedure(s) with a requirement (as described above). Saving the test procedure can also be done at content management step 106.

One or more embodiments of the present invention also contemplate that tests can be edited in accordance with step 1506 by using a screen similar to that of FIG. 14. The exemplary input fields on the screen are: Name*, 1406, Minimum C&A Level* 1408, Test Text* 1410, and Expected Result* 1412.

One or more embodiments of the present invention also contemplate that test procedures can be intelligently selected by the present invention for the C&A at hand by using, for example, the system information specified in step 100 and the requirements analysis step 102. As discussed above in the context of the SRTM, one or more test procedures within the test procedure database can be mapped to, linked with, and/or otherwise associated with each of the individual requirements within each respective requirement 1206.

A user can also enter test results by using a display screen (not shown) similar to that of FIGS. 14 and 16. For example, a Results field can be provided that allows the user to enter the test result (e.g., pass or fail). A Tester field can be provided that enables the tester to provide his name, and a Date field can be provided that allows a user to enter the date(s) that the test was conducted on. Finally, a Notes field can be provided that allows a user to enter any notes or remarks pertaining to the test.

Content Management

Figure 17:
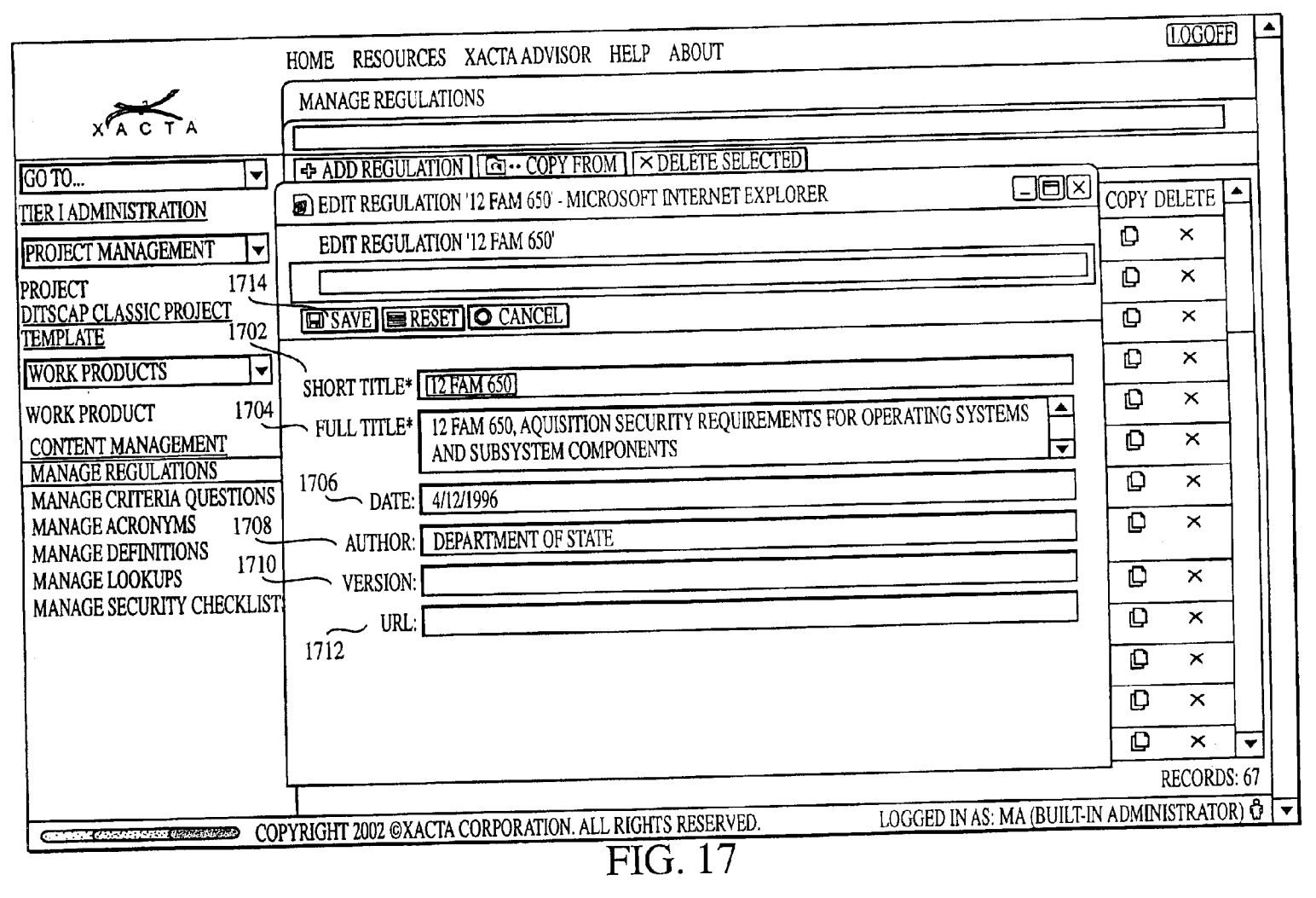

As indicated at step 106, the system 200 also enables a user to manage the content of, for example, various regulations, criteria questions, acronyms, definitions, lookups, security checklists, and the like. For example, FIG. 17 is an exemplary display that enables a user to edit a regulation. The user can edit the Short Title* 1702 and Full Title* of the regulation. In addition, a user can edit or modify the Date: 1707 (e.g., publication date), Author: 1708 (or, e.g., responsible organization), Version: 1710, and URL: 1712 for the regulation (if applicable). After editing, Save button 1714 can be activated to save any changes made to any of the aforementioned fields.

Figure 18:
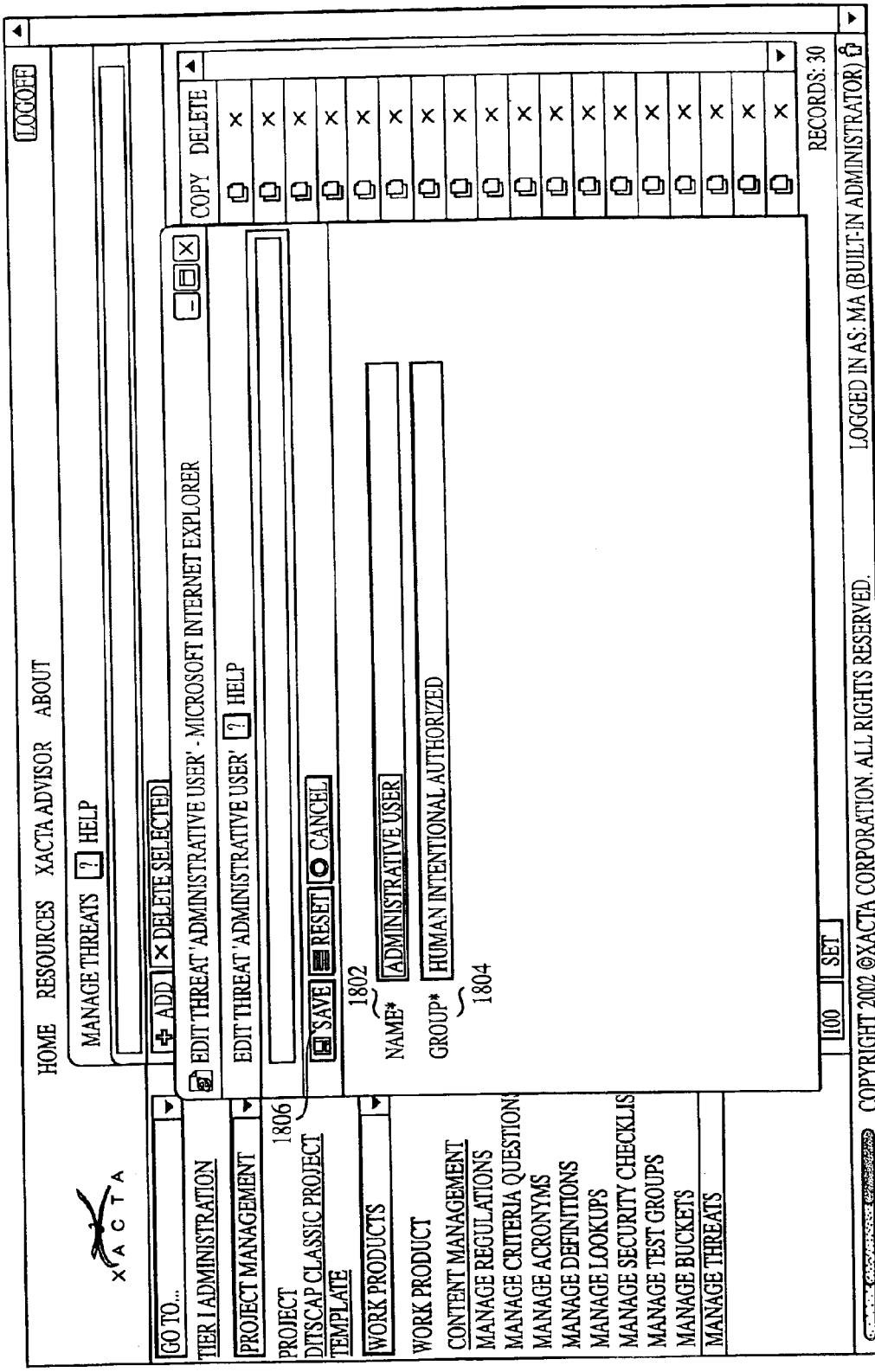
FIG. 18 is an exemplary screen display showing how a user can edit threats.

FIG. 18 is an exemplary display that can be used to edit threats. For example, in Name* field 1808, an administrative user can be identified as a potential human intentional authorized threat in threat Group* field 1804. After editing, Save button 1806 can be activated to save any changes made to any of the aforementioned fields.

Figure 19:
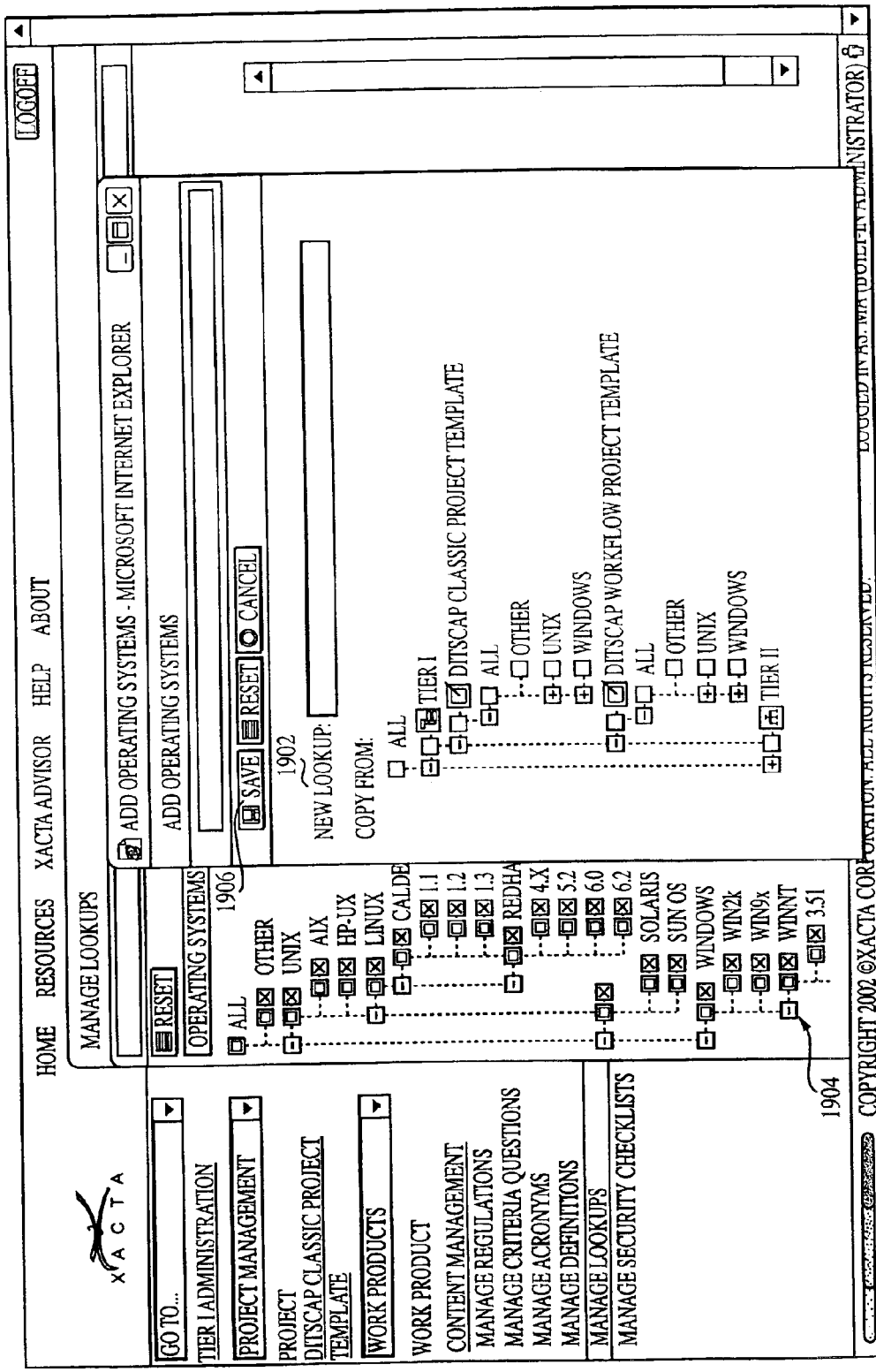
FIG. 19 is an exemplary display that can be used to edit hardware, software and/or operating system lookups.

FIG. 19 is an exemplary display that can be used to edit lookups (e.g., known hardware, software and/or operating systems, and associated manufacturers). As shown, a user can add a new lookup by using New Lookup: field 1902. For example, a user can specify a new WinNT version in field 1902. After activating Save button 1906, the new WinNT versions could appear, for example, in WinNT folder 1904.

Figure 20:
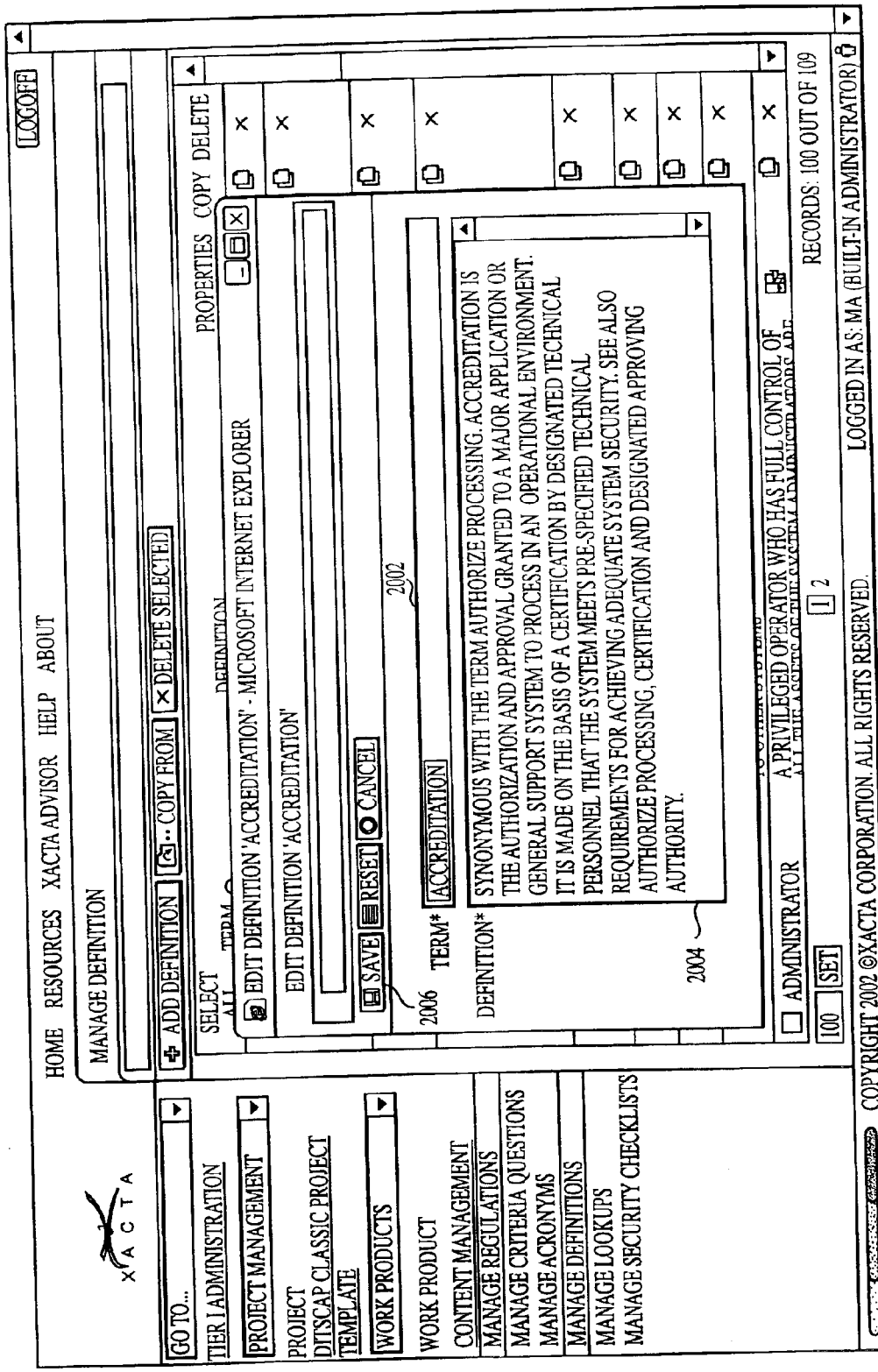
FIG. 20 is an exemplary screen display that enables a user to add and/or edit definitions used for a C&A project.

As shown in FIG. 20, a user can also add and/or edit definitions used for a C&A project. For example, a user can type in the term "Accreditation" in Term* field 2002. The definition will appear in Definition* field 2004, which the user can then edit and save. Any edits can be saved by activating Save button 2006.

Similar displays can be provided with regard to, for example, managing criteria questions, and project acronyms. For example, with regard to managing criteria questions, one or more screen displays can be provided that enable a user to indicate whether the system to be tested, for example, has a compartmentalized special access classification, whether employee owned computers access the network, and/or whether remote terminals access the network 224. Other screen displays can similarly be utilized to enable users to access, edit, create and/or save material pertinent to the project C&A.

Risk Assessment

Once the testing step 104 has been completed and results have been recorded, the risk assessment step 108 commences, as indicated by sub-headings a–d below.

Figure 21:
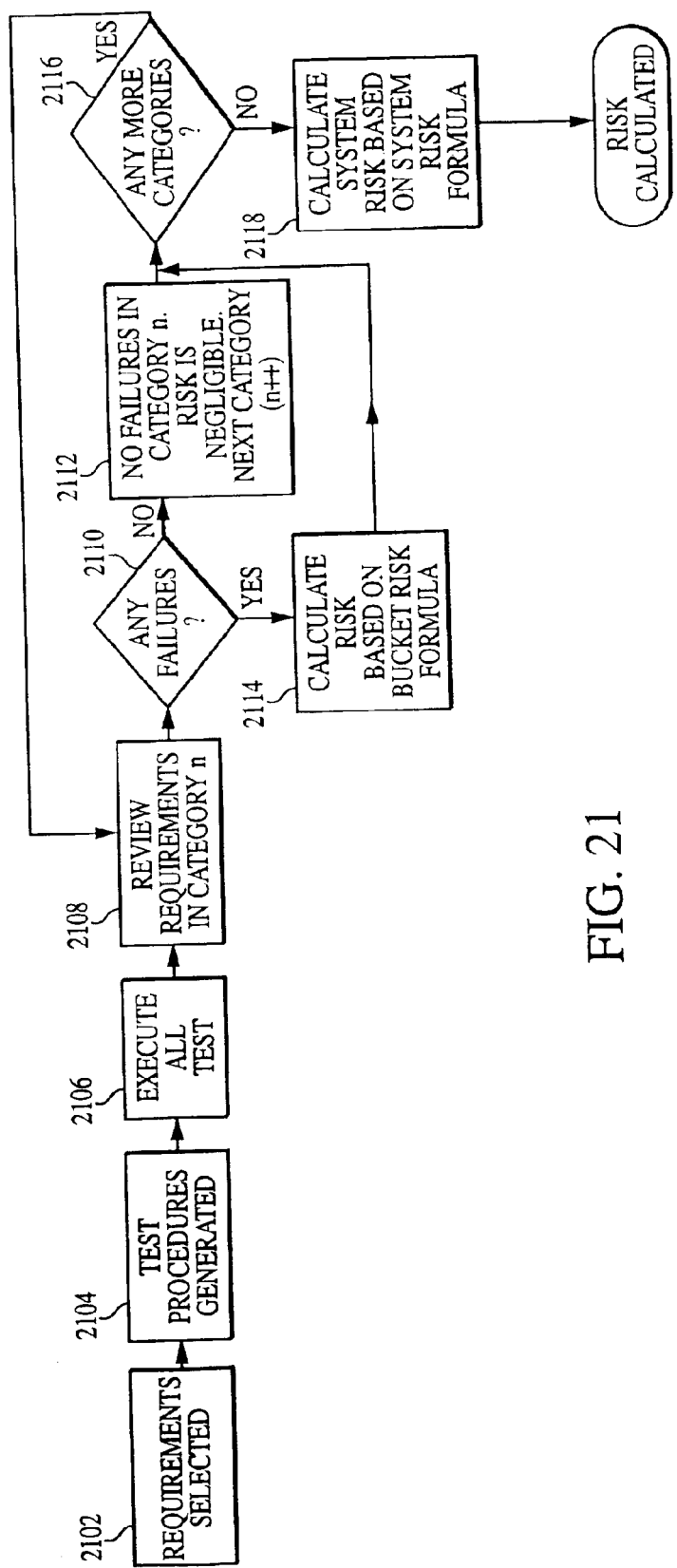
FIG. 21 is an exemplary high level flow diagram of a risk assessment method according to at least some embodiments contemplated by the present invention.

FIG. 21 provides an overview of the risk assessment process. At step 2102, requirements are selected, as has been discussed, for example, with regard to step 102 and FIGS. 11–15. At step 2104, test procedures are generated and/or selected. For example, with regard to FIG. 12, test procedures can be mapped to requirements 1206, as requirements are mapped to regulations 1210. In addition, test procedures can be added and/or edited as discussed, for example, with regard to FIGS. 14–16. At step 2106, testing is conducted, and test results are recorded as discussed, for example, with regard to FIG. 15.

At step 2108, the test results for one or more requirements associated with a requirements category (as will be discussed herein) are reviewed and, at decision step 2110, a determination is made if any requirements have not been satisfied.

If there are no requirement failures, then at step 2112 the risk is deemed negligible. As determined at decision step 2116, additional risk categories are reviewed at step 2108.

If at decision step 2110 it is determined that any requirements have failed, the risk for category n is calculated based on a predetermined risk formula (an exemplary risk formula will be discussed herein).

After a determination is made at decision step 2116 that no requirement categories remain (i.e., all requirement categories have been reviewed for failure of one or more associated requirements), at step 2118 the system risk is calculated based on a predetermined system risk formula (an exemplary system risk formula will be discussed herein).

a) Generate Threat String of Requirement Category (Step 2202)

Figure 22:
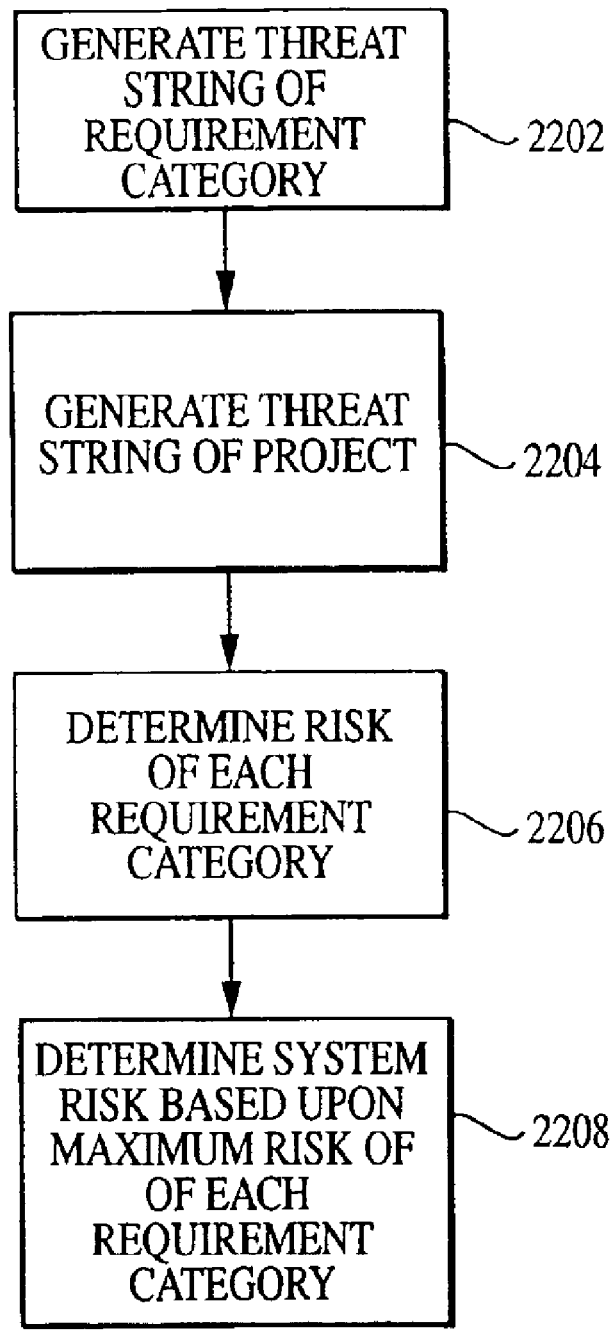
FIG. 22 is an exemplary flow diagram of a risk assessment method contemplated by at least some embodiments of the present invention.

FIG. 22 is an exemplary flow diagram of a risk assessment method contemplated by at least some embodiments of the present invention. As shown in FIG. 22, at step 2202, at least some embodiments of the present invention generate a threat string for a requirement category. As used herein, a requirement category is a category that can be used to contain one or more related requirements. Exemplary names for requirement categories are as follows:

Encryption
Network Perimeter Security
Key Management, Physical Communications Link Security/PDS
Routing and Switching
Wireless Communication Security
Access Control
Antivirus Protection
Audit, Identification and Authentication/Password/ Trusted Path
Security Marking and Printing
Mobile Code
Object Reuse
Screen Saver
Ports and Services
System Configuration
System and Data Integrity
Security Warning Banner
Security Testing
Emanation Security
Equipment Maintenance
Equipment Ownership
Firmware Configuration
Hardware Configuration
Equipment and Media Marking
Media Handling and Destruction/Purging
Portable Equipment
Personnel Clearances/Screening
Personnel Designations
Foreign Nationals
Maintenance Personnel
Physical Access Control
Environmental Security
Equipment Security Facility Security
Assessment/Assurance
Configuration Management
Contingency Planning
Copyright, Documentation (Development)
Documentation (Operational)
Email/Web/Internet Policy
Incident Reporting
Tactical Systems
Penetration/Firewall
Security Awareness Training.

Other requirements categories can be used in lieu of or in addition to those enumerated above.

For each requirement utilized in the project, the threat string of the requirement is a score for each of the generic threat elements (e.g., fire, flood, hardware, power, software design error, etc.). In one or more embodiments of the present invention, each element of the threat string indicates a respective potential of a given threat element to exploit a vulnerability caused by failure of one or more requirements associated with a requirements category.

In at least some embodiments, the user performing the C&A is presented with a series of questions pertaining to the environment for which the C&A will be performed. (This information could also be obtained in an automated fashion using any number of known techniques). An estimate of the threat level can then be rendered based on the operators' answers. In one or more embodiments of the present invention, a user can optionally change any of the system determined threat element scores. Exemplary values for generic threat elements are as follows:

accordance with one or more embodiments of the present invention, the user can also adjust the system 200 provided default values by using, for example, a pulldown menu associated with each threat element. Exemplary pulldown menu choices are negligible, low, medium-low, medium, medium-high or high, although they could also be, for example, numerical in nature. Note that in these embodiments of FIG. 24 that Threat Group column 2302 corresponds to at least one of columns 2302*a*, 2302*b*, 2302*c* of FIG. 23. Similarly, Weight column 2402 of FIG. 24 corresponds to the threat element scores, as discussed with regard to FIG. 23.

b) Generate Threat/Susceptibility String of Project (Step 2204)

In step 2204, a threat string (which can also be referred to as a susceptibility string, corresponding to column 2504 of FIG. 25A) is generated for the project. Specifically, in one or more embodiments of the present invention, upon completion of steps 100, 102 and 104, the system can generate a threat string (based upon, for example, user answers as shown, for example, in FIG. 13), with each character in the string representing one of the generic threat elements in the same order as they exist in the threat string of the requirement categories as shown, for example, in FIG. 23. A user can also override any system determined threat string values. Each element in the threat string generally represents how susceptible the project as a whole is to each threat element. More generally, in one or more embodiments, the threat string can generally represent the presence of the threat, the likelihood of occurrence of the threat, and/or the potential damage caused by the threat (when it is present). An exemplary scoring system is as follows:

| Threat Element Score | Interpretation |
| --- | --- |
| N | Threat element is not applicable to this requirement category or has negligible likelihood of occurrence |
| L | Threat element has low likelihood of occurrence for this requirement category |
| M-L | Threat element has medium-low likelihood of occurrence for this requirement category |
| M | Threat element has medium likelihood of occurrence for this requirement category |
| M-H | Threat element has medium-high likelihood of occurrence for this requirement category |
| H | Threat element has high likelihood of occurrence for this requirement category |

| Threat String of Project | Interpretation |
| --- | --- |
| N | The project is not susceptible to this threat element (or has a negligible susceptibility to this threat element) |
| L | The project has a low susceptibility to this threat element |
| M-L | The project has a medium-low susceptibility to this threat element |
| M | The project has a medium susceptibility to this threat element |
| M-H | The project has a medium-high susceptibility to this threat element |
| H | The project has a medium susceptibility to this threat element |

For example, for one requirement category, generic threat elements 1–29, as defined in FIG. 23, may have a project threat profile as follows:

M-LHNLLLLM-HMMMMLLLMMMMLLLLLLLLNN corresponding, respectively, to elements 1–29. For this project threat profile, the potential of a threat to exploit a vulnerability associated with (or caused by) flooding is thus considered high. Similarly, each requirement category used for the project C&A can have a different threat string associated therewith.

FIG. 24 shows an exemplary screen display that enables a user to view the setting for the Antivirus Protection requirements category, which shows a default level of risk for each threat element (or threat) shown in FIG. 23. In Thus, for example, if the system being tested is highly vulnerable to Floods, the character in the threat correlation string corresponding to Floods would contain a score of "H."

c) Determine Risk Profile for Each Requirement Category (Step 2206)

As indicated at step 2206, the risk profile for each requirement category is determined. Specifically, for each requirement category, the threat string of the requirement category (as determined at step 2202) is applied against the threat string of the project (as determined at step 2204).

For example, the threat string of a requirement category (e.g., encryption) may have the following threat string (as determined at step 2202, and shown in column 2502 of FIG. 25A):

M-LHNLLLLM-HMMMMLLLMMMMLLLLLLLLNN
and the threat string of the project (as determined at step 2204, and shown in column 2504 of FIG. 25A) may be:
HHNM-LHLM-
HNHHHMLNNNHLMLHNNLHHLMH In this case, in accordance with an exemplary process according to at least some embodiments of the present invention, the combined risk profile string as determined in accordance with FIG. 25A would be:
M-HHNLMLM-
LLMMMMLLLNMLMLMLLLMMLNN The above string was derived by comparing the threat string of the requirements category (corresponding to column 2502) with the threat string of the project (corresponding to column 2504), and determining the resulting threat string in accordance with column 2506. For example, a medium level of risk for the requirements category (corresponding to column 2502) and a negligible level of risk for the project (corresponding to column 2504) yields a negligible level or risk (corresponding to column 2506) to the target system for that threat element.

More particularly, and using the Antivirus Subgroup* (requirements category) 2404 shown in FIG. 24 as an example, the negligible weight in Humidity indicates that Humidity has a negligible potential to exploit Antivirus protection. Suppose, however that the system as a whole has a high degree of exposure to humidity. In accordance with FIG. 25A, the low value associated with column 2502 in combination with the high value associated with column 2504 yields a composite threat (shown in column 2506) of medium.

The respective threat strings for each requirements category used for a particular C&A are similarly determined. Initially, the highest risk level in the combined string for a given requirements category is preferably used as the risk level for that requirements category. Thus, for the combined string above, the risk level of the requirements category is high, since there is an H in the second position. Similarly, if M were the highest risk level that appears in a combined string, then the risk level for a failure of that test procedure would be medium, etc. Similarly, for an initial system risk, the highest level of risk in any requirements category can be used as a baseline system risk.

In one or more embodiments of the present invention, the initial risk level of a requirement category can be (but is not necessarily) adjusted based upon the percentage of failed requirements in a requirements category. Specifically, each requirements category can have n requirements associated therewith, and each requirement can have one or more associated test procedures. The initial risk level of a requirement category can then be adjusted based upon, for example, the table shown in FIG. 25B.

Suppose, for example, that 10% of requirements failed in a particular requirements category. According to row 2508 of FIG. 25B, the importance value is equal to (or set to) 1. FIG. 25C is then utilized to adjust the risk of the requirements category based upon the importance value. In this particular instance, row 2510 indicates that the adjusted risk value is −2. Therefore, the risk level of the requirements category would be reduced by two levels (from high to medium-high, and then from medium-high to medium) to provide a resulting requirements category risk level of medium.

Similarly, suppose that the highest threat level resulting from FIG. 25A is medium, and the 62% of the requirements within that requirements category have failed. Then, in accordance with FIG. 25B, the importance value is 4. In accordance with FIG. 25A, the adjusted risk level is one. Thus, the risk level of the requirements category would be adjusted up (from medium) to medium-high. Other combinations of the use of FIGS. 25A, 25B and 25C are clearly possible. As shown in FIGS. 25B and 25C, when the importance value of FIG. 25B is 3, the initial risk level of a requirement category remains the same (i.e., is not adjusted, as indicated by the corresponding adjusted risk value shown in FIG. 25C).

d) Determine Overall System Level Risk (Step 2208)

Figure 26:
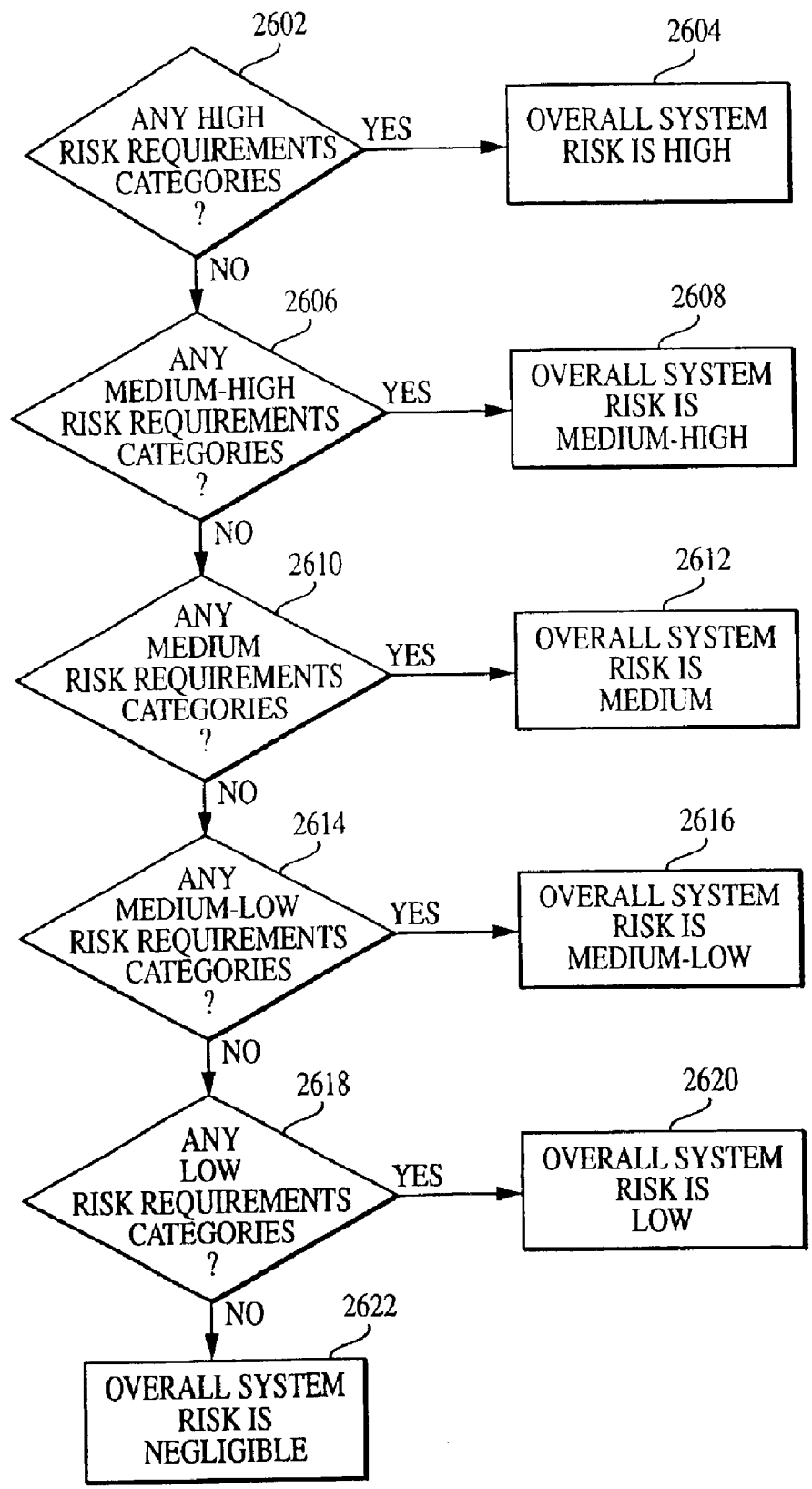
FIG. 26 is an exemplary flow diagram of a method of assessing overall system risk in accordance with at least some embodiments contemplated by the present invention.

In addition to the individual risk level scores for each requirements category as determined in step 2206, an overall risk level for the project is also determined as indicated by step 2208. As shown in FIG. 26, in one or more embodiments of the present invention, the overall system risk level is defined as the highest risk value among those found in any of one or more requirements categories. The overall system risk can also be determined by comparing the results of one or more physical sites or subsystems.

Thus, if it is determined that any requirements category has a "high" risk (as indicated by decision step 2602), then the overall risk for the system is high as indicated by a step 2604. If any requirements category has a "medium-high" risk (as indicated by decision step 2606), then the overall risk for the system is medium-high as indicated by step 2608. If any requirements category has a "medium" risk (as indicated by decision step 2610), then the overall risk for the system is medium as indicated by step 2612. If any requirements category has a "medium-low" risk (as indicated by decision step 2614), then the overall risk for the system is medium-low as indicated by step 2616. If any requirements category has a "low" risk (as indicated by decision step 2618), then the overall risk for the system is low as indicated by step 2620. Finally, if the risk of all (of one or, more) requirements categories is "negligible," then the overall risk for the system is negligible, as indicated by step 2622. The user also can have the ability to override the overall system risk level as determined in accordance with the above methodology. In such a case, the user may also provide explanatory text to accompany the overall user-defined system risk level.

Publishing

In the publishing step 110, one or more embodiments of the present invention collate the results of the certification process, and generate a documentation package that can be used for accreditation. The information gathered during activities associated with and/or corresponding to steps 100, 102, 104, 106, and 108, can be reformatted by, for example, organizing it into to appropriate documents, document subsections or subparagraphs, sections and/or appendices, etc.

Figure 27:
FIG. 27 shows an exemplary screen display that enables a user to print a complete project report or components thereof.

As shown in FIG. 27, one or more embodiments of the present invention allow a user to print a complete project report as indicated at 2702. An embodiment of a complete project report includes elements 2704a–2724a, as indicated by the corresponding checked boxes for each element in FIG. 27. In one or more embodiments contemplated by the present invention, a user can select additional screen displays (not shown) by activating one or more of menu elements 2704b–2724b (each respectively corresponding to elements 2704a–2724a). Any or all of elements 2704a–2724a can be generated by clicking, for example, the desired boxes corresponding to reports 2704a–2724a, and clicking Generate .pdf button 2726.

When a user selects any or all of elements 2704a–2724a, a report is provided that complies with, for example, the DITSCAP (DoD Instruction 5200.40). It is also contemplated that accreditation can be automated, so that no accreditation agency is needed. In such an embodiment, when sufficient test related results and/or information is provided to the system 200, a method according to the present invention can automatically determine that accreditation requirements have been satisfied.

Workflow Manager

The present invention also provides a "front end" (called Workflow Manager (WFM)) that adds workflow functionality to the C&A process. By using the WFM, tasks (a unit of work) can be defined. Each task can, for example, be opened, submitted, and approved by a user (e.g., an analyst). When an event of interest takes place, an e-mail or other electronic notification can be sent to the appropriate user(s). The present invention thus provides an e-mail notification setup graphical user interface (GUI) that enables users to define and enter, for example, Role/Title, Users, and task notifications in support of the e-mail notification functionality.

In accordance with at least some embodiments, the WFM of the present invention provides, for example, electronic control and authorization of access to documents, notification of designated individuals when a predefined event occurs, document approval, tracking, status reporting, and/or tracking of document revisions. The WFM also advantageously provides for the revision, approval, and release of documents in a collaborative environment. In addition, the WFM also can help ensure that published content (e.g., a C&A report or portion thereof) is accurate and timely, providing for the automated document release and/or user notification for time-sensitive documents or content.

The WFM enables users to define tasks (units of work) that resemble or correspond to an organization's best practices. WFM provides a GUI that can be used to notify users when the state of a task changes.

The following terms and associated definitions associated with the WFM are provided:

Process Step (PS): A unit of work that normally corresponds, for example, to a screen display.

Task: A unit of work within WFM that consists, for example, of one or more PSs.

Project: A set of tasks that can be used for a particular C&A.

Submittal: When work is completed on a task, an analyst with appropriate permission can submit it for approval. Submittal can also optionally lock the information in the task so no further change can take place.

Approval: An analyst with appropriate permission can approve a submitted task. In accordance with at least some embodiments of the present invention, when a task is approved, its content preferably remains locked. Subsequent tasks may then become available for work.

Disapproval: An analyst with appropriate permission can disapprove a submitted task. In accordance with at least some embodiments of the present invention, when a task is disapproved, its content is unlocked so that further work may be done to complete it.

Prerequisite: Tasks within a Project can be set up with dependencies. In accordance with at least some embodiments of the present invention, any given task may be configured so that it only becomes available for work when certain prerequisite task have been approved.

Reopening: An analyst with appropriate permission can reopen an already-approved task if new information has become available and the task must be revised. In accordance with at least some embodiments of the present invention, reopening preferably unlocks the information in the task so that it may be revised. Subsequent tasks with dependencies may once again become unavailable for work.

Figure 28:
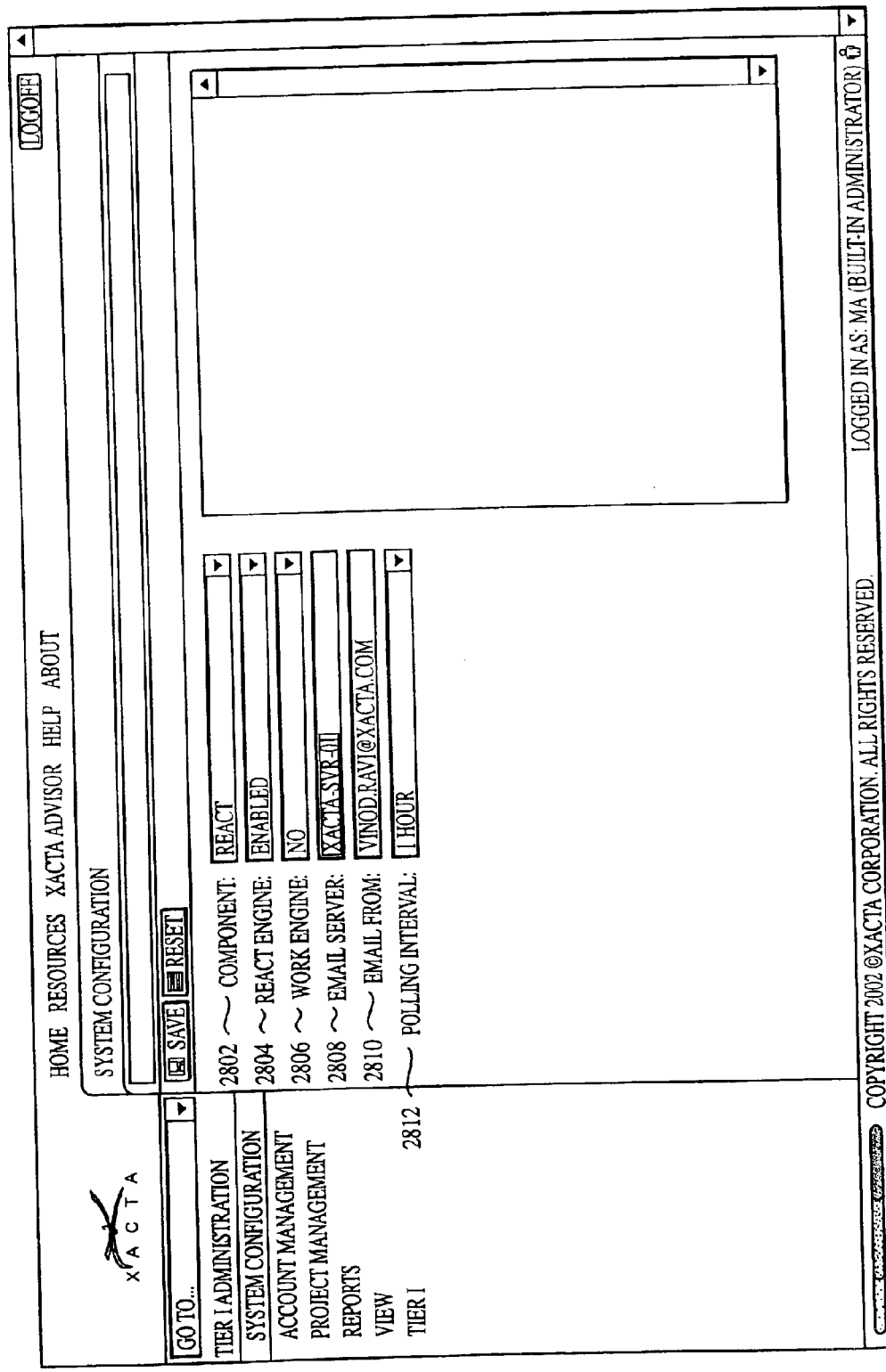
FIG. 28 is an exemplary screen display that enables the React component of the present invention to be utilized in the C&A for a project.

FIG. 28 is an exemplary screen display that enables the React component of the present invention to be utilized in the C&A for a project. As discussed with regard to FIG. 2, react module 204 can inform, for example, affected users when pre-specified and/or predetermined events occur.

React module 204 can be activated by selecting React in Component: field 2802, and indicating that the React Engine: is enabled in field 2804. Work Engine: field 2806 enables, for example, a commercially available external workflow product to be integrated with a C&A project. Email server: field 2810 can be used to indicate the name of the e-mail server that will provide the workflow events. Email from: field 2810 can be used to indicate the e-mail account the will deliver the workflow events. Finally, Polling Interval: field 2812 can be used to specify the time interval at which the email server specified in field 2808 will be polled for workflow events.

Figure 29:
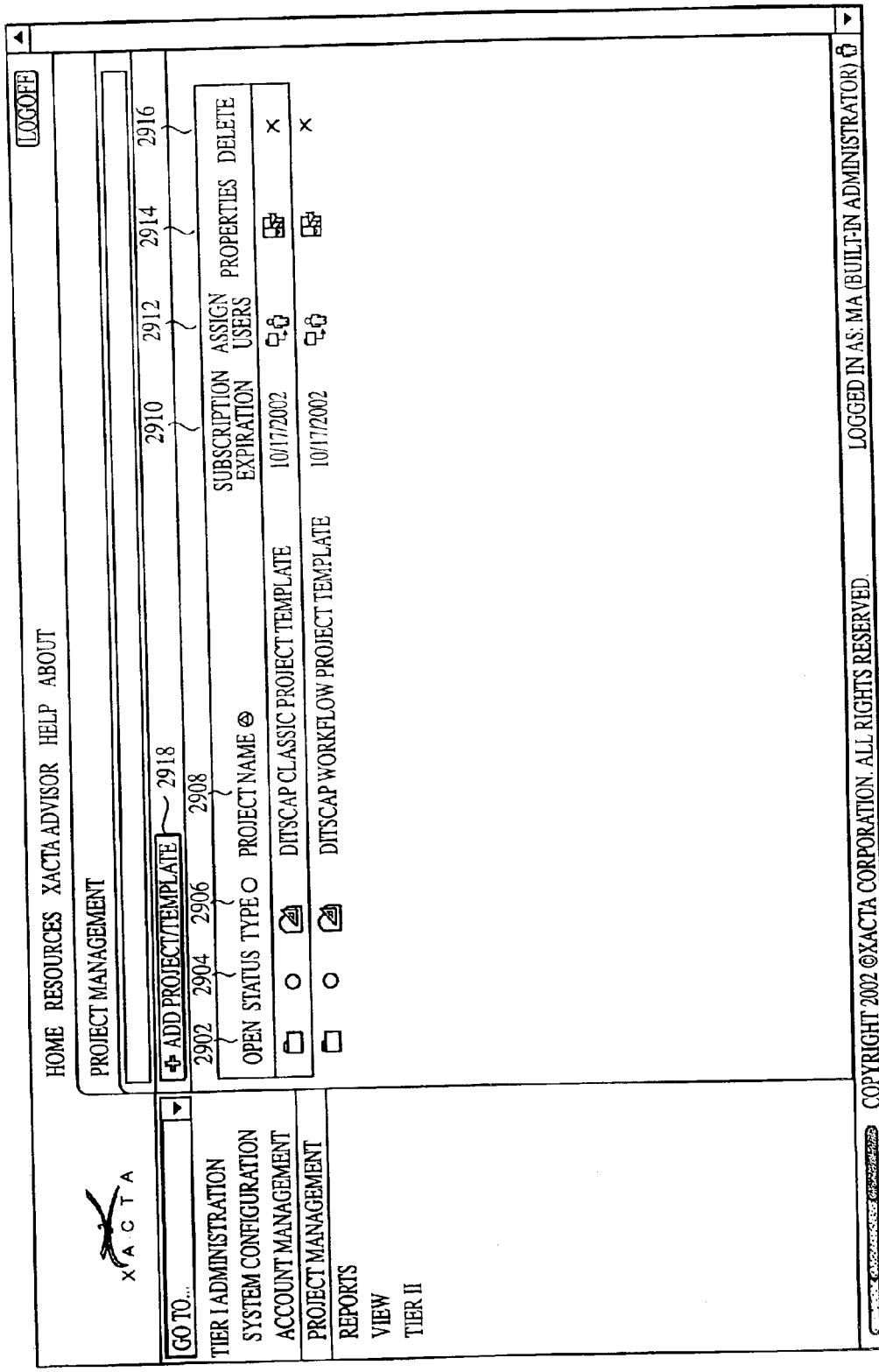
FIG. 29 is an exemplary screen display that can be used to view project names and related information.

FIG. 29 is an exemplary Project Management display. By clicking on Add Project/Template button 2918, a project can be added, such as found under Project Name column 2908. A project can be opened by clicking on an Open icon, under column 2902, associated with (or corresponding to) a project. Status column 2904 indicates whether the current project is active or inactive. Type column 2906 refers to either a template (that can be used to create a project), or an actual project. Subscription Expiration column 2910 refers to the date that the software subscription expires (as can be determined by, for example, Subscription Key 630). By clicking on an icon under Properties column 2914, the user will be taken to an exemplary screen such as shown in FIG. 30 indicating properties of the project.

Figure 30:
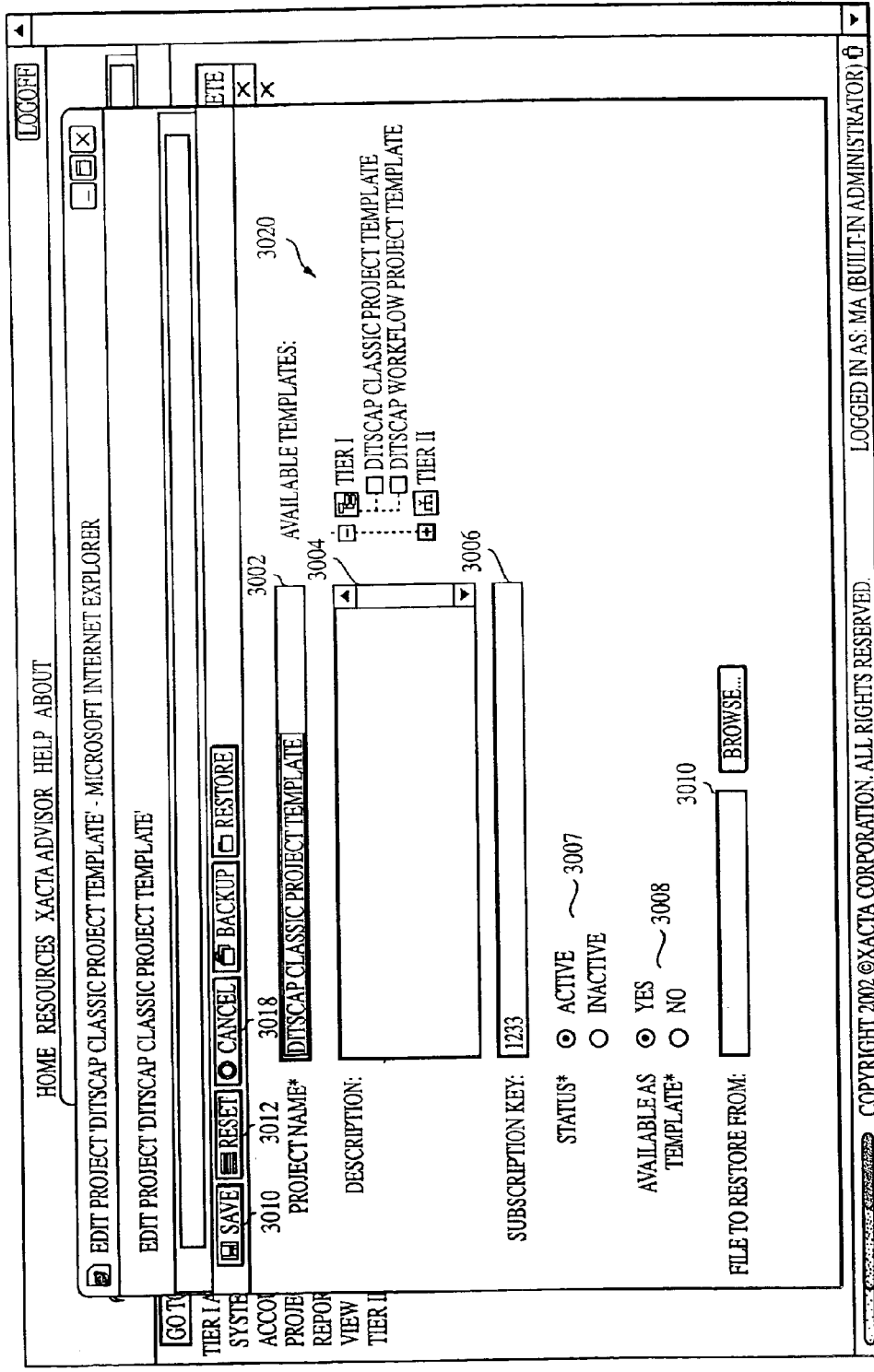
FIG. 30 is an exemplary screen display that enables a user to edit project information.

With regard to FIG. 30, a user can enter appropriate descriptive information in Project Name* field 3002 and Description* field 3004. In one embodiment of the present invention, and as discussed with regard to FIG. 6, users can also be provided (by, for example, the assignor and/or licensor of the present invention) a key to enter in Subscription Key* field 3006 which can be used, for example, to identify an organization. Status* field 3007 can be used to designate whether the project is Active or Inactive. In accordance with at least some embodiments of the present invention, users can access at least a portion of one or more active projects (e.g., one or more PSs) to which they have been granted user rights. When a project is inactive, user are not grated access rights. A system administrator, however, could change the status of the project from inactive to active, in which case users will have access to the project in accordance with their user rights.

At Available as a Template* 3008, a user can allow (by clicking the Yes button) the current project template to be used as a baseline for other templates or projects. Note that the DITSCAP Classic Project Template project name appears at 3020 when the Yes button is activated. At File to Restore From: field 3010, a user can optionally specify a backup file location.

The user can select the Reset button 3012 to reset the screen display to its default condition. Clicking Cancel button 3018 will return the user to, for example, the previous screen. If the user selects the Save button 3010, the user can save the current settings, and optionally be advanced to, for example, a subsequent screen.

Figure 31:
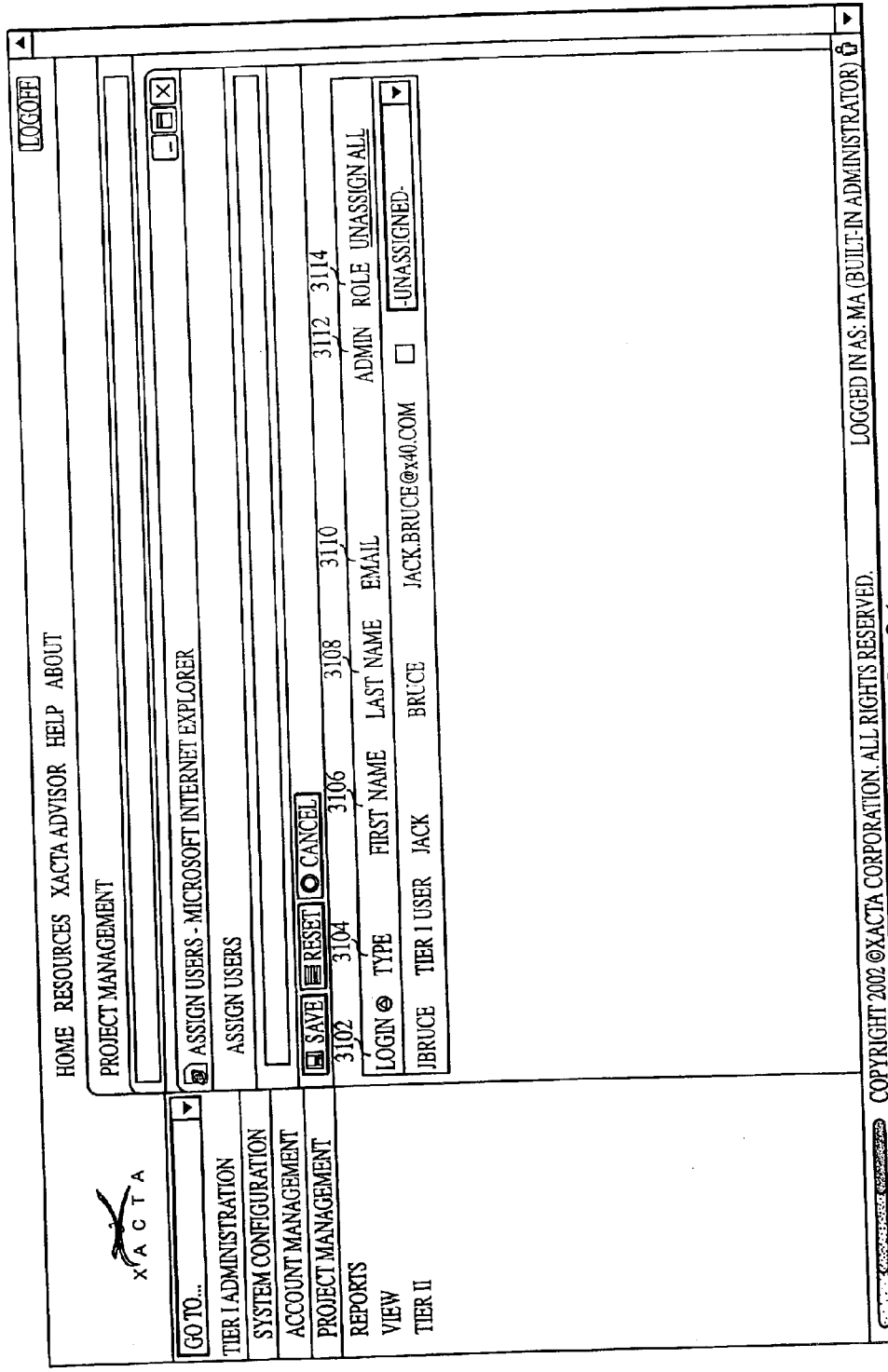
FIG. 31 is an exemplary screen display that can be used to assign a role to a user.

When a user clicks Assign Users 2912, an exemplary screen such as shown in FIG. 31 is presented. A users login name can be displayed under Login column 3102. Similarly, a users first name can be displayed under First Name column 3108, and a users email address can be displayed under Email column 3110. The type of the user can also be displayed under Type column 3104. A box under Admin column 3112 can be checked to indicate that the user has administrative privileges. Finally, by using, for example a pulldown menu under Role column 3114, a user can be assigned a role, which can be further defined by an exemplary screen display such as shown in FIG. 32.

Figure 32:
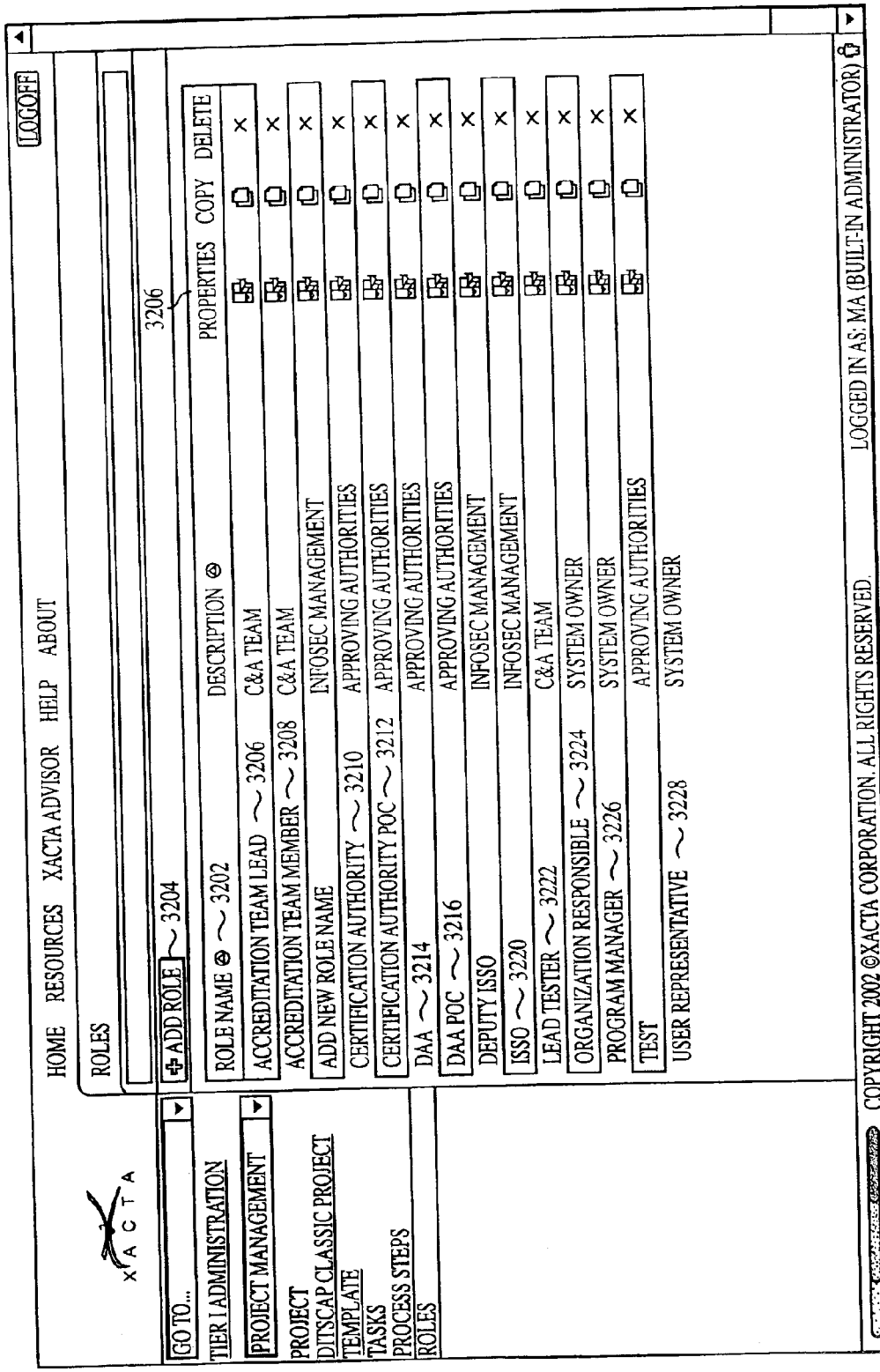
FIG. 32 is an exemplary screen display that can be used to assign or add various roles to a project.

FIG. 32 can be used to enable a user to enter information identifying all the project personnel associated with the accreditation effort. The personnel are preferably identified by the role, as discussed below, that they serve in the accreditation process. At least one entry for each role is preferably defined for the project.

For example, the following role names can be provided in Role Name column 3202 by, for example, clicking on Add Role button 3204. A Role Name can generally be considered to be the role associated with the accreditation team member. The available choices can include:

Accreditation Team Lead 3206—The person in charge of the accreditation effort, usually the Project Manager.

Accreditation Team Member 3208—All the members of the accreditation team (analysts, testers, etc.).

Certification Authority 3210—Person in charge of the system certification.

Certification Authority POC 3212—Point of Contact (POC) to the CA.

DAA 3214—Designated Approving Authority. Person ultimately responsible for the accreditation of the system.

DAA POC 3216—Point of Contact (POC) to the DAA.

ISSO 3220—Information System Security Officer. Person responsible for the security implementation of the system being accredited.

Lead Tester 3222—The head tester (in charge of a team or group of testers).

Program Manager 3226—Program manager of the system being accredited.

User Representative 3228—Representative from the user community.

Figure 33:
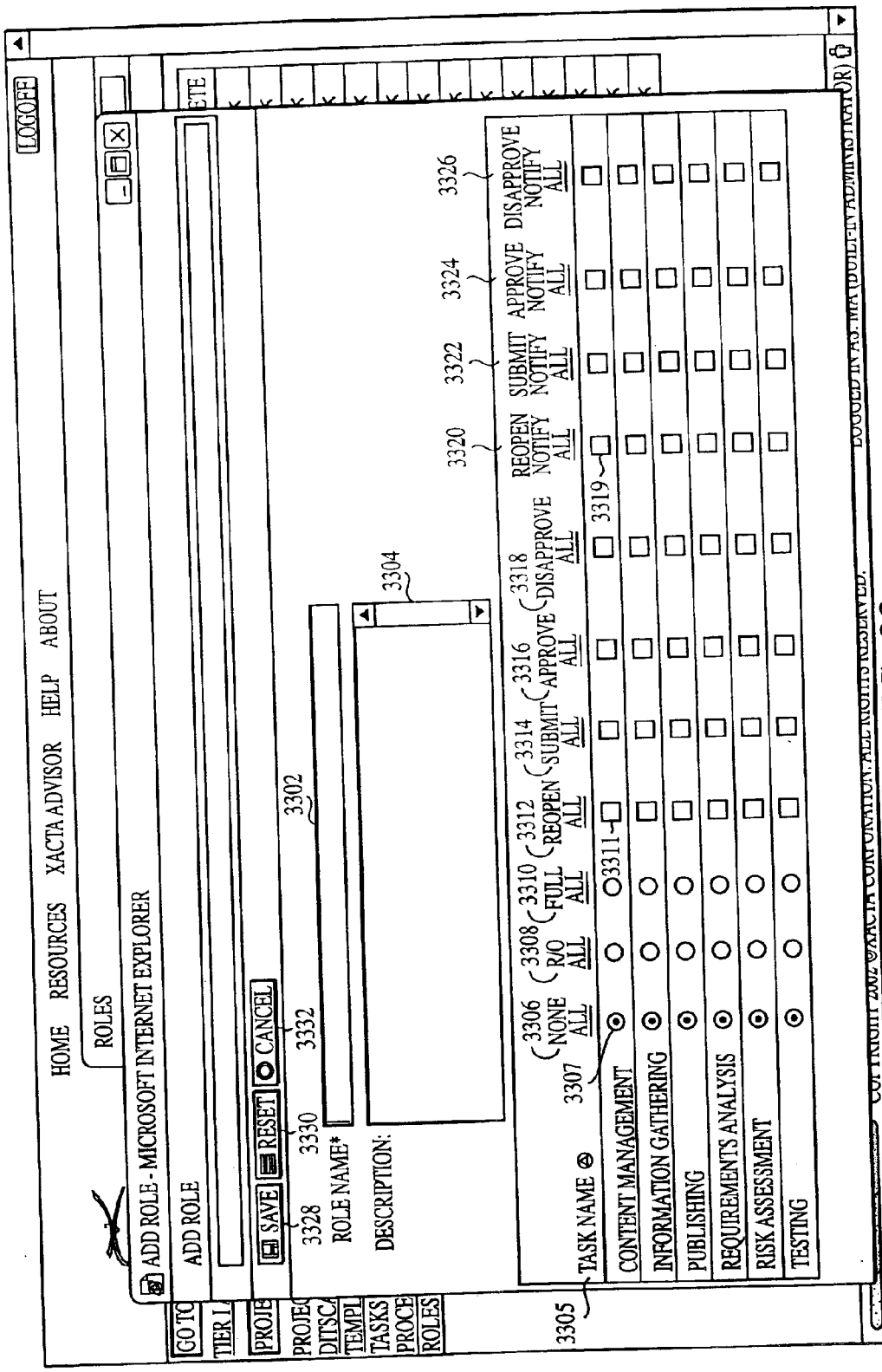
FIG. 33 is an exemplary screen display that can be used to specify access rights and notification for various tasks.
Figure 34:
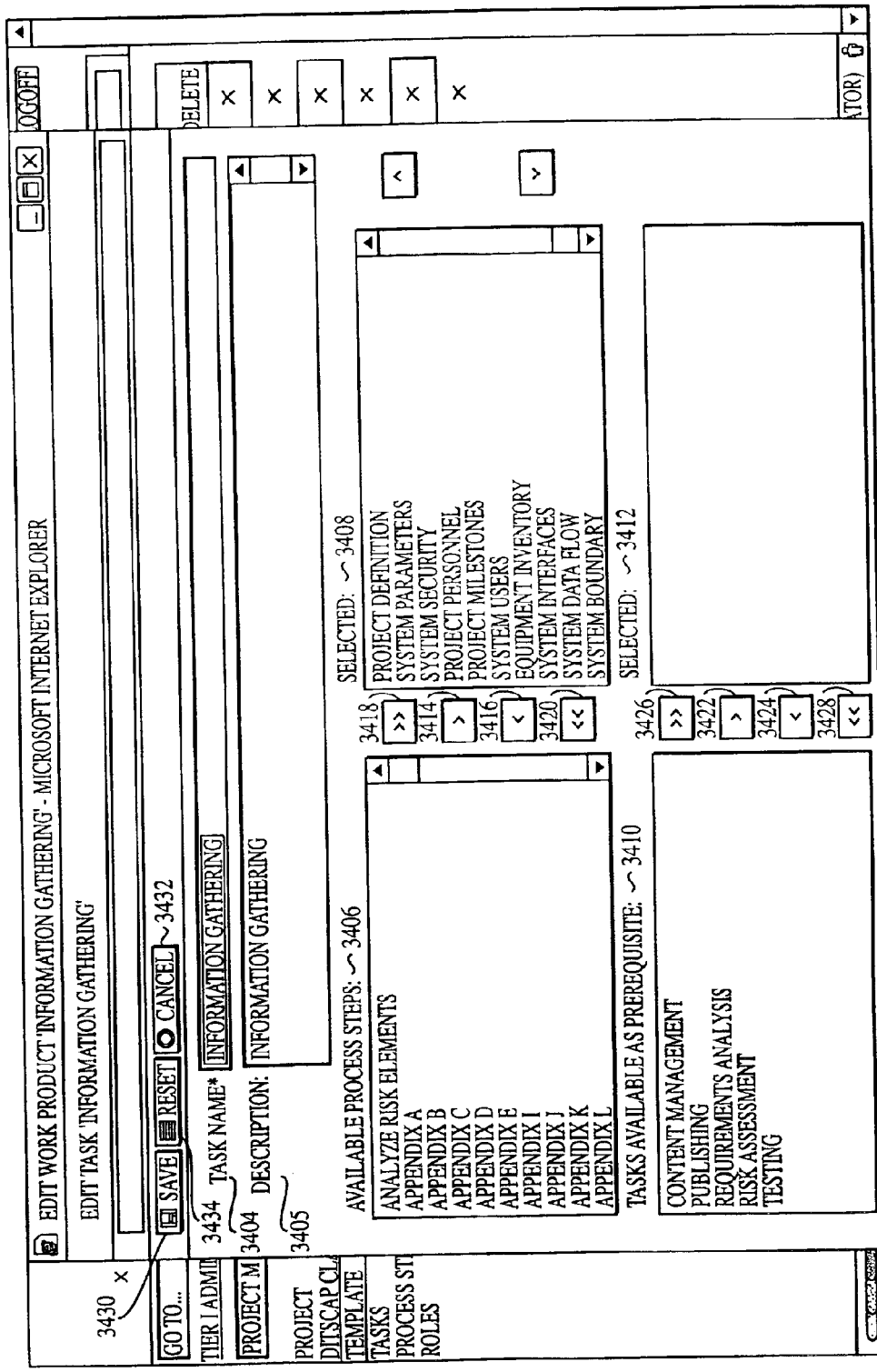
FIG. 34 is an exemplary screen display that can be used to associate one or more Process Steps (PSs) with a task.

By clicking on Add Role button 3204, a user can be taken to a screen display such as shown in FIG. 33, where a Role Name* can be added in field 3302. A user can also optionally add a description of the role in Description: field 3304. Activating an icon under Properties column 3206 will also take a user to a screen similar to that shown in FIG. 33.

In addition, project access can also be defined. For each Task Name 3305 (e.g., Content Management, Information Gathering, etc.), an administrator, for example, can determine the extent to which the user can determine whether other users associated with the project have access to a particular task. For example, when an administrator activates a button 3307 (so that it contains a bullet, such as shown at 3307) under column 3306 that is associated with a particular task, users associated with a task having an activated button are not granted access to the project. When one or more activation buttons associated with column 3308 are activated, users associated with a task are granted read only privileges for aspects of the project whose respective access buttons are activated. When an activation button under column 3310 is activated, users have full access (e.g., read and write access) for materials (e.g., screen displays) associated with a given task.

In addition, access rights can be specified with regard to whether a user can Reopen 3312, Submit 3314, Approve 3316, and/or Disapprove 3318 one or more designated task names. For example, if box 3311 is activated (e.g., a user can click on the box, and an "X" can appear therein), the user(s) associated with the Content Management task can reopen aspects of the project associated therewith.

In addition, a user can also set notification parameters for each Task Name 3305. When a user clicks on a box (e.g., 3319) associated with a particular task under column 3320, users will be notified when a corresponding task is reopened (by another user). For example, if a user activates box 3319, users associated with the Content Management task will be notified each time that the Content Management task is reopened. Similarly, one or more boxes under each of columns 3322, 3324, and 3326 can be activated so that user are respectively notified when corresponding tasks are submitted, approved and disapproved.

The user can save the results by activating (e.g., clicking on) Save button 3328. Activating Reset button 3330 will reset the screen to its default condition. Activating Cancel button 3332 can return the user to, for example, a previous screen.

FIG. 34 is an exemplary screen display that enables a user to enter a Task Name* 3404 and associated Description:. The Available Process Steps: are shown in window 3406, from which the user can select which process steps he wishes to associate with the Task Name* 3404. The Selected: process steps are shown in window 3408. The user can add process steps via window 3406 one at a time by selecting button 3414, or add all available process steps by selecting button 3418. Selected process steps can similarly be removed from window 3408 by clicking buttons 3416 and 3420, respectively.

The user can also select one or more tasks displayed in Work Tasks Available As Prerequisite: 3410 window. When selected, such task(s) must be completed before the Tasks entered at 3404 can begin. One or more prerequisite tasks individually can be added via button 3422, whereas all prerequisite tasks can simultaneously be added via button 3426. Prerequisite tasks can be similarly removed by selecting buttons 3424 and 3428, respectively. Selections can be saved by selecting button 3430, canceled by selecting button 3432, and reset by selecting button 3434. Selecting Cancel button 3432 can, for example, return the user to the previous screen, whereas selecting Reset button 3434 can reset FIG. 34 to its default.

Figure 35:
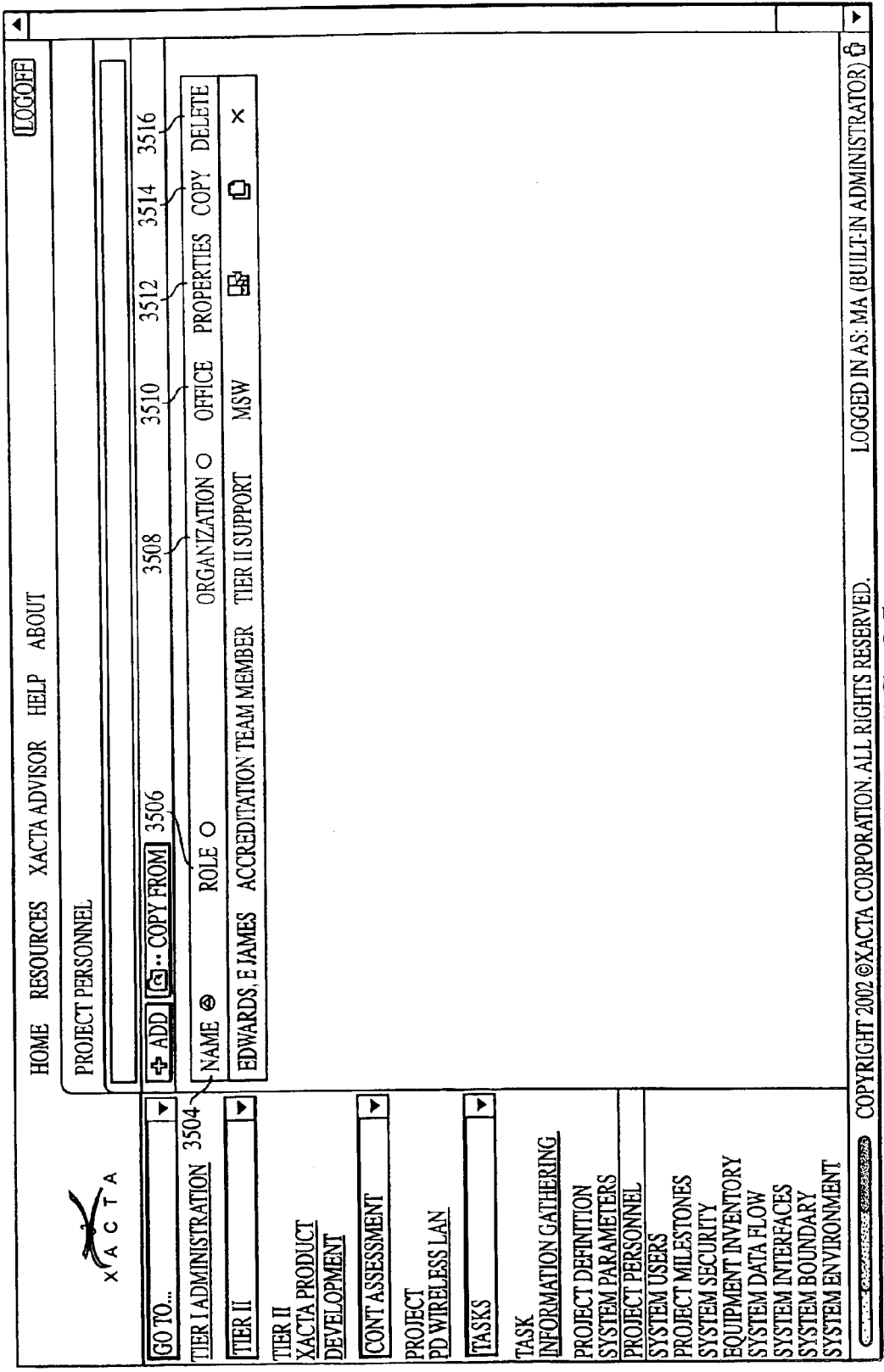
FIG. 35 is an exemplary screen display that shows project personnel and related information.

FIG. 35 is an exemplary screen display that shows Project Personnel. At column 3504, each user's Name can be provided. At column 3506, the Role of the user is indicated. At column 3508, the user's Organization can be provided (e.g., Tier I or Tier II). In the event that Tier II is specified for the organization, the Office 3510 can be provided at column 3510. By clicking on Properties 3512, the user can be taken to an exemplary screen display that enables at least some of the following information pertaining to a particular user to be entered: Role Name (e.g, Accreditation Team Member), Title (e.g., Mr., Ms.), First Name, Middle Initial, Last Name, Office (corresponding to column 3510), Street Address, Zip Code, Telephone number, Facsimile number, and e-mail address. By clicking an icon as shown in Copy column 3514, a particular user's profile will be copied (to avoid having to manually reenter at least some information). Finally, at column 3516, a Delete icon can be activated to delete a particular user from the project.

Figure 36:
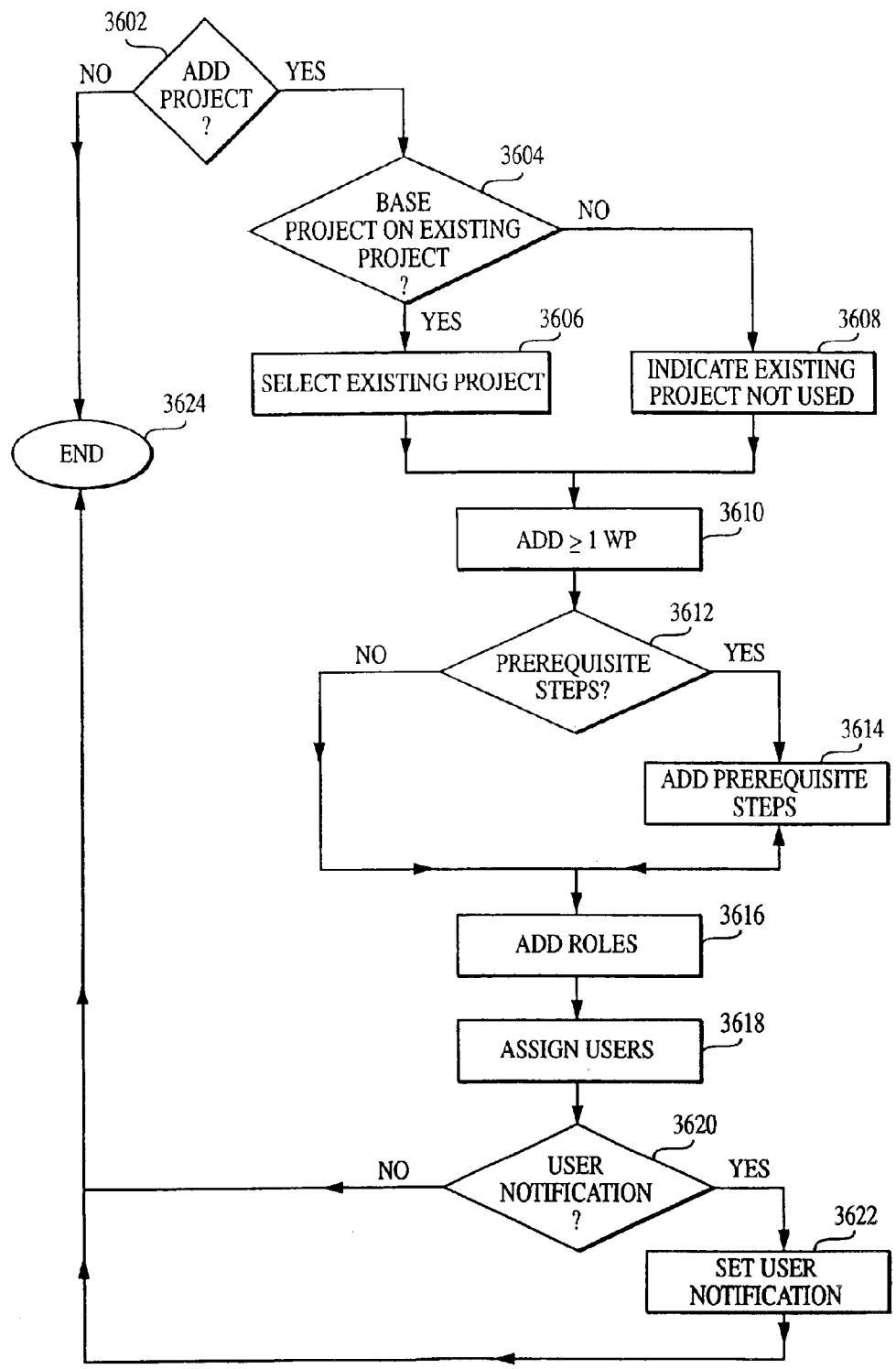
FIG. 36 is an exemplary flow diagram of the task manager process.

FIG. 36 is an exemplary flow diagram of the Workflow Manager process. At decision step 3602, the user determines whether to add a project. A screen display such as shown, for example, in FIG. 30 can be used to add a project. If a project is not to be added, the process ends 3624. If the user decides to add a project, at decision step 3604 the user determines whether to base the new project based on an existing project. If the user bases the new project on an existing project, the user selects an existing project at step 3606 (by, for example, using the Available Templates: menu shown in FIG. 30). If the user does not base the new project on an existing project, the user types in information to define the project (as discussed with regard to FIG. 30).

At step 3610, the user adds one or more process steps to a task (e.g., Information Gathering, as shown in FIG. 34) and, at decision step 3612, determines whether there will be any prerequisite process steps before beginning another task. If, as discussed, for example, with regard to FIG. 34, there are prerequisite steps, the user adds the prerequisite steps at step 3614. If there are no prerequisite steps, or after step 3614, the user adds roles associated with the project (as discussed, for example, with regard to FIGS. 32–33). At step 3618, a role is assigned to each user (as discussed, for example, with regard to FIGS. 31 and 35). At decision step 3620, a system administrator, for example, can determine whether any user(s) should be notified upon, for example, the opening, completion, or commencement of a task (as discussed with regard to FIG. 33). If it is determined that any user(s) should be notified, the administrator sets user notification(s) (as discussed, for example, with regard to columns 3320, 3322, 3324 and 3326 of FIG. 33). If no user notification is required, or after user notification is set at step 3622, the process ends at step 3624.

Computer Implementation

Figure 37:
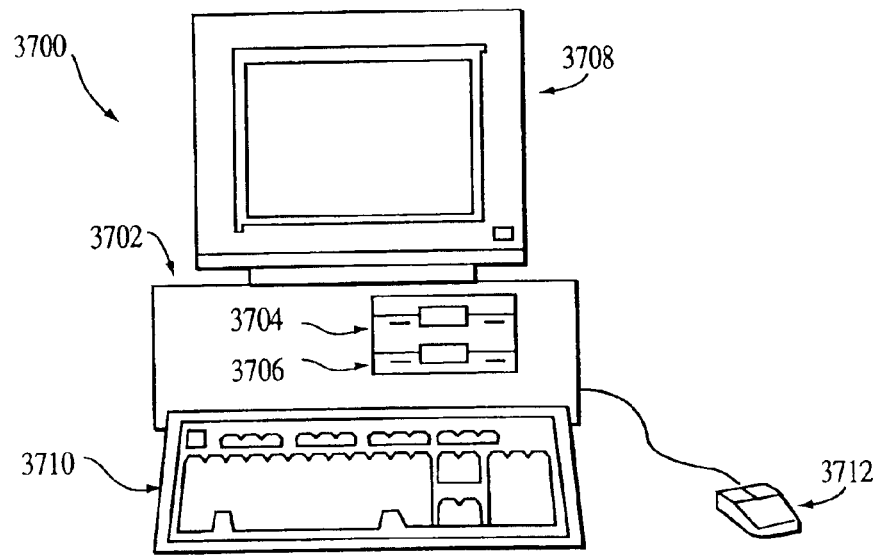
FIG. 37 illustrates one example of a central processing unit for implementing a computer process in accordance with a computer implemented embodiment of the present invention.

The techniques of the present invention may be implemented on a computing unit such as that depicted in FIG. 37. In this regard, FIG. 37 is an illustration of a computer system which is also capable of implementing some or all of the computer processing in accordance with computer implemented embodiments of the present invention. The procedures described herein are presented in terms of program procedures executed on, for example, a computer or network of computers (as shown, for example, in FIG. 40).

Viewed externally, in FIG. 37, a computer system designated by reference numeral 3700 has a computer portion 3702 having disk drives 3704 and 3706. Disk drive indications 3704 and 3706 are merely symbolic of a number of disk drives which might be accommodated by the computer system. Typically, these could include a floppy disk drive 3704, a hard disk drive (not shown externally) and a CD ROM indicated by slot 3706. The number and type of drives vary, typically with different computer configurations. Disk drives 3704 and 3706 are in fact optional, and for space considerations, are easily omitted from the computer system used in conjunction with the production process/apparatus described herein.

The computer system 3700 also has an optional display 3708 upon which information, such as the screens illustrated in, for example, FIGS. 4–10, etc. may be displayed. In some situations, a keyboard 3710 and a mouse 3712 are provided as input devices through which input may be provided, thus allowing input to interface with the central processing unit 3702. Then again, for enhanced portability, the keyboard 3710 is either a limited function keyboard or omitted in its entirety. In addition, mouse 3712 optionally is a touch pad control device, or a track ball device, or even omitted in its entirety as well, and similarly may be used as an input device. In addition, the computer system 3700 may also optionally include at least one infrared (or radio) transmitter and/or infrared (or radio) receiver for either transmitting and/or receiving infrared signals.

Although computer system 3700 is illustrated having a single processor, a single hard disk drive and a single local memory, the system 3700 is optionally suitably equipped with any multitude or combination of processors or storage devices. Computer system 3700 is, in point of fact, able to be replaced by, or combined with, any suitable processing system operative in accordance with the principles of the present invention, including hand-held, laptop/notebook, mini, mainframe and super computers, as well as processing system network combinations of the same.

Figure 38:
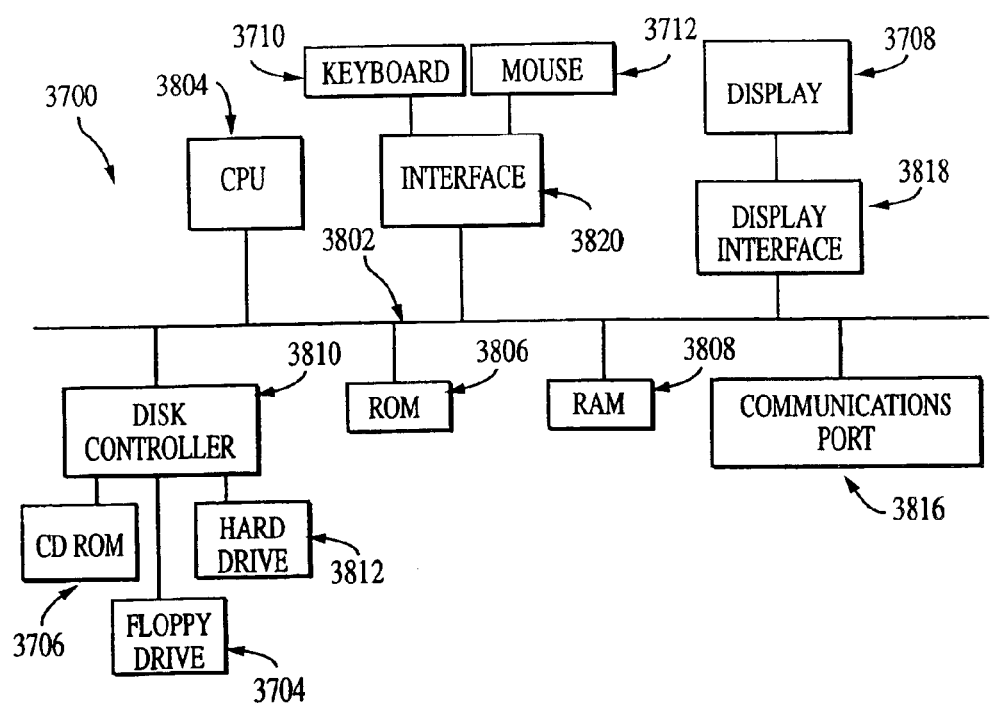
FIG. 38 illustrates one example of a block diagram of internal hardware of the central processing unit of FIG. 37.

FIG. 38 illustrates a block diagram of the internal hardware of the computer system 3700 of FIG. 37. A bus 3802 serves as the main information highway interconnecting the other components of the computer system 3700. CPU 3804 is the central processing unit of the system, performing calculations and logic operations required to execute a program. Read only memory (ROM) 3806 and random access memory (RAM) 3808 constitute the main memory of the computer 3702. Disk controller 3810 interfaces one or more disk drives to the system bus 3802. These disk drives are, for example, floppy disk drive 3704 or CD ROM 3706. As indicated previously, these various disk drives and disk controllers are optional devices.

A display interface 3818 interfaces display 3708 and permits information from the bus 3802 to be displayed on the display 3708. Again as indicated, display 3708 is also an optional accessory. For example, display 3708 could be substituted or omitted. Communications with external devices, for example, the other components of the system described herein, occur utilizing communication port 3816. For example, optical fibers and/or electrical cables and/or conductors and/or optical communication (e.g., infrared, and the like) and/or wireless communication (e.g., radio frequency (RF), and the like) can be used as the transport medium between the external devices and communication port 3816. Peripheral interface 3820 interfaces the keyboard 3710 and the mouse 3712, permitting input data to be transmitted to the bus 3802.

In alternate embodiments, the above-identified CPU 3804, may be replaced by or combined with any other suitable processing circuits, including programmable logic devices, such as PALs (programmable array logic) and PLAs (programmable logic arrays). DSPs (digital signal processors), FPGAs (field programmable gate arrays), ASICs (application specific integrated circuits), VLSIs (very large scale integrated circuits) or the like.

Figure 39:
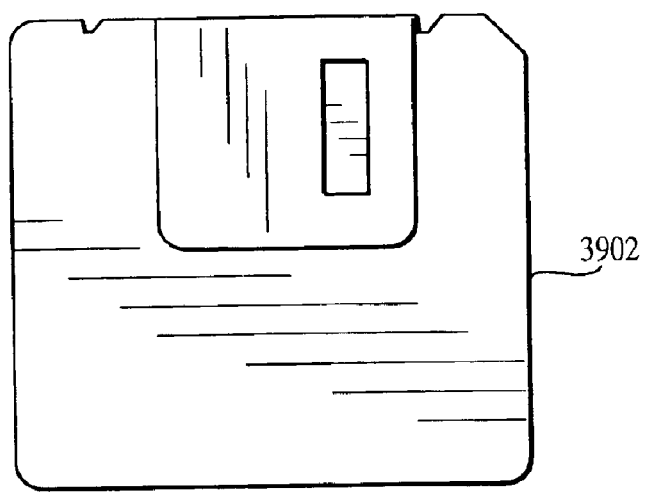
FIG. 39 is an illustrative computer-readable medium upon which computer instructions can be embodied.

One of the implementations of the invention is as sets of instructions resident in the random access memory 3808 of one or more computer systems 3700 configured generally as described above. Until required by the computer system, the set of instructions may be stored in another computer readable memory, for example, in the hard disk drive 3812, or in a removable memory such as an optical disk for eventual use in the CD-ROM 3706 or in a floppy disk (e.g., floppy disk 3902 of FIG. 39) for eventual use in a floppy disk drive 3704. Further, the set of instructions (such as those written in Java, HyperText Markup Language (HTML), Extensible Markup Language (XML), Standard Generalized Markup Language (SGML), and/or Structured Query Language (SQL)) can be stored in the memory of another computer and transmitted via a transmission medium such as a local area network or a wide area network such as the Internet when desired by the user. One skilled in the art knows that storage or transmission of the computer program medium changes the medium electrically, magnetically, or chemically so that the medium carries computer readable information.

Databases utilized in conjunction with the present invention can be implemented using, for example, Oracle, Microsoft Structured Query Language (MS SQL) Server, MS Jet Engine (Access), or a database management system that has Java Database Connectivity (JDBC) support. For presentation (e.g, screen displays), the present invention can be implemented in JavaServer Pages (JSP), which can be rendered rendered into HTML. Classes and/or modules can generally be written in JAVA. Detect module 222 can also utilize a few C++ classes and modules. Exported data (e.g, archives, snapshots, backups, publishing streams, etc.) can be implemented using extensible Markup Language (XML) format. A web server utilized in conjunction with the present invention can be implemented using, for example, Microsoft IIS or Apache. Finally, Catalina (also known as Tomcat) can be used to implement Java Servlet and JSP technologies.

Figure 40:
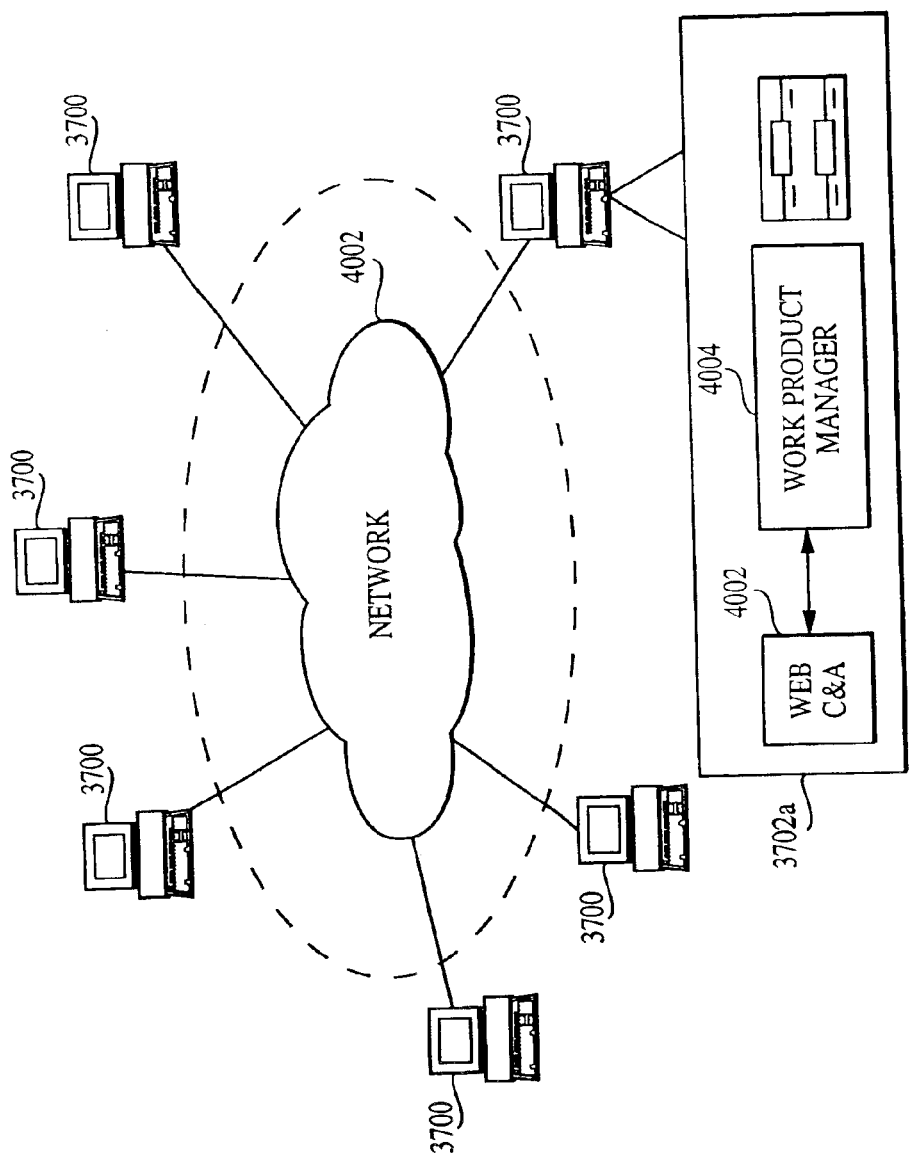
FIG. 40 is an exemplary network implementation of the present invention.
Figure 41A:
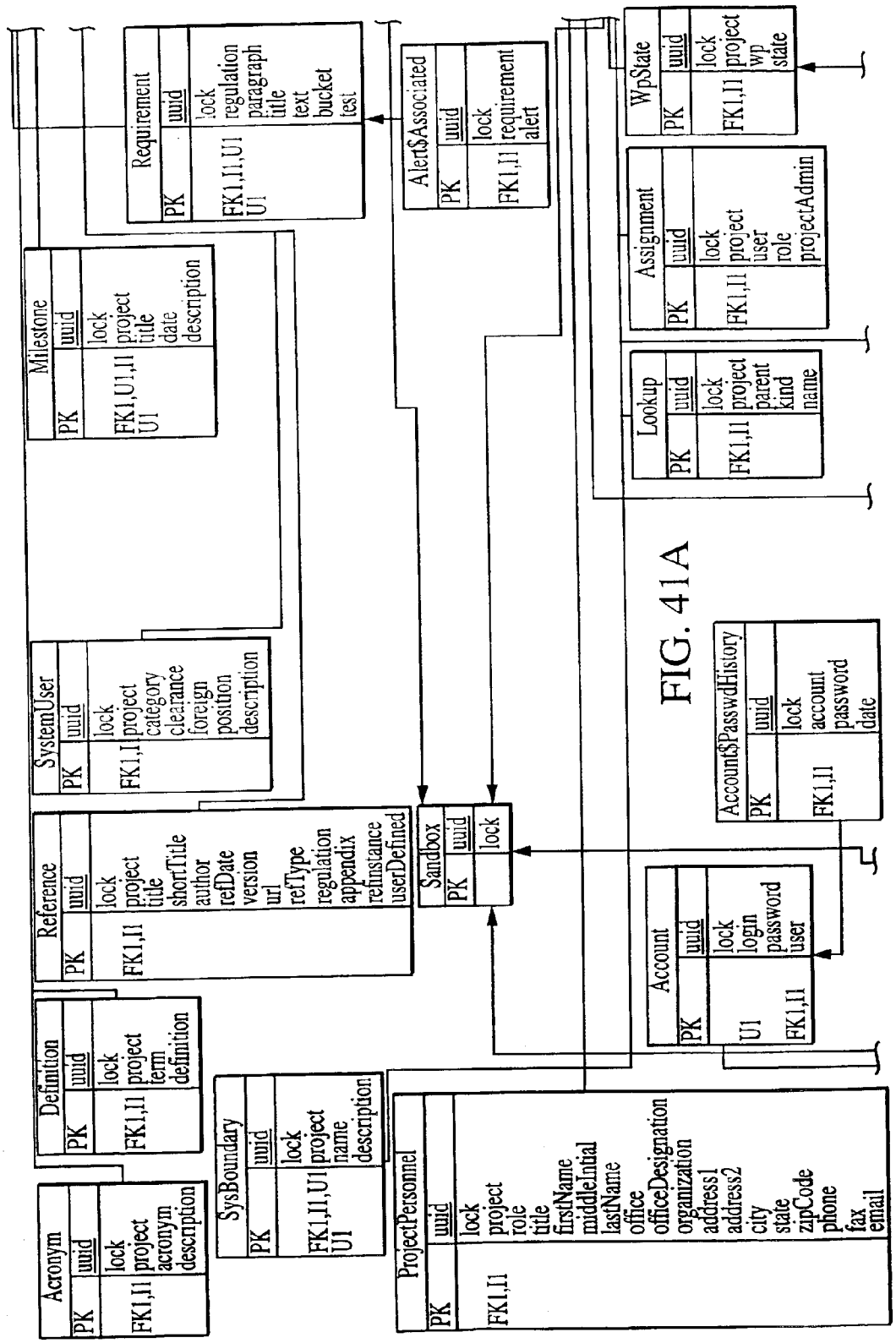
Figure 41B:
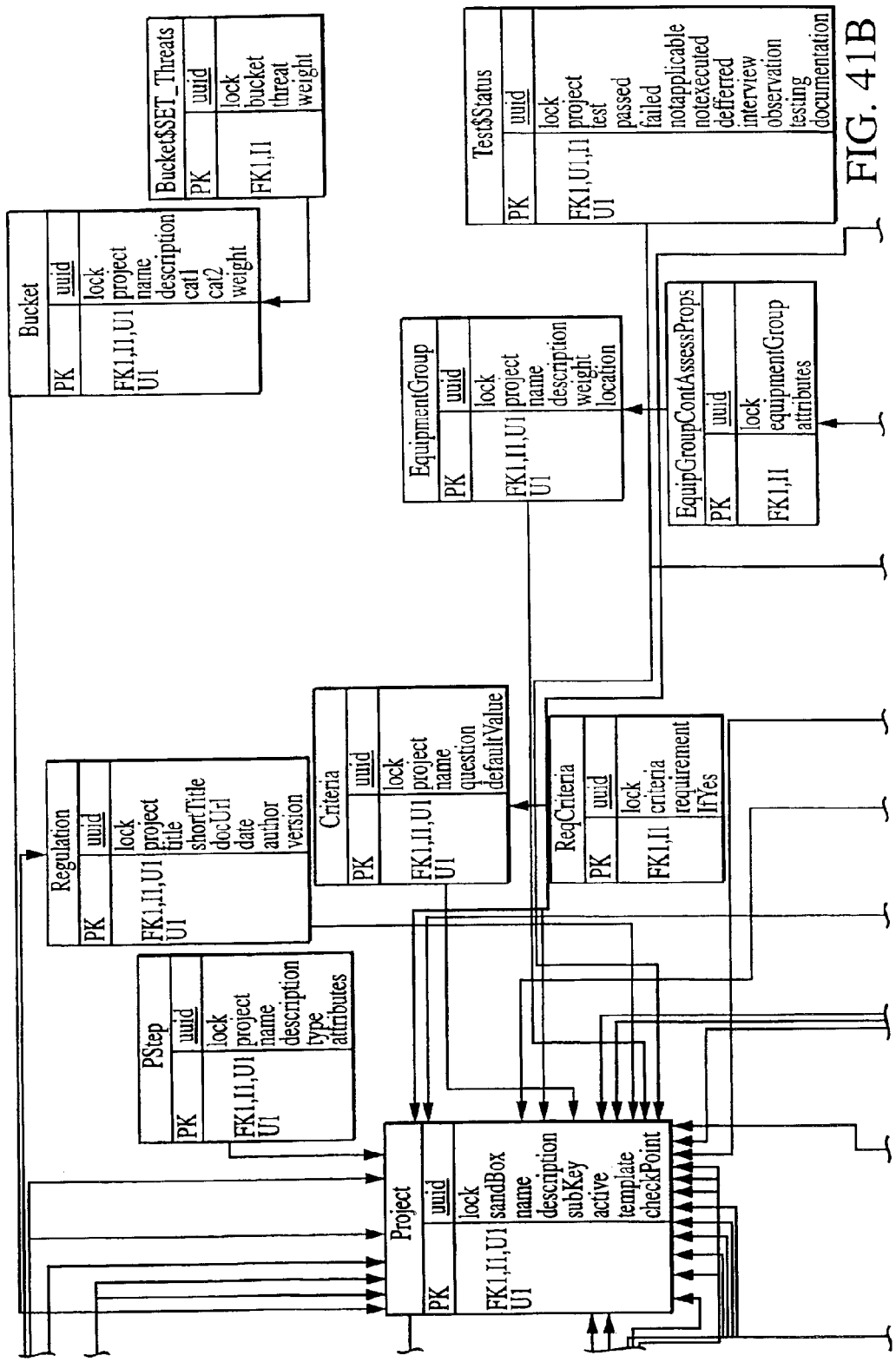
Figure 41C:
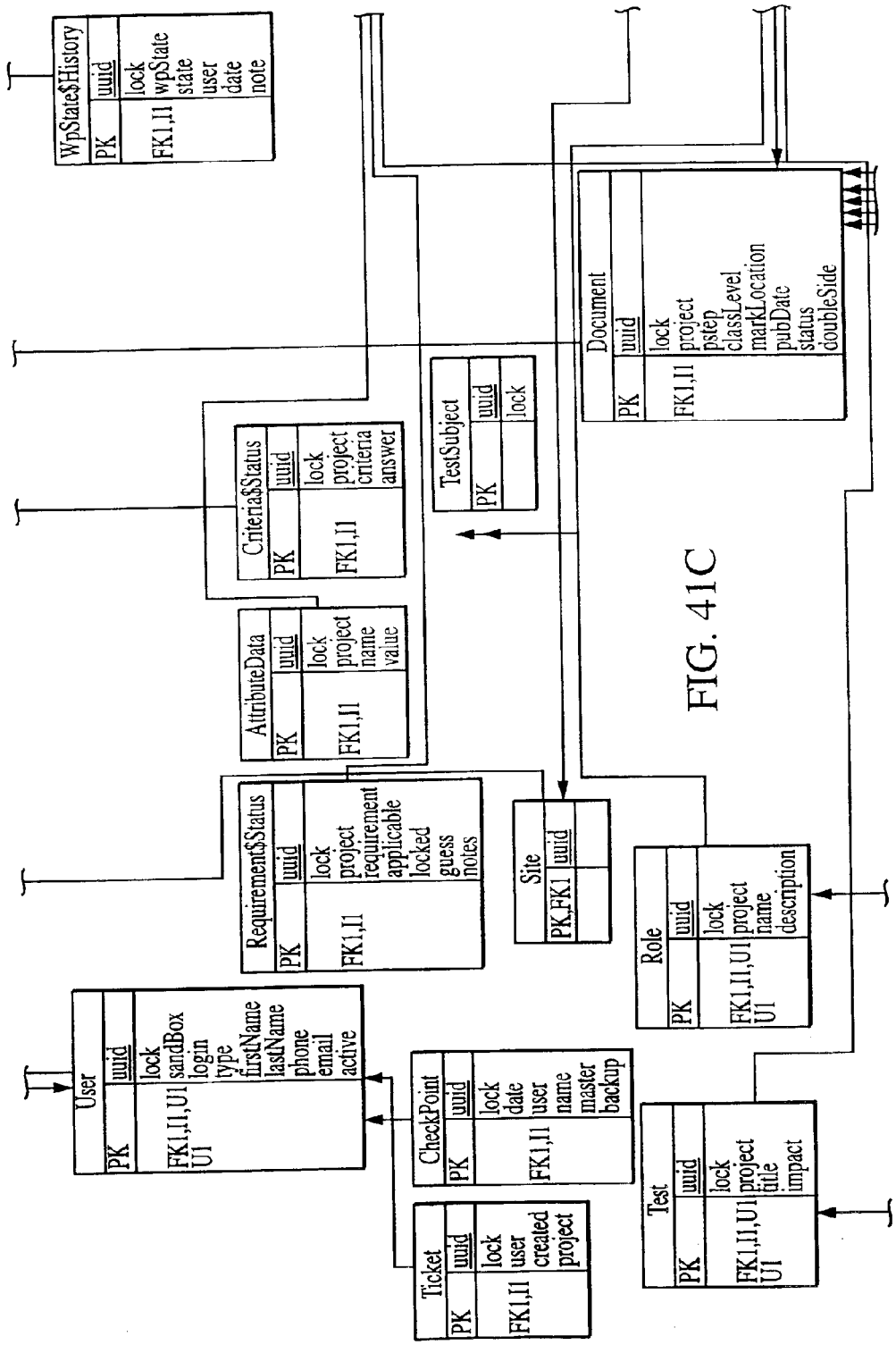
Figure 41D:
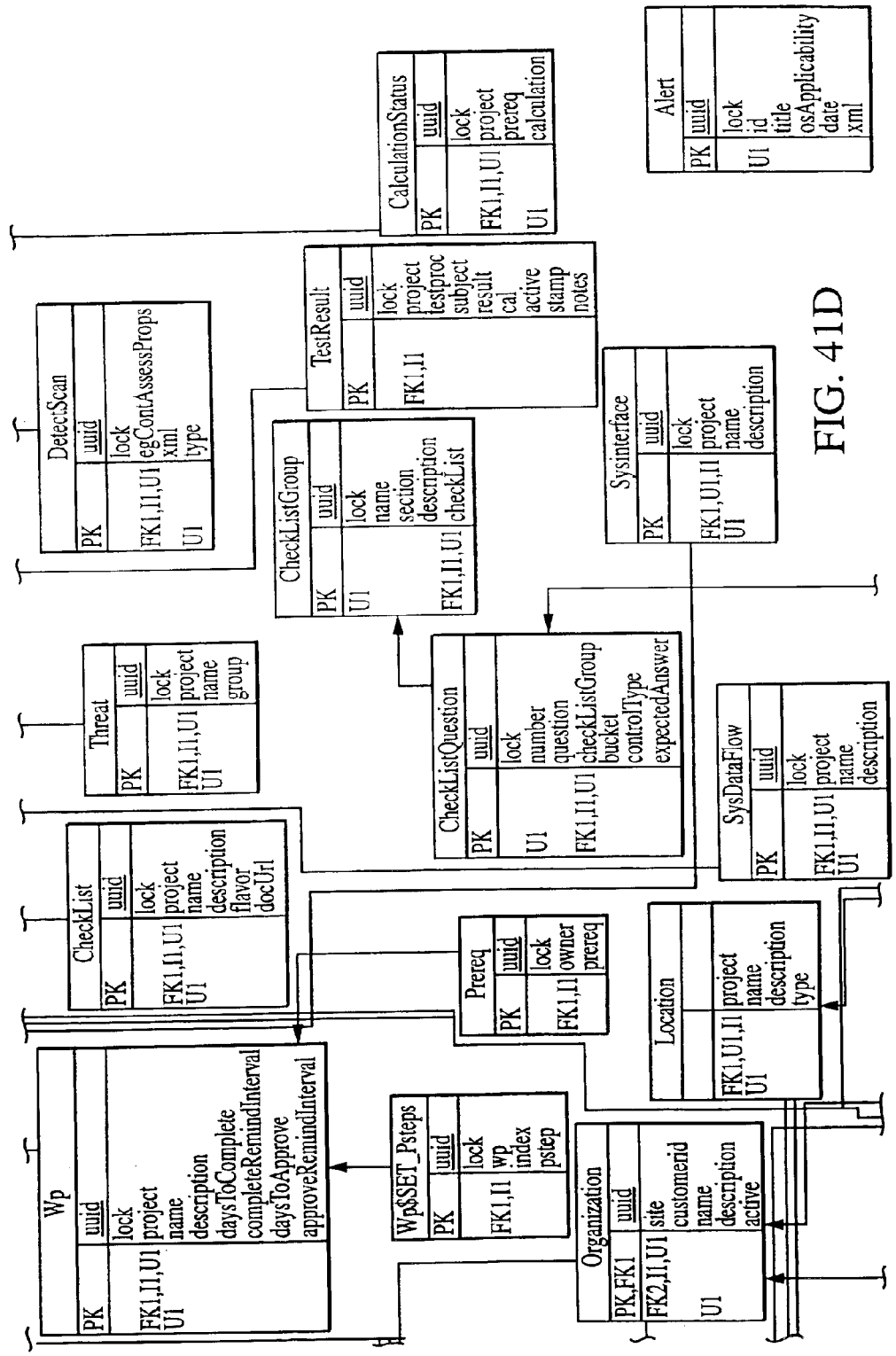
Figure 41E:
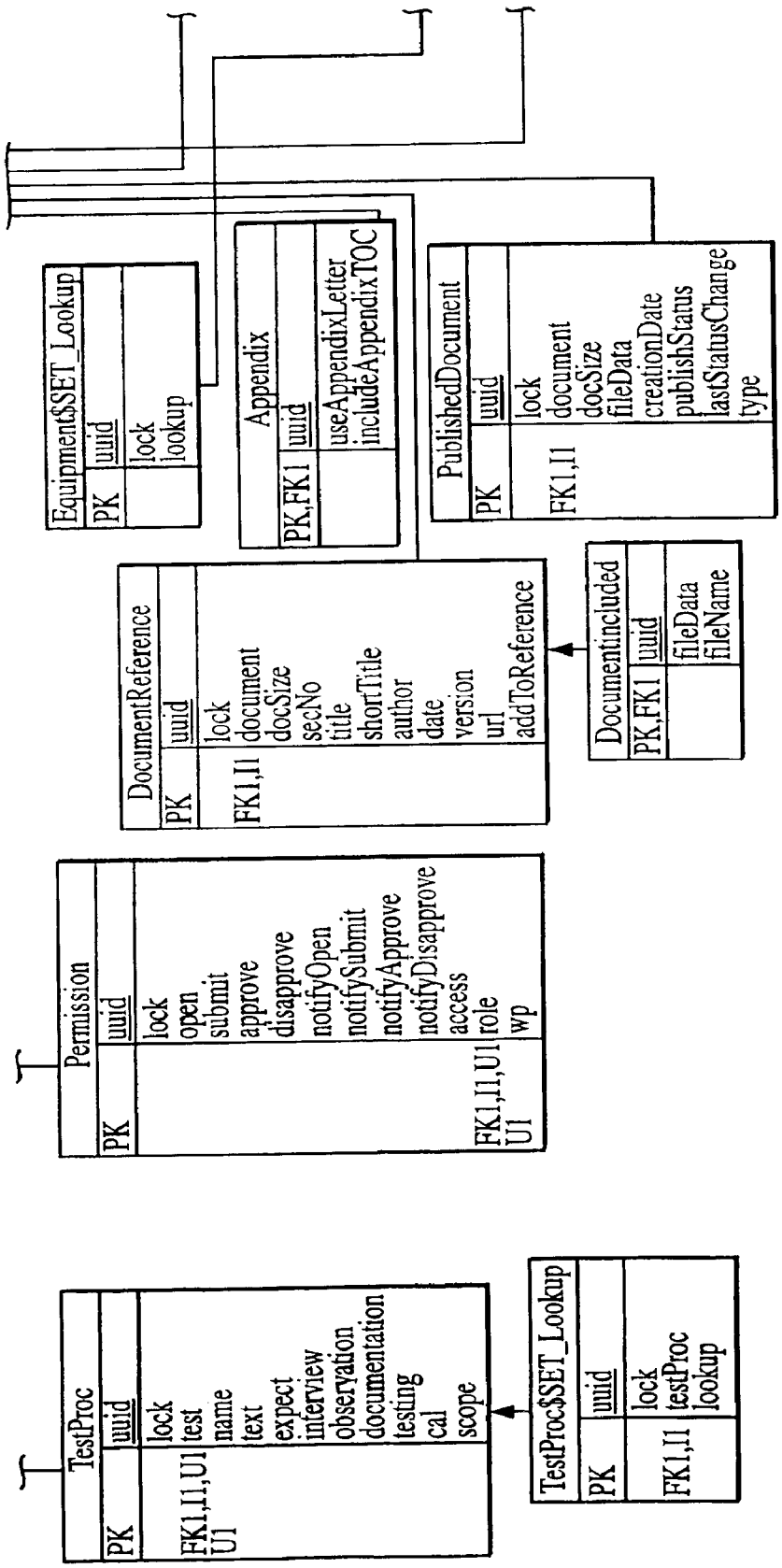

FIG. 40 is an exemplary network implementation of the present invention. As shown, one or more computer systems 3700 can be operationally connected to a network 4002 such the Internet, a LAN, WAN, or the like. The network implementation of the present invention enables two or more users to collaboratively work, via the network 4002, on one or more C&As. The computer portion 3702a comprises a WEB C&A component 4002 (generally corresponding, for example to FIGS. 1–27) and a Workflow Manager (WFM) component 4005 (generally corresponding, for example, to FIGS. 28–35). WEB C&A component 4002 and WFM component 4004 are shown separately to indicate that the WFM is an optional aspect of the WEB C&A component, and is not required for the operation thereof.

FIGS. 41, 41A, 41B, 41C, 41D, 41E, and 41F show an entity relationship diagram (ERD) that describes the attributes of entities and the relationships among them, and illustrates the basic data abstraction of an embodiment of the system. Because FIGS. 41A, 41B, 41C, 41D, 41E, and 41F show portions of FIG. 41 in detail FIGS. 41, 41A, 41B, 41C, 41D, 41E, and 41F will be referred to below as FIG. 41, and elements within any one of those FIGs. will be referred to as being within FIG. 41. As known to those skilled in the art, an ERD is a conceptual representation of real world objects and the relationships between them. It defines information that the systems create, maintain, process, and delete, as well as the inherent relationships that are supported by the database (i.e., data store).

At least some embodiments of the present invention can utilize a relational database to store and organize all information such as, for example, test procedures, standards/ regulations, and user entered information. The design of an embodiment of the database is provided in the ERD shown in FIG. 41. The database is initially populated with security requirements, test procedures and related information to facilitate the operation of the system. As information is entered by the user and calculated by the system, it is also recorded in the database. At least some embodiments of the present invention produce output documentation that can be formatted in accordance with, for example, DITSCAP and/ or NIACAP standard(s).

The ERD shown in FIG. 41 uses conventional notation. Each entity, as shown in FIG. 41, comprises a rectangular box. A many-to-many (M:M) is a relationship where each occurrence of a first entity is related to one or more occurrences of a second entity, and each occurrence of the second entity is related to one or more occurrences of the first entity.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention defined in the following claims.

Having thus described our invention, what we claim as new and desire to secure by Letters Patent is as follows:

1. A method, comprising:

electronically scanning at least one of: a hardware characteristic and a software characteristic, of components within a target system to obtain information associated with a target system configuration;

receiving information associated with a target system operational environment;

selecting at least one security requirement at least partially based on at least one of: a predefined standard, regulation, and requirement associated with the target system operational environment;

selecting at least one test procedure to determine target system compliance with the at least one security requirement; and producing a risk assessment of the target system.

2. The method of claim 1, wherein producing a risk assessment of a target system includes producing a baseline risk assessment by:

associating at least one first data element with a requirement category from a plurality of requirement categories, the at least one first data element being uniquely associated with at least one threat from a plurality of threats, each threat from the plurality of threats being associated with a vulnerability of the target system;

associating at least one second data element with a degree of exposure from a plurality of degrees of exposure of the target system, each degree of exposure from the plurality of degrees of exposure being uniquely associated with each threat from the plurality of threats;

determining at least one composite data element for each requirement category from the plurality of requirement categories, the determining being at least partially based on at least one predetermined rule and a comparison of the at least one first data element and the at least one second data element; and selecting, based upon the at least one predetermined rule, a baseline risk level of the at least one composite data element for each requirement category.

3. The method of claim 2, wherein the baseline risk assessment has baseline risk levels of at least one of: high, medium-high, medium, medium-low, low, and negligible, the baseline risk level for each requirement category from the plurality of requirement categories being determined by at least one of the following:

assigning a baseline risk level of negligible if: a threat level of the requirement category is negligible and a corresponding project threat level is negligible, low, medium-low, or medium; a threat level of the requirement category is low and a corresponding project threat level is negligible; a threat level of the requirement category is medium-low and a corresponding project threat level is negligible; or a threat level of the requirement category is medium and a corresponding project threat level is negligible;

assigning a baseline risk level of low if: a threat level of the requirement category is negligible and a corresponding project threat level is medium-high or high; a threat level of the requirement category is low and a corresponding project threat level is medium-low or low; a threat level of the requirement category is medium-low and a corresponding project threat level is low or medium-low; a threat level of the requirement category is medium and a corresponding project threat level is low; a threat level of the requirement category is medium-high and a corresponding project threat level is negligible; or a threat level of the requirement category is high and a corresponding project threat level is negligible;

assigning a baseline risk level of medium-low if: a threat level of the requirement category is low and a corresponding project threat level is medium or medium-high; a threat level of the requirement category is medium-low and a corresponding project threat level is medium; a threat level of the requirement category is medium and a corresponding project threat level is medium-low; or a threat level of the requirement category is medium-high and a corresponding project threat level is low;

assigning a baseline risk level of medium if: a threat level of the requirement category is low and a corresponding project threat level is high; a threat level of the requirement category is medium-low and a corresponding project threat level is medium-high; a threat level of the requirement category is medium and a corresponding project threat level is medium; a threat level of the requirement category is medium-high and a corresponding project threat level is medium-low; or a threat level of the requirement category is high and a corresponding project threat level is low or medium-low;

assigning a baseline risk level of medium-high if: a threat level of the requirement category is medium-low and a corresponding project threat level is high; a threat level of the requirement category is medium and a corresponding project threat level is medium-high; a threat level of the requirement category is medium-high and a corresponding project threat level is medium; or a threat level of the requirement category is high and a corresponding project threat level is low or medium; and assigning a baseline risk level of high if: a threat level of the requirement category is medium and a corresponding project threat level is high; a threat level of the requirement category is medium-high and a corresponding project threat level is medium-high or high; or a threat level of the requirement category is high and a corresponding project threat level is medium-high or high.

4. The method of claim 3, further comprising:

determining an adjusted risk level for at least one requirement category from the plurality of requirement categories, the adjusted risk being one of high, medium-high, medium, medium-low, low, and negligible, the adjusted risk level being decreased one level when a percentage of failed requirements falls within a first range, and the baseline risk level is one of high, medium-high, medium, medium-low and low.

5. The method of claim 4, wherein the first range includes zero to twenty percent.

6. The method of claim 3, further comprising:

determining an adjusted risk level for at least one requirement category from the plurality of requirement categories, the adjusted risk being one of high, medium-high, medium, medium-low, low, and negligible, the adjusted risk level being decreased two levels when a percentage of failed requirements falls vithin a first range, and the baseline risk level is one of high, medium-high, medium, and medium-low.

7. The method of claim 6, wherein the first range includes zero to twenty percent.

8. The method of claim 3, further comprising:

determining an adjusted risk level for at least one requirement category from the plurality of requirement categories, the adjusted risk being one of high, medium-high, medium, medium-low, low, and negligible, the adjusted risk level being decreased one level when the percentage of failed requirements falls within a second range, and the baseline risk level is one of high, medium-high, medium, medium-low and low.

9. The method of claim 8, wherein the second range includes over twenty percent to forty percent.

10. The method of claim 3, further comprising:

determining an adjusted risk level for at least one requirement category from the plurality of requirement categories, the adjusted risk being one of high, medium-high, medium, medium-low, low, and negligible, the adjusted risk level being maintained the same when the percentage of failed requirements falls within a third range, and the baseline risk level is one of high, medium-high, medium, medium-low, low and negligible.

11. The method of claim 10, wherein the third range includes over forty percent to sixty percent.

12. The method of claim 3, further comprising:

determining an adjusted risk level for at least one requirement category from the plurality of requirement categories, the adjusted risk being one of high, medium-high, medium, medium-low, low, and negligible, the adjusted risk level being increased one level when the percentage of failed requirements falls within a fourth range, and the baseline risk level is one of medium-high, medium, medium-low, low and negligible.

13. The method of claim 12, wherein the fourth range includes over sixty percent to eighty percent.

14. The method of claim 3, further comprising:

determining an adjusted risk level for at least one requirement category from the plurality of requirement categories, the adjusted risk being one of high, medium-high, medium, medium-low, low, and negligible, the adjusted risk level being increased two levels when the percentage of failed requirements falls within a fifth range, and the baseline risk level is one of medium, medium-low, low and negligible.

15. The method of claim 14, wherein the fifth range includes over eighty percent to one hundred percent.

16. The method according to claim 3, further comprising:
determining an adjusted risk level for at least one requirement category from the plurality of requirement categories, the adjusted risk level being one of high, medium-high, medium, medium-low, low, and negligible, the adjusted risk level being adjusted according to one of the following:
when a percentage of failed requirements falls within a first range, and the baseline risk level is one of high, medium-high, medium, and medium-low, the adjusted risk level of the requirements category is decreased two levels;
when a percentage of failed requirements falls within a first range, and the baseline risk level is one of high, medium-high, medium, and medium-low, and low, the adjusted risk level of the requirements category is decreased one level;
when a percentage of failed requirements falls within a second range, and the baseline risk level is one of high, medium-high, medium, medium-low and low, the adjusted risk level of the requirements category is decreased one level;
when a percentage of failed requirements falls within a third range, and the baseline risk level is one of high, medium-high, medium, medium-low, low and negligible, the adjusted risk level of the requirements category remains the same;
when a percentage of failed requirements falls within a fourth range, and the baseline risk level is one of medium-high, medium, medium-low, low and negligible, the adjusted risk level of the requirements category is increased one level; and
when a percentage of failed requirements falls within a fifth range, and the baseline risk level is one of medium, medium-low, low and negligible, the adjusted risk level of the requirements category is increased two levels.

17. The method of claim 16, wherein each threat from the plurality of threats associated with the target system is assigned a baseline risk level that is the highest level of risk among any of the plurality of requirement categories.

18. The method of claim 3, further comprising:
determining an adjusted risk level for at least one requirement category from the plurality of requirement categories.

19. The method of step 3, further comprising:
determining an adjusted risk level for at least one requirement category from the plurality of requirement categories, the adjusted risk being one of high, medium-high, medium, medium-low, low, and negligible.

20. The method of claim 1, wherein the producing a risk assessment of the target system is at least partially based on input from a user.

21. The method according to claim 20, wherein the input from the user includes at least one role associated with at least one user from a plurality of users, the plurality of users including the user.

22. The method of claim 21, further comprising:
sending an electronic notification to at least one user from the plurality of users upon the occurrence of a predefined event associated with the at least one user's corresponding role.

23. The method of claim 22, wherein the predefined event includes at least one of: opening a process step, submitting a process step for approval, re-opening a process step, and approving a process step.

24. The method of claim 21, wherein the at least one role includes at least one of:
certification and accreditation analyst, computer security incident response capabilities representative, privacy advocates office representative, disclosure office representative, vulnerabilities office representative, technical contingency planning document representative, request for information system originator, owner of business system, certification and accreditation request for information system coordinator, critical infrastructure protection representative, system point of contact, principal accrediting authority, certification and accreditation administrator, and certification and accreditation chief.

25. The method according to claim 20, wherein the input from the user includes at least one process step.

26. The method of claim 1, wherein the electronically scanning includes accessing an enterprise management system.

27. The method of claim 26, wherein the at least one of: a hardware characteristic and a software characteristic, is associated with at least one of: an internet protocol address, a hostname, a media access control address, an operating system name, and an operating system version.

28. The method according to claim 1, further comprising:
updating at least one test procedure to include testing for at least one of: a newly discovered system component and an updated target system component; and
updating the risk assessment at least partially based on the updating the at least one test procedure.

29. The method of claim 1, wherein the electronically scanning utilizes a secure connection.

30. The method of claim 1, wherein the at least one of: a hardware characteristic and a software characteristic, is associated with at least one of: an internet protocol address, a hostname, a media access control address, an operating system name, and an operating system version.

31. The method of claim 1, wherein the at least one of: a hardware characteristic and a software characteristic, within the target system includes a characteristic associated with at least one of: a central processing unit (CPU) manufacturer, a CPU clock speed, an operating system (OS) manufacturer, an OS version, and an OS patchs.

32. The method according to claim 1, wherein the at least one security requirement and the at least one test procedure are at least partially based on input from a user.

33. The method of claim 1, wherein the risk assessment includes a baseline risk assessment having risk levels of high, medium-high, medium, medium-low, low, and negligible.

34. The method of claim 1, further comprising:
outputting an indication of the risk assessment of the target system.

35. A system, comprising:
a scanner configured to electronically scan at least one of: a hardware characteristic and a software characteristic, of components within a target system, the scanner being configured to obtain information associated with a target system configuration;
a storage device in communication with the scanner, the storage device configured to receive and store information associated with a target system operational environment; and
a processor in communication with the storage device, the processor configured to select at least one security requirement associated with the target system operational environment, the processor configured to select at least one test procedure to determine target system compliance with at least one security requirement, the processor configured to produce a risk assessment of the target system.

36. The system of claim 35, wherein the processor is configured to produce a baseline risk assessment by:
associating at least one first data element with a requirement category from a plurality of requirement categories, the at least one first data element being uniquely associated with at least one threat from a plurality of threats, each threat from the plurality of threats being associated with a vulnerability of the target system;
associating at least one second data element with a degree of exposure from a plurality of degrees of exposure of the target system, each degree of exposure from the plurality of degrees of exposure being uniquely associated with each threat from the plurality of threats;
determining at least one composite data element for each requirement category from the plurality of requirement categories, the determining being at least partially based on at least one predetermined rule and a comparison of the at least one first data element and the at least one second data element; and
selecting, based upon the at least one predetermined rule, a baseline risk level of the at least one composite data element for each requirement category.

37. The system of claim 36, wherein the processor is configured to produce a baseline risk assessment having a baseline risk level of at least one of: high, medium-high, medium, medium-low, low, and negligible, the baseline risk level for each requirement category from the plurality of requirement categories being determined by least one of the following:
assigning a baseline risk level of negligible if: a threat level of the requirement category is negligible and a corresponding project threat level is negligible, low, medium-low, or medium; a threat level of the requirement category is low and a corresponding project threat level is negligible; a threat level of the requirement category is medium-low and a corresponding project threat level is negligible; or a threat level of the requirement category is medium and a corresponding project threat level is negligible;
assigning a baseline risk level of low if: a threat level of the requirement category is negligible and a corresponding project threat level is medium-high or high; a threat level of the requirement category is low and a corresponding project threat level is medium-low or low; a threat level of the requirement category is medium-low and a corresponding project threat level is low or medium-low; a threat level of the requirement category is medium and a corresponding project threat level is low; a threat level of the requirement category is medium-high and a corresponding project threat level is negligible; or a threat level of the requirement category is high and a corresponding project threat level is negligible;
assigning a baseline risk level of medium-low if: a threat level of the requirement category is low and a corresponding project threat level is medium or medium-high; a threat level of the requirement category is medium-low and a corresponding project threat level is medium; a threat level of the requirement category is medium and a corresponding project threat level is medium-low; or a threat level of the requirement category is medium-high and a corresponding project threat level is low;
assigning a baseline risk level of medium if: a threat level of the requirement category is low and a corresponding project threat level is high; a threat level of the requirement category is medium-low and a corresponding project threat level is medium-high; a threat level of the requirement category is medium and a corresponding project threat level is medium; a threat level of the requirement category is medium-high and a corresponding project threat level is medium-low; or a threat level of the requirement category is high and a corresponding project threat level is low or medium-low;
assigning a baseline risk level of medium-high if: a threat level of the requirement category is medium-low and a corresponding project threat level is high; a threat level of the requirement category is medium and a corresponding project threat level is medium-high; a threat level of the requirement category is medium-high and a corresponding project threat level is medium; or a threat level of the requirement category is high and a corresponding project threat level is low or medium; and
assigning a baseline risk level of high if: a threat level of the requirement category is medium and a corresponding project threat level is high; a threat level of the requirement category is medium-high and a corresponding project threat level is medium-high or high; or a threat level of the requirement category is high and a corresponding project threat level is medium-high or high.

38. The system of claim 37, wherein the processor is further configured to adjust a risk level to determine an adjusted risk level for at least one requirement category from the plurality of requirement categories, the adjusted risk level being one of high, medium-high, medium, medium-low, low, and negligible, the processor being configured to determine the adjusted risk level according to one of the following:
when a percentage of failed requirements falls within a first range, and the baseline risk level is one of high, medium-high, medium, medium-low and low, the adjusted risk level of the requirements category is decreased one level;
when a percentage of failed requirements falls within a first range, and the baseline risk level is one of high, medium-high, medium, and medium-low, the adjusted risk level of the requirements category is decreased two levels;
when a percentage of failed requirements falls within a second range, and the baseline risk level is one of high, medium-high, medium, medium-low and low, the adjusted risk level of the requirements category is decreased one level;
when a percentage of failed requirements falls within a third range, and the baseline risk level is one of high, medium-high, medium, medium-low, low and negligible, the adjusted risk level of the requirements category remains the same;
when a percentage of failed requirements falls within a fourth range, and the baseline risk level is one of medium-high, medium, medium-low, low and negligible, the adjusted risk level of the requirements category is increased one level; and
when a percentage of failed requirements falls within a fifth range, and the baseline risk level is one of medium, medium-low, low and negligible, the adjusted risk level of the requirements category is increased two levels.

39. The system of claim 38, wherein the processor is configured to assign a baseline risk level having the highest level of risk among the plurality of the requirement categories to each threat from the plurality of threats associated with the target system.

40. The system of claim 37, wherein the processor is further configured to determine an adjusted risk level for at least one requirement category from a plurality of requirements categories.

41. The system of claim 35, further comprising:
an interface in communication with the processor, the interface configured to receive input from a user, the processor being further configured to produce the risk assessment of the target system at least partially based on the input received from the user.

42. The system of claim 41, wherein the input from the user includes at least one process step.

43. The system of claim 41, wherein the input from the user includes at least one role associated with at least one user from a plurality of users, the plurality of users including the user.

44. The system of claim 35, further comprising:
a communications component in communication with the processor, the communications component configured to send an electronic notification to at least one user from the plurality of users upon the occurrence of a predefined event.

45. The system of claim 44, wherein the predefined event includes at least one of: opening a process step, submitting a process step for approval, re-opening a process step, and approving a process step.

46. The system of claim 35, wherein the processor is further configured to update at least one test procedure to include testing for at least one of: a newly discovered system component and an updated target system component, the processor being further configured to update the risk assessment based at least partially on the at least one test procedure.

47. The system of claim 35, wherein said scanner is configured to utilize a secure connection.

48. The system of claim 35, wherein the at least one of: a hardware characteristic and a software characteristic, is associated with at least one of: an internet protocol address, a hostname, a media access control address, an operating system name, and an operating system version.

49. The system of claim 35, wherein the scanner is configured to access an enterprise management system.

50. The system of claim 35, wherein the risk assessment includes a baseline risk assessment having risk levels of high, medium-high, medium, medium-low, low and negligible.

51. A processor-readable medium comprising code representing instructions configured to cause a processor to:
electronically scan at least one of: a hardware characteristic and a software characteristic, of components within a target system to obtain information associated with target system configuration information;
receive information associated with a target system operational environment;
select at least one security requirement configured to cause a processor to select at least one security requirement at least partially based on at least one of: a predefined standard, regulation, and requirement, associated with the target system operational environment;
select at least one test procedure to determine target system compliance with the at least one security requirement; and
produce a risk assessment of the target system.

52. The processor-readable medium of claim 51, wherein the code representing instructions to cause a processor to produce a risk assessment of a target system includes code representing instructions to cause a processor to produce a baseline risk assessment by causing a processor to:
associate at least one first data element with a requirement category from a plurality of requirement categories, the at least one first data element being uniquely associated with at least one threat from a plurality of threats, each threat from the plurality of threats being associated with a vulnerability of the target system;
associate at least one second data element with a degree of exposure from a plurality of degrees of exposure of the target system, each degree of exposure from the plurality of degrees of exposure being uniquely associated with each threat from the plurality of threats;
determine at least one composite data element for each requirement category from the plurality of requirement categories, the code representing instructions to cause a processor to determine being at least partially based on at least one predetermined rule and a comparison of the at least one first data element; and
select, based upon the at least one predetermined rule, a baseline risk level of the at least one composite data element for each requirement category.

53. The processor-readable medium of claim 52, wherein the baseline risk assessment has baseline risk levels of at least one of: high, medium-high, medium, medium-low, low, and negligible, the baseline risk level for each requirement category from the plurality of requirement categories being determined by code representing instructions to cause a processor to do at least one of the following:
assign a baseline risk level of negligible if: a threat level of the requirement category is negligible and a corresponding project threat level is negligible, low, medium-low, or medium; a threat level of the requirement category is low and a corresponding project threat level is negligible; a threat level of the requirement category is medium-low and a corresponding project threat level is negligible; or a threat level of the requirement category is medium and a corresponding project threat level is negligible;
assign a baseline risk level of low if: a threat level of the requirement category is negligible and a corresponding project threat level is medium-high or high; a threat level of the requirement category is low and a corresponding project threat level is medium-low or low; a threat level of the requirement category is medium-low and a corresponding project threat level is low or medium-low; a threat level of the requirement category is medium and a corresponding project threat level is low; a threat level of the requirement category is medium-high and a corresponding project threat level is negligible; or a threat level of the requirement category is high and a corresponding project threat level is negligible;
assign a baseline risk level of medium-low if: a threat level of the requirement category is low and a corresponding project threat level is medium or medium-high; a threat level of the requirement category is medium-low and a corresponding project threat level is medium; a threat level of the requirement category is medium and a corresponding project threat level is medium-low; or a threat level of the requirement category is medium-high and a corresponding project threat level is low;

assign a baseline risk level of medium if: a threat level of the requirement category is low and a corresponding project threat level is high; a threat level of the requirement category is medium-low and a corresponding project threat level is medium-high; a threat level of the requirement category is medium and a corresponding project threat level is medium; a threat level of the requirement category is medium-high and a corresponding project threat level is medium-low; or a threat level of the requirement category is high and a corresponding project threat level is low or medium-low;

assign a baseline risk level of medium-high if: a threat level of the requirement category is medium-low and a corresponding project threat level is high; a threat level of the requirement category is medium and a corresponding project threat level is medium-high; a threat level of the requirement category is medium-high and a corresponding project threat level is medium; or a threat level of the requirement category is high and a corresponding project threat level is low or medium; and assign a baseline risk level of high if: a threat level of the requirement category is medium and a corresponding project threat level is high; a threat level of the requirement category is medium-high and a corresponding project threat level is medium-high or high; or a threat level of the requirement category is high and a corresponding project threat level is medium-high or high.

54. The processor-readable medium of claim 53, comprising code representing instructions to cause a processor to:

determine an adjusted risk level for at least one requirement category from the plurality of requirement categories.

55. The processor-readable medium of claim 54, further comprising code representing instructions to cause a processor to determine an adjusted risk level for at least one requirement category from the plurality of requirement categories, the adjusted risk level being one of high, medium-high, medium, medium-low, low, and negligible, the adjusted risk level being increased according to one of the following:

when a percentage of failed requirements falls within a first range, and the baseline risk level is one of high, medium-high, medium, medium-low and low, the adjusted risk level of the requirements category is decreased one level;

when a percentage of failed requirements falls within a first range, and the baseline risk level is one of high, medium-high, medium, and medium-low, the adjusted risk level of the requirements category is decreased two levels;

when a percentage of failed requirements falls within a second range, and the baseline risk level is one of high, medium-high, medium, medium-low and low, the adjusted risk level of the requirements category is decreased one level;

when a percentage of failed requirements falls within a third range, and the baseline risk level is one of high, medium-high, medium, medium-low, low and negligible, the adjusted risk level of the requirements category remains the same;

when a percentage of failed requirements falls within a fourth range, and the baseline risk level is one of medium-high, medium, medium-low, low and negligible, the adjusted risk level of the requirements category is increased one level; and when a percentage of failed requirements falls within a fifth range, and the baseline risk level is one of medium, medium-low, low and negligible, the adjusted risk level of the requirements category is increased two levels.

56. The processor-readable medium of claim 55, wherein the code comprising instructions configured to cause a processor to determine an adjusted risk level is configured to assign a baseline risk level that is the highest level of risk among any of the plurality of requirement categories for each threat from the plurality of threats associated with the target system.

57. The processor-readable medium of claim 51, wherein the code representing instructions to cause a processor to produce a risk assessment of the target system is at least partially based on input from a user.

58. The processor-readable medium of claim 57, wherein the input from the user includes at least one role associated with at least one user from a plurality of users including the user.

59. The processor-readable medium of claim 58, further comprising code representing instructions to cause a processor to:

cause an electronic notification to be transmitted to at least one user from the plurality of users upon the occurrence of a predefined event associated with the at least one user's corresponding role.

60. The processor-readable medium of claim 59, wherein the predefined event includes at least one of: opening a process step, submitting a process step for approval, re-opening a process step, and approving a process step.

61. The processor-readable medium of claim 57, wherein the input from the user includes at least one process step.

62. The processor-readable medium of claim 51, further comprising code representing instructions to cause a processor to:

update at least one test procedure to include testing for at least one of: a newly discovered system component and an updated target system component; and update the risk assessment at least partially based on the updating the at least one test procedure.

63. The processor-readable medium of claim 51, wherein the at least one of: a hardware characteristic and a software characteristic is associated with at least one of: an internet protocol address, a hostname, a media access control address, an operating system name, and an operating system version.

64. The processor-readable medium of claim 51, wherein code representing instructions to cause a processor to electronically scan includes code representing instructions to cause a processor to access an enterprise management system.

65. The processor-readable medium of claim 51, wherein the risk assessment includes a baseline risk assessment having risk levels of high, medium-high, medium, medium-low, low and negligible.

* * * * *